US012161596B2

(12) United States Patent
Melcher et al.

(10) Patent No.: US 12,161,596 B2
(45) Date of Patent: *Dec. 10, 2024

(54) THERAPEUTIC CUSHION SYSTEMS AND METHODS

(71) Applicant: Amenity Health, Inc., San Diego, CA (US)

(72) Inventors: Carl Melcher, La Jolla, CA (US); Aaron Clark, San Diego, CA (US); Clint Erickson, San Diego, CA (US)

(73) Assignee: Amenity Health, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,559

(22) Filed: Aug. 18, 2023

(65) Prior Publication Data

US 2024/0148580 A1 May 9, 2024

Related U.S. Application Data

(60) Continuation of application No. 17/831,391, filed on Jun. 2, 2022, now Pat. No. 11,786,429, which is a
(Continued)

(51) Int. Cl.
*A61G 7/075* (2006.01)
*A47C 20/00* (2006.01)
(Continued)

(52) U.S. Cl.
CPC .............. *A61G 7/075* (2013.01); *A47C 20/00* (2013.01); *A47C 20/023* (2013.01);
(Continued)

(58) Field of Classification Search
CPC .... A47G 9/1063; A47G 9/1081; A47G 9/109; A47C 20/00; A47C 20/02; A47C 20/021;
(Continued)

(56) References Cited

U.S. PATENT DOCUMENTS 254,759 A 3/1882 Young
2,149,140 A 2/1939 Gonzalez-Rincones
(Continued)

FOREIGN PATENT DOCUMENTS

CA 3119687 C * 10/2023 ............ A47C 20/00
CN 2618511 Y 6/2004
(Continued)

OTHER PUBLICATIONS

Office Action for U.S. Appl. No. 17/571,176, mailed on Dec. 29, 2023.

(Continued)

*Primary Examiner* — Robert G Santos

(57) ABSTRACT

Apparatus and methods for providing therapeutic treatment for symptoms associated with GERD and/or other digestive disorders and/or other medical conditions are described herein. In some embodiments, an apparatus includes a support element that has a first end portion and a second end portion and a top surface disposed at an angle relative to a bottom surface of the support element. The second end portion has a height greater than the first end portion. A riser element is configured to be coupled proximate to the second end portion of the support element. A body element is configured to be disposed on at least one of the support element or the riser element. The body element has a first arm and a second arm connected together by an arc portion.

21 Claims, 43 Drawing Sheets

Related U.S. Application Data continuation of application No. 16/020,123, filed on Jun. 27, 2018, now Pat. No. 11,357,684, which is a continuation of application No. 14/195,749, filed on Mar. 3, 2014, now Pat. No. 10,022,285, which is a division of application No. 13/757,172, filed on Feb. 1, 2013, now Pat. No. 8,661,586.

(60) Provisional application No. 61/710,913, filed on Oct. 8, 2012, provisional application No. 61/683,935, filed on Aug. 16, 2012, provisional application No. 61/594,840, filed on Feb. 3, 2012.

(51) Int. Cl.
*A47C 20/02* (2006.01)
*A61G 7/07* (2006.01)
*A61G 7/10* (2006.01)

(52) U.S. Cl.
CPC .............. *A47C 20/027* (2013.01); *A61G 7/07* (2013.01); *A61G 7/1021* (2013.01); *A47C 20/021* (2013.01)

(58) Field of Classification Search
CPC ................ A47C 20/023; A47C 20/062; A47C 20/027; A61G 7/075; A61G 7/07; A61G 7/1021
USPC ... 5/630, 632–634, 636, 640, 646, 648, 652, 5/657
See application file for complete search history.

(56) References Cited

U.S. PATENT DOCUMENTS 2,182,861 A 12/1939 Albert
2,295,906 A 9/1942 Lacour
2,522,120 A 9/1950 Kaskey et al.
2,550,293 A 4/1951 Platis
3,315,282 A 4/1967 Lowery et al.
3,333,286 A 8/1967 Biolik
D222,005 S 9/1971 Kelly
3,926,181 A 12/1975 Eischen, Sr.
3,938,205 A 2/1976 Spann
4,118,813 A 10/1978 Armstrong
4,173,048 A 11/1979 Varaney
4,214,326 A 7/1980 Spann
D263,500 S 3/1982 Janko
4,359,045 A 11/1982 Cozzi
4,393,530 A 7/1983 Stark
D271,647 S 12/1983 McLeod
D295,248 S 4/1988 Sommerfield et al.
4,802,249 A 2/1989 Bills
D301,166 S 5/1989 Miklja
4,853,993 A 8/1989 Walpin et al.
4,901,384 A 2/1990 Eary
4,907,306 A 3/1990 Nakaji
D309,542 S 7/1990 Glenn
D310,312 S 9/1990 Wong et al.
4,987,625 A 1/1991 Edelson
5,014,375 A 5/1991 Coonrad et al.
5,035,015 A 7/1991 Maietta
D319,365 S 8/1991 Edelson
5,095,569 A 3/1992 Glenn
5,097,551 A 3/1992 Smith
5,125,123 A 6/1992 Engle
D328,349 S 7/1992 Waldrop
5,153,960 A 10/1992 Ritter et al.
5,231,717 A 8/1993 Scott et al.
5,289,828 A 3/1994 Toth
5,400,449 A 3/1995 Satto
5,412,824 A 5/1995 Emerson et al.
5,423,099 A 6/1995 Gulli
5,440,770 A 8/1995 Nichols
5,479,667 A 1/1996 Nelson et al.
5,509,153 A 4/1996 Roschacher
5,561,879 A 10/1996 Everall
5,632,050 A 5/1997 Zajas et al.
5,652,981 A 8/1997 Singer-Leyton et al.
D385,143 S 10/1997 Straub
5,697,112 A 12/1997 Colavito et al.
D390,665 S 2/1998 Kennemore
5,713,091 A 2/1998 Houchin
5,790,999 A * 8/1998 Clark .................. A47D 13/083
5/655
5,800,368 A 9/1998 Klingemann
5,815,863 A 10/1998 Dolisi
5,890,765 A 4/1999 LaPointe et al.
5,893,183 A 4/1999 Bechtold, Jr.
D416,428 S 11/1999 Jackson
5,987,674 A 11/1999 Schaffner et al.
6,032,669 A 3/2000 Klein
6,052,848 A 4/2000 Kelly
6,105,187 A 8/2000 Gnjatovic
6,175,979 B1 1/2001 Jackson
6,185,768 B1 2/2001 Schlechter
D441,587 S 5/2001 Cameron
6,226,817 B1 5/2001 Rubio
6,230,350 B1 5/2001 Goldstein
D446,676 S 8/2001 Mayes
6,270,155 B1 8/2001 Rashid
6,276,012 B2 8/2001 Borders
D447,805 S 9/2001 Siegal
D448,227 S 9/2001 Straub
6,292,964 B1 9/2001 Rose et al.
6,321,403 B1 11/2001 Matthews
6,324,710 B1 12/2001 Hernandez et al.
6,334,442 B1 1/2002 Altamura
D453,653 S 2/2002 Tunnell
6,446,288 B1 9/2002 Pi
6,499,164 B1 12/2002 Leach
6,553,995 B1 4/2003 Cole et al.
6,622,727 B2 9/2003 Perry
6,634,045 B1 10/2003 DuDonis et al.
6,757,925 B1 7/2004 Toomer
6,779,211 B1 * 8/2004 Williams ............... A47D 13/08
5/640
6,817,049 B1 11/2004 Hall
D500,622 S 1/2005 Owen
6,898,812 B2 5/2005 Smart
6,913,019 B2 7/2005 Johns et al.
6,922,861 B1 8/2005 Mathis
6,925,670 B2 8/2005 Torrez
6,954,953 B2 10/2005 Bordan
7,020,918 B1 4/2006 Tinsley
7,114,206 B2 10/2006 Leach
7,134,158 B2 11/2006 Tokarz
7,201,757 B2 4/2007 Knudson et al.
7,322,061 B2 1/2008 Carroll
7,328,471 B1 2/2008 Stohr
7,353,552 B2 4/2008 Leach
7,404,222 B2 7/2008 Tidwell
7,415,743 B2 8/2008 Rubio
D578,220 S 10/2008 Ebarb
7,536,741 B1 5/2009 Schultz
7,546,651 B2 6/2009 Groteke et al.
7,578,013 B2 8/2009 Aikman
D601,776 S 10/2009 Loret
7,607,185 B1 10/2009 Minson
7,669,926 B2 3/2010 Balensiefer
7,698,766 B2 4/2010 Schultz
D619,401 S 7/2010 Deenadayalu et al.
D619,404 S 7/2010 Castillo
7,793,371 B1 9/2010 Leach
D635,265 S 3/2011 Coffey et al.
7,908,691 B2 3/2011 Small
D642,278 S 7/2011 Sharps et al.
D643,125 S 8/2011 Seidel
8,006,335 B1 8/2011 Andermann
8,069,515 B1 12/2011 Tingey
8,074,310 B1 12/2011 Robbins
8,118,268 B2 2/2012 Mabry
D655,559 S 3/2012 Cheng
8,136,186 B1 3/2012 Leach
8,205,285 B1 6/2012 Klingemann

(56) References Cited

U.S. PATENT DOCUMENTS

| | | | |
|---|---|---|---|
| 8,220,091 B2 | 7/2012 | Schultz | |
| D665,503 S | 8/2012 | Dennewald | |
| D665,912 S | 8/2012 | Skripps | |
| 8,234,735 B2 | 8/2012 | Schultz | |
| 8,261,386 B2 | 9/2012 | Kardos | |
| 8,291,534 B2 | 10/2012 | Karlson | |
| 8,640,289 B2 | 2/2014 | Reeder, Jr. | |
| 8,646,134 B1 | 2/2014 | Alleto, Jr. | |
| 8,661,586 B2 | 3/2014 | Melcher et al. | |
| 8,695,134 B2 | 4/2014 | Schultz | |
| 8,745,793 B2 | 6/2014 | Bensoussan | |
| D708,752 S | 7/2014 | Oberst | |
| D715,579 S | 10/2014 | Scarlett | |
| 8,887,331 B2 | 11/2014 | Nakamura et al. | |
| D732,174 S | 6/2015 | Johnson | |
| D733,897 S | 7/2015 | Rossouw | |
| D736,391 S | 8/2015 | Johnson | |
| D736,541 S | 8/2015 | Maldonado | |
| 9,220,359 B2 | 12/2015 | Long | |
| D754,353 S | 4/2016 | Pileski et al. | |
| 9,386,859 B2 | 7/2016 | Schultz | |
| 9,427,366 B2 | 8/2016 | Melcher et al. | |
| D771,414 S | 11/2016 | Krishtul | |
| 9,510,686 B2 | 12/2016 | Abraham | |
| D779,236 S | 2/2017 | Ribble et al. | |
| D783,834 S | 4/2017 | Johnson et al. | |
| D785,184 S | 4/2017 | Higgins et al. | |
| 9,717,342 B2 | 8/2017 | Bates | |
| D800,480 S | 10/2017 | Paperno | |
| D804,850 S | 12/2017 | Acosta De Nicolo | |
| 9,993,379 B2 | 6/2018 | Melcher et al. | |
| 10,022,285 B2 | 7/2018 | Melcher et al. | |
| D841,819 S | 2/2019 | Clark et al. | |
| D848,763 S | 5/2019 | Potter | |
| 10,349,752 B2 | 7/2019 | Melcher et al. | |
| D855,354 S | 8/2019 | Zanki et al. | |
| D856,708 S | 8/2019 | Chen | |
| D862,116 S | 10/2019 | Zanki | |
| D871,593 S | 12/2019 | Rossouw | |
| 10,512,576 B2 | 12/2019 | Melcher et al. | |
| D875,949 S | 2/2020 | Clark et al. | |
| 10,660,807 B2 | 5/2020 | Ribble et al. | |
| D921,203 S | 6/2021 | Clark et al. | |
| 11,141,010 B1 | 10/2021 | Mitchell | |
| 11,234,533 B2 | 2/2022 | Melcher et al. | |
| 11,234,877 B2 | 2/2022 | Melcher et al. | |
| 11,357,684 B2 | 6/2022 | Melcher et al. | |
| 11,786,429 B2 * | 10/2023 | Melcher | A47C 20/027 5/646 |
| 11,801,185 B2 * | 10/2023 | Melcher | A61G 7/07 |
| 2003/0182727 A1 | 10/2003 | DuDonis et al. | |
| 2003/0217412 A1 | 11/2003 | Johns et al. | |
| 2004/0116195 A1 | 6/2004 | Lee | |
| 2004/0168257 A1 | 9/2004 | Torrez | |
| 2006/0230539 A1 | 10/2006 | Goodman | |
| 2007/0067915 A1 | 3/2007 | Pryor | |
| 2007/0182233 A1 | 8/2007 | Boyko | |
| 2008/0134437 A1 | 6/2008 | Small | |
| 2008/0256704 A1 | 10/2008 | Conway | |
| 2009/0126117 A1 | 5/2009 | Lazarus | |
| 2009/0144905 A1 | 6/2009 | Javaruski et al. | |
| 2009/0222991 A1 | 9/2009 | Davis, III | |
| 2009/0222997 A1 | 9/2009 | Schultz | |
| 2010/0122418 A1 | 5/2010 | Adler | |
| 2010/0132119 A1 | 6/2010 | Taghikhani | |
| 2010/0186171 A1 | 7/2010 | Schultz | |
| 2010/0199436 A1 | 8/2010 | Schultz | |
| 2010/0229875 A1 | 9/2010 | Davis | |
| 2011/0296615 A1 | 12/2011 | Tingey | |
| 2012/0023669 A1 | 2/2012 | Graller et al. | |
| 2012/0272452 A1 | 11/2012 | Schultz | |
| 2013/0198962 A1 | 8/2013 | Melcher | |
| 2013/0198965 A1 | 8/2013 | Melcher et al. | |
| 2014/0331411 A1 | 11/2014 | Schultz | |
| 2015/0082550 A1 | 3/2015 | Hui | |
| 2018/0344042 A1 | 12/2018 | Melcher et al. | |
| 2019/0099309 A1 | 4/2019 | Melcher et al. | |
| 2019/0298073 A1 | 10/2019 | Melcher et al. | |
| 2020/0222259 A1 | 7/2020 | Melcher et al. | |
| 2022/0160139 A1 | 5/2022 | Melcher et al. | |
| 2022/0160560 A1 | 5/2022 | Melcher et al. | |
| 2022/0175149 A1 | 6/2022 | Clark et al. | |
| 2022/0362081 A1 | 11/2022 | Melcher et al. | |
| 2024/0122776 A1 | 4/2024 | Melcher et al. | |
| 2024/0148580 A1 * | 5/2024 | Melcher | A47C 20/023 |

FOREIGN PATENT DOCUMENTS

| | | |
|---|---|---|
| CN | 101731876 A | 6/2010 |
| CN | 201578261 U | 9/2010 |
| CN | 201879284 U | 6/2011 |
| CN | 202821939 U | 3/2013 |
| CN | 103637597 A | 3/2014 |
| CN | 203483617 U | 3/2014 |
| CN | 103816017 A | 5/2014 |
| JP | 2005-185739 A | 7/2005 |
| JP | 3129197 U | 2/2007 |
| JP | 3132068 U | 5/2007 |
| JP | 2007-159818 A | 6/2007 |
| WO | WO 97/05807 | 2/1997 |
| WO | WO-2008-023724 A1 | 2/2008 |
| WO | WO 2013/116658 | 8/2013 |
| WO | WO 2013/116676 | 8/2013 |
| WO | WO 2016/022886 | 2/2016 |

OTHER PUBLICATIONS

MedCline Acid Reflux System. [online] Retrieved Jun. 7, 2018 from URL: https://www.amazon.com/MedCline-Acid-Reflux-System-Large/ dp/BOICRB7BMO.

Zerlar Memory Cotton Lunch Break Face Down Head Rest Pillow Cushion. [online] Published Dec. 19, 2017. Retrieved Jun. 7, 2018 from URL: https://www.amazon.com/Zerlar-Memory-Cotton-CushionStudent/dp/B075JFM9HC/ref=sr_1_20_s_it?s=hpc&ie=UTF8&qid=1528377772&sr+1-20&keywords=Medicine&th=1.

Office Action for Australian Patent Application No. 2013214928, mailed on Jun. 8, 2017, 7 pages.

Office Action for Chinese Patent Application No. 201380016317.8, mailed on Jun. 20, 2016, 32 pages.

Office Action for Eurasian Patent Application No. 201491465, mailed on May 20, 2016, 6 pages.

Office Action for European Patent Application No. 13742902.3, mailed on Aug. 18, 2016, 5 pages.

Supplementary European Search Report for European Application No. 13742902.3, mailed Oct. 16, 2015, 6 pages.

Office Action for Japanese Patent Application No. 2014-555766, mailed Nov. 17, 2016, 16 pages.

Final Office Action for Japanese Patent Application No. 2014-555766, mailed Feb. 22, 2017, 4 pages.

Office Action for Mexican Patent Application No. MX/a/2014/009258, mailed Sep. 22, 2016, 12 pages.

Office Action for U.S. Appl. No. 13/757,172, mailed Jun. 21, 2013, 7 pages.

International Search Report and Written Opinion for International Application No. PCT/US2013/024378, mailed May 23, 2013, 15 pages.

International Search Report and Written Opinion for International Application No. PCT/US2013/024358, mailed May 23, 2013, 11 pages.

Office Action for U.S. Appl. No. 13/757,120, mailed Jul. 1, 2013, 7 pages.

Office Action for U.S. Appl. No. 14/195,749, mailed Oct. 5, 2015, 5 pages.

Office Action for U.S. Appl. No. 14/195,749, mailed Jun. 7, 2016, 13 pages.

Office Action for U.S. Appl. No. 14/195,749, mailed Feb. 3, 2017, 10 pages.

Office Action for U.S. Appl. No. 14/195,749, mailed Sep. 21, 2017, 11 pages.

(56) References Cited

OTHER PUBLICATIONS

Office Action for U.S. Appl. No. 14/376,372, mailed May 15, 2017, 11 pages.
Office Action for U.S. Appl. No. 14/455,389, mailed Jan. 15, 2015, 7 pages.
Office Action for U.S. Appl. No. 14/455,389, mailed Aug. 5, 2015, 14 pages.
Office Action for U.S. Appl. No. 14/820,832, mailed Sep. 12, 2018, 19 pages.
International Search Report and Written Opinion for International Application No. PCT/US2015/044151, mailed Feb. 2, 2016, 10 pages.
Office Action for Chinese Patent Application No. 201380016317.8, mailed May 15, 2017, 67 pages.
Extended European Search Report mailed on Feb. 21, 2018, for EP Application No. 15 829 598.0, filed on Aug. 7, 2015, 7 pages.
Office Action for Chinese Patent Application No. 201380016317.8, mailed Feb. 7, 2018, 36 pages.
Office Action for Chinese Patent Application No. 201380016317.8, mailed Oct. 31, 2018, 22 pages.
Office Action for Australian Patent Application No. 2013214928, mailed on Apr. 17, 2018, 5 pages.
Office Action for Indonesian Patent Application No. P00201405250, mailed on Apr. 16, 2018, 3 pages.
Office Action for U.S. Appl. No. 14/820,832, mailed Feb. 21, 2018, 14 pages.
Office Action for Chinese Patent Application No. 2015800522767, mailed Sep. 25, 2018, 20 pages.
Office Action for U.S. Appl. No. 16/002,522, mailed Jan. 4, 2019, 12 pages.
Office Action for Israeli Application No. 250436, mailed Jan. 3, 2019, 3 pages.
Office Action for Canadian Patent Application No. 2,863,395, mailed Mar. 5, 2019, 3 pages.
Office Action for Japanese Application No. 2017-508097, mailed Apr. 25, 2019, 10 pages.
Office Action for Canadian Patent Application No. 2,957,389, mailed Feb. 28, 2022, 8 pages.
Partial European Search Report mailed on Oct. 23, 2019, for EP Application No. 19184198.0.
European Search Report mailed on Jan. 23, 2020, for EP Application No. 19184198.0, 9 pages.
Office Action for Mexican Patent Application No. MX/a/2017/001692, mailed Feb. 6, 2020, 4 pages.
Office Action for Japanese Patent Application No. 2017-508097, mailed Mar. 13, 2020, 6 pages.
Office Action for Brazilian Patent Application No. 1120170025116, mailed May 5, 2020, 2 pages.
First Examination Report for Indian Patent Application No. 1882/KOLNP/2014, mailed May 22, 2020, 8 pages.
Examiner's Report for Canadian Patent Application No. 2,863,395, mailed Aug. 12, 2020, 3 pages.
Office Action for Brazilian Patent Application No. 1220200044969, mailed Aug. 28, 2020, 2 pages.
Office Action for European Patent Application No. 19184198.0, mailed Sep. 28, 2020, 4 pages.
First Examination Report for Indian Patent Application No. 201737005110, mailed Oct. 12, 2020, 7 pages.
Office Action for U.S. Appl. No. 15/991,414, mailed Nov. 30, 2020, 24 pages.
Office Action for Brazilian Patent Application No. 1120140192600, mailed Nov. 3, 2020, 8 pages.
Office Action for U.S. Appl. No. 16/020,123, mailed Mar. 23, 2021, 20 pages.
Office Action for U.S. Appl. No. 16/712,297, mailed Mar. 24, 2021, 10 pages.
Office Action for U.S. Appl. No. 16/447,604, mailed Mar. 29, 2021, 17 pages.
Office Action for Brazilian Patent Application No. 1120140192600, mailed Apr. 6, 2021, 8 pages.
First Office Action for Chinese Patent Application No. 201910735506X, mailed Feb. 26, 2021, 5 pages.
Office Action for Chinese Patent Application No. 2020103141882, mailed Mar. 18, 2021, 19 pages.
Office Action for Japanese Patent Application No. 2020-109126, mailed Jun. 3, 2021, 7 pages.
Office Action for Israeli Patent Application No. 273679, mailed Jun. 20, 2021, 12 pages (translation included).
Office Action for Brazilian Patent Application No. 1220200044969, mailed Jun. 18, 2021, 6 pages.
Office Action for Australian Patent Application No. 2020203947, mailed Jun. 30, 2021, 5 pages.
First Examination Report for Indian Patent Application No. 202138016133, mailed Feb. 8, 2022, 6 pages.
Examination Report No. 1 for Australian Patent Application No. 2020204454, mailed Aug. 6, 2021, 4 pages.
Examination Report No. 2 for Australian Patent Application No. 2020204454, mailed Jan. 20, 2022, 6 pages.
Office Action for Chinese Patent Application No. 201910735506X, mailed Jul. 5, 2021, 9 pages.
Office Action for U.S. Appl. No. 16/020,123, mailed Oct. 8, 2021, 14 pages.
Office Action for Chinese Application No. 202010314188.2, mailed Oct. 11, 2021, 10 pages.
Office Action for Brazilian Patent Application No. 1220200044969, issued Dec. 28, 2021, 6 pages.
Office Action for Israeli Patent Application No. 273679, mailed Mar. 1, 2022, 4 pages.
Office Action for Chinese Patent Application No. 202010314188.2, mailed on Apr. 26, 2022, with English translation.
Office Action for U.S. Appl. No. 17/831,391, mailed on Feb. 1, 2023.

* cited by examiner

THERAPEUTIC CUSHION SYSTEMS AND METHODS

CROSS-REFERENCE TO RELATED APPLICATIONS

This application is a continuation of U.S. patent application Ser. No. 17/831,391, entitled "Therapeutic Cushion Systems and Methods," filed Jun. 2, 2022 (now U.S. Pat. No. 11,786,429), which is a continuation of U.S. patent application Ser. No. 16/020,123, entitled "Therapeutic Cushion Systems and Methods," filed Jun. 27, 2018 (now U.S. Pat. No. 11,357,684), which is a continuation of U.S. patent application Ser. No. 14/195,749, entitled "Therapeutic Cushion Systems and Methods," filed Mar. 3, 2014 (now U.S. Pat. No. 10,022,285), which is a divisional of U.S. patent application Ser. No. 13/757,172, entitled "Therapeutic Cushion Systems and Methods," filed Feb. 1, 2013 (now U.S. Pat. No. 8,661,586), which claims priority to and the benefit from U.S. Provisional Application No. 61/594,840, entitled "Therapeutic Cushion System," filed Feb. 3, 2012, U.S. Provisional Application No. 61/683,935, entitled "Therapeutic Cushion Systems and Methods," filed Aug. 16, 2012, and U.S. Provisional Application No. 61/710,913, entitled "Therapeutic Cushion Systems and Methods," filed Oct. 8, 2012, each of the disclosures of which is incorporated herein by reference in its entirety.

BACKGROUND

Some embodiments described herein relate to therapeutic cushion systems and methods, and in particular, to therapeutic cushion systems and methods for use in the treatment of various medical conditions, such as, for example, gastro-esophageal reflux disease.

Gastro-esophageal reflux disease (GERD) is a medical term that describes a malady in which acid-laden, partially digested stomach contents reflux—i.e., flow in an abnormal backward fashion—from the stomach into the esophagus. Reflux of gastric contents into the esophagus is most common, and does the most damage, when the GERD sufferer is sleeping and unaware that the reflux is occurring.

Some known systems use pillows or other supportive apparatuses to effectively manage or control symptoms of conditions that otherwise would have required a medical prescription or surgery to alleviate. For example, some known pillow options include an elevated pillow with a protrusion within the pillow focused on the cervical region of the neck, which is intended to provide comfort or better resting conditions for individuals suffering from cardiac conditions, emphysema or other respiratory difficulties. Such a pillow does not allow for an extended support below the sacrum region of the spine; nor does the pillow provide for any comfortable position other than supine.

Some known devices include an orthopedic pillow that can be used to minimize snoring in an individual. While such a pillow can be used to address conditions such as snoring, such a pillow may not be configured to treat conditions such as GERD. In fact, such an orthopedic pillow typically only provides an elevation component and fails to address any other component that may be desired for the relief of symptoms of a GERD sufferer.

Another known system includes a support pillow including a body with a central section and two wings for use in controlling symptoms associated with head and neck hyperextension, which is often seen in infants with bronchopulmonary dysplasia, or other related conditions. Another known system includes an apparatus that can be used to prevent positional plagiocephaly in an infant by distributing loads otherwise borne by the head of the infant across a horizontal surface. While these systems may provide a benefit to infants, their specific design and structural engineering is based on the user of the pillow being an infant. Such pillows are not disclosed as providing a benefit for an adult or adolescent user suffering from GERD.

Most of the above described known systems focus on conditions relating to infants and/or the head-only region, without regard to addressing support of, or interaction with, the entire body. Other known systems include a pillow meant to accommodate an adult person (as a general body pillow) or an infant (to assist in supporting the infant in a seated position). Such systems, however, do not contemplate use of the pillow to alleviate symptoms relating to gastric or esophageal disorders. Additionally, such a pillow may not accommodate the necessary features specific for controlling or managing such disorders. Another known system includes a large, contoured body pillow to facilitate relief from persistent back and neck pain, respiratory and digestive disorders; however, the bulk of such a pillow is typically in excess of what is practical for use by a normal individual in a bed.

Thus, a need exists for therapeutic cushion systems and methods that can address the shortcomings of the known pillow systems identified above, and that can be used to manage and/or control symptoms associated with GERD and/or other medical conditions, while maintaining a practical, accommodating fit for the user.

SUMMARY

Apparatus and methods for providing therapeutic treatment for symptoms associated with GERD and/or other digestive disorders and/or other medical conditions are described herein. In some embodiments, an apparatus includes a support element that has a first end portion and a second end portion and a top surface disposed at an angle relative to a bottom surface of the support element. The second end portion has a height greater than the first end portion. A riser element is configured to be coupled proximate to the second end portion of the support element. A body element is configured to be disposed on at least one of the support element or the riser element. The body element has a first arm and a second arm connected together by an arc portion.

DETAILED DESCRIPTION

Figure 1:
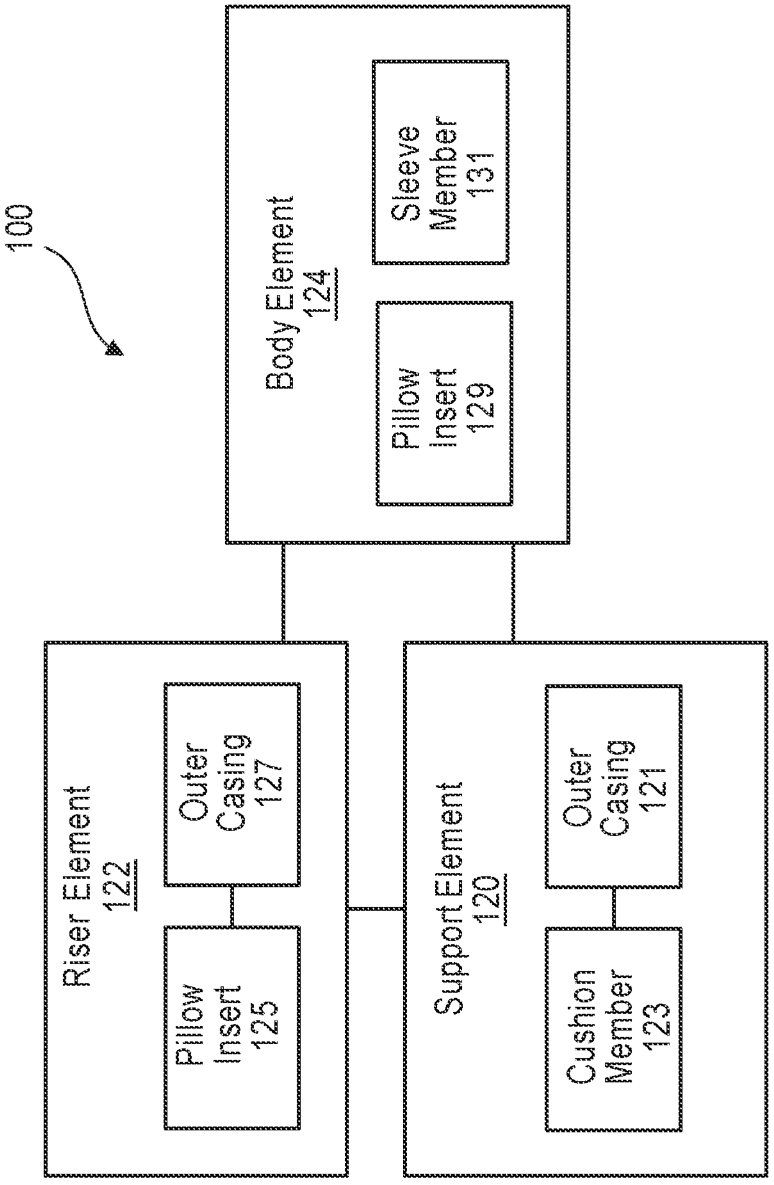
FIG. 1 is a schematic illustration of a therapeutic cushion system, according to an embodiment.

Apparatus and methods for providing therapeutic treatment for symptoms associated with GERD and/or other digestive disorders and/or other medical conditions or ailments are described herein. In some embodiments, a therapeutic cushion system as described herein can allow the user to sleep comfortably for an extended period of time in a substantially flat or an inclined right-side lateral decubitus (RLD) position, or a substantially flat or an inclined left-side lateral decubitus (LLD) position. In the inclined RLD position or the inclined LLD position, the therapeutic cushion system can serve to minimize, or eliminate, gastro-esophageal reflux. For example, the inclined RLD position can facilitate the emptying of the stomach into the duodenum, and the inclined LLD position can facilitate the reduction of reflux episodes.

In some embodiments, a method of using a therapeutic cushion system can include coupling a riser element of a cushion system to a support element of the cushion system such that the riser element and the support element collectively define a receiving portion between the riser element and the support element. The support element includes a top surface disposed at an angle relative to a bottom surface. A body element can be provided for placement on at least one of a portion of the support element or a portion of the riser element. The body element has a first arm and a second arm connected by an arc portion. The support element, riser element and body element are collectively configured to support a user in an inclined side position with the user's arm disposable within the receiving portion.

In some embodiments, an apparatus includes a support element having a first end portion, a second end portion and a top surface disposed at an angle relative to a bottom surface. The second end portion has a height greater than a height of the first end portion. A riser element is coupled to a body element such that the body element can be moved between a first position in which a first portion of the body element extends from a side portion of the riser element and a second portion of the body element is disposed substantially perpendicular to the first portion, and a second position in which the first portion of the body element is disposed on top of the riser element. The second portion of the body element configured to be disposed at least partially on the support portion when the riser element is disposed adjacent the second end portion of the body element.

In some embodiments, a method of treating symptoms associated with gastro-esophageal reflux disease (GERD) can include positioning a user's body on a therapeutic cushion system such that the user is disposed on the therapeutic cushion system in an inclined right-side lateral decubitus (RLD) position or inclined left-side lateral decubitus (LLD) position such that the user's pyloric sphincter is disposed at an elevation lower than an elevation of the user's esophageal sphincter. For example, the user can be disposed on a support member of a therapeutic cushion system having an inclined top surface of between 6 degrees and 30 degrees. In such an embodiment, the user can be positioned on the support member at an angle between about 5 and 20 degrees depending on factors, such as, for example, the density and/or deflection properties of the support member, and/or the weight of the user. The user's right arm or left arm can be positioned within a receiving portion of the therapeutic cushion system defined between the support member and a riser member of the therapeutic cushion system. The user of the therapeutic cushion system can be maintained in the inclined RLD position or LLD position for a sufficient time period to treat symptoms associated with GERD. In some embodiments, the time period is at least one hour. In some embodiments, the maintaining includes positioning a body element of the therapeutic cushion system proximate at least one of the riser element or the support element of the therapeutic cushion system.

In some embodiments, an apparatus includes a cushion system including a support element portion and a riser element portion. The support element portion has a first end portion and a second end portion and a top surface disposed at an angle relative to a bottom surface. The second end portion has a height greater than a height of the first end portion. The support element portion and the riser element portion collectively define a receiving portion configured to receive a user's arm therein and a side support member is configured to be disposed on a portion of the top surface of the support element portion. The side support member is configured to maintain the user in a side position on the cushion system.

In some embodiments, an apparatus includes a frame member and a sling member coupled to the frame member. The sling member defines an opening between a first portion and a second portion of the sling member. The first portion of the sling member is configured to support a user's head and the second portion of the sling member is disposed at an angle between about 6 and about 30 degrees relative to the first portion. The opening is configured to receive at least a portion of the user's arm therethrough. A pad member is disposed below the opening and configured to support at least a portion of the user's arm when disposed through the opening. The apparatus is configured to be supported on a support surface and support a user in an inclined side position.

In some embodiments, an apparatus includes a body element that has a first end portion including an arc portion, and a first arm and a second arm each extending away from the arc portion. The body element is configured to maintain a user in a side position. The body element includes an outer sleeve member and a pillow insert. The outer sleeve member includes stitching along an outer edge portion and is free of stitching along an inner edge portion.

In some embodiments, an apparatus includes a support element that includes a first end portion and a second end portion that has a height greater than a height of the first end portion. The support element also includes a top surface disposed at an angle relative to a bottom surface, a cushion portion, and an inflatable chamber configured to adjustably modify a firmness and/or height of the support element. The apparatus further includes a riser element. The riser element and the support element collectively define a receiving portion configured to receive a user's arm.

In some embodiments, a kit includes a cushion system that includes multiple support elements and multiple riser elements. Each support element from the multiple support elements includes a first end portion and a second end portion and a top surface disposed at an angle relative to a bottom surface. Each support element from the multiple support elements is selectively stackable on top of another of the support elements to vary at least one of a thickness or a firmness of a support portion of the cushion system. Each riser element from the multiple riser elements is selectively stackable on top of another riser element to vary at least one of a thickness or a firmness of a riser portion of the cushion system. The riser portion and the support portion are collectively configured to support a user in an inclined side position with an arm of the user disposed within a receiving portion defined between the support portion and the riser portion.

In some embodiments, a kit includes a cushion system that includes multiple stackable elements. Each stackable element from the multiple stackable elements includes a support element and a riser element. Each support element includes a first end portion and a second end portion and a top surface disposed at an angle relative to a bottom surface. At least one stackable element from the multiple stackable elements includes an opening defined between the support element and the riser element. Each stackable element from the multiple stackable elements is selectively stackable on top of another stackable element to vary at least one of a thickness or a firmness of cushion system.

In some embodiments, an apparatus includes a support element and a riser element. The support element has a first end portion and a second end portion and a top surface disposed at an angle relative to a bottom surface. The second end portion has a height greater than a height of the first end portion. The top surface is disposed at an angle between about 6 degrees and about 30 degrees relative to the bottom surface. The riser element includes straps configured to adjustably couple the riser element proximate to the second end portion of the support element.

FIG. 1 is a schematic illustration of a therapeutic cushion system according to an embodiment. A therapeutic cushion system (also referred to herein as "cushion system") 100 includes a support element 120 (also referred to herein as "wedge support" or "wedge element"), a riser element 122 and a body element 124 (also referred to herein as a "body pillow"). As described above, the cushion system 100 can be used, for example, for the treatment of symptoms associated with GERD and/or other digestive disorders and/or other medical conditions. For example, the cushion system 100 can allow the user to sleep for an extended period of time in an inclined right-side lateral decubitus (RLD) position (as described in more detail below), which can minimize, or eliminate, gastro-esophageal reflux while facilitating the emptying of the stomach into the duodenum, or an inclined left-side lateral decubitus (LLD) position, which can facilitate the reduction of reflux episodes.

The support element 120 can have a variety of different shapes and/or sizes. In some embodiments, the support element has a wedge shape (e.g., in side view). For example, the support element 120 can include an angled top surface (not shown in FIG. 1). In some embodiments, the angled top surface can be disposed, for example, at an angle between 6 degrees and 30 degrees relative to a bottom surface of the support member 120. Said another way, the support member 120 can have a height dimension that varies from a caudad end portion (also referred to herein as "first end portion") of the support element 120 to a cephalad end portion (also referred to herein as "second end portion") of the support element 120 (e.g., nearest the user's head), with the greatest height dimension being, for example, on the cephalad end portion of the support element 120. The support element 120 can include a concave or indented portion (not shown in FIG. 1) disposed on the top surface of the support element 120, for example, at or near the cephalad end as described in more detail below with reference to specific embodiments. The concave portion can be used, for example, to relieve pressure in the user's downside axilla when the user is lying in a lateral decubitus position on the cushion system 100.

The support element 120 can also have a shape that can promote an appropriate torso angle for a user to comfortably maintain a lateral decubitus position on the support element 120 during use. For example, the support element 120 can include a curved exterior portion that can help increase the comfort of a user lying in a lateral decubitus position for an extended period of time without uncomfortable pressure or pain in a downside shoulder or arm. In some embodiments, the support element 120 can include beveled corners on the cephalad end of the support element 120 that can accommodate additional ergonomic arm and elbow placement during use of the cushion system 100.

The support element 120 can be a variety of different lengths, widths and/or thicknesses. For example, in some embodiments, the support element 120 can have a length that is shorter than a typical sized bed, such that the user's legs extend at least partially off the support element 120 during use. Such a support element 120 can be referred to as having a torso length. In some embodiments, the support element 120 can be the length of a typical bed and can be referred to herein as having a bed length. In some embodiments, the support element 120 can include multiple portions that can be stacked together.

The support element 120 can include an outer casing 121 and a cushion member 123 that can be disposed within the outer casing 121. The outer casing 121 of the support element 120 can be formed with one or more materials. For example, in some embodiments, the outer casing 121 can include a top portion on which the user contacts during use of the cushion system 100 that is formed with a first material, and a bottom portion that contacts the support surface (e.g., top surface of a bed) on which the support element 120 is disposed during use that is formed with a second material. The top portion (e.g., the top surface) of the outer casing 121 can be formed with, for example, a four-way stretch material that is highly conformable, such as, for example, cotton/spandex, nylon/spandex, polyester/spandex or blends of any blend of cotton, nylon or polyester combined with spandex or elastane, and the bottom portion can be formed with a more robust material, such as, for example, poplin, canvas, gabardine or twill made using any combination of cotton, polyester or nylon, to provide durability.

The outer casing 121 of the support element 120 can include an opening through which the cushion member 123 can be inserted and can include a fastener such as, for example, a zipper, buttons, snaps, flaps, hook and loop fasteners or other suitable coupling method to close or partially close the opening. The cushion member 123 can be formed with one or more foam materials, such as, for example, polyurethane or rubber latex, or visco-elastic polyurethane (e.g., memory foam). In some embodiments, the cushion member 123 can include multiple different foam materials each having a different density and/or a different deflection property. In alternative embodiments, the cushion member 123 can include one or more inflatable chambers. In other alternative embodiments, the cushion member 123 can include a filler material, such as a polyester material, disposed within an inner casing. In some embodiments, the support element 120 can include multiple cushion members 123. For example, multiple cushion members 123 can be stacked together within the outer casing 121.

The riser element 122 can be removably coupled to the support element 120. For example, the riser element 122 can be coupled to the support element 120 near or proximate the second end portion (i.e., cephalad end portion) of the support element 120 and can be used to support a neck and head of a user. The riser element 122 can be coupled to the support element 120 with a variety different coupling methods. For example, in some embodiments, the riser element 122 can include straps along lateral side edges of the riser element 122 that can be coupled to the support element 120 along lateral side edges of the support element 120. The straps can include a coupling portion that can be coupled to a mating coupling portion disposed on the support element 120. For example, the coupling portion on the support element 120 can be buttons, and the coupling portion on the riser element 122 can be holes or openings configured to be coupled to the buttons. In alternative embodiments, other types of coupling portions can be included. For example, the riser element 122 can be coupled to the support element 120 with hook and loop fasteners, snaps, strings or ties, zippers, or any other suitable coupling method. In another alternative embodiment, the straps can be on the support element 120 and can be coupled to the riser element 122. In another alternative embodiment, the support element 120 and the riser element 122 can be formed as or incorporated within a single, uniform component.

In some embodiments, the straps can include multiple coupling portions such that the riser element 122 and the support element 120 can be adjustably coupled together. For example, straps on the riser element 122 (as described above) can include multiple openings disposed at different locations along a length of the straps that can be selectively coupled to buttons on the support element 120. In alternative embodiments the support element can include multiple coupling portions to which the coupling portions on the straps can be selectively coupled. The adjustability of the position of the riser element 122 relative to the support element 120 allows the user to adjust an angle of the user's head and/or neck when supported on the riser element 122. In addition, the adjustability of the riser element 122 relative to the support element 120 can compress the riser element 122 to change or affect, for example, a height of the user's head when supported on the riser element 122. Thus, a user can position the riser element 122 to achieve a desired position and/or compression of the riser element 122 and/or to accommodate users having different sized arms.

In some embodiments, the riser element 122 can be coupled to the support element 120 such that a receiving portion is formed between the second end portion of the support element 120 and an end portion of the riser element 122. The receiving portion can be, for example, an opening, void, cavity, pocket, space or gap, etc. between the support element 120 and the riser element 122, in which a user can insert at least a portion of the user's arm. The receiving portion can be defined by flexible or conformable portions of the cushion system 100 such that the size of the receiving portion can vary as the user inserts an arm. For example, in some embodiments, a portion of the support member 120 can contact a portion of the riser element 122 such that as the user inserts an arm into the receiving portion, the user moves or flexes a portion of the support element 120 and/or a portion of the riser element 122.

During use of the cushion system 100, a user can place a downside shoulder and arm within the receiving portion when lying in a side position. Insertion of the user's arm within the receiving portion between the support element 120 and the riser element 122 can also mitigate the tendency of the user from sliding downward on the angled top surface of the support element 120 and can help stabilize the user in the lateral or side position during use of the cushion system 100. A position of the user's arm and shoulder can be adjusted within the receiving portion between the support element 120 and the riser element 122, such that user's downside axilla rests within the concave portion of the support element 120.

The riser element 122 can include a pillow insert 125 that can be disposed within an outer casing 127. The outer casing 127 can include an opening through which the pillow insert 125 can be inserted, and can include a fastener such as, for example, a zipper, buttons, snaps, flaps, hook and loop fasteners or other suitable coupling method to close or partially close the opening. The outer casing 127 can be formed with the same or similar materials as the outer casing 121 described above for the support element 120. For example, the outer casing 127 can include a first portion formed with a four-way stretch material and a second portion formed with a more robust material such as described for support element 120. The pillow insert 125 can include an inner casing (not shown in FIG. 1) that can contain a filler material (not shown in FIG. 1) therein. The filler material can be, for example, a clustered polyester fiber material, such as, for example, any combination of polyester fibers, clustered polyester fiber, down alternative made from synthetic fibers, polystyrene beads/pellets, shredded foam, or down feathers. The inner casing of the pillow insert 125 can also be formed with a four-way stretch material as described above for the outer casing 127. The inner casing of the pillow insert 125 can also include an opening through which the filler material can be inserted, and can include a fastener such as, for example, a zipper, buttons, snaps, or other suitable coupling method to close or partially close the opening. In alternative embodiments, the inner casing may not include such an opening. For example, after the filler material has been inserted into the inner casing, the inner casing can be closed with, for example, stitching.

The four-way stretch material of the outer casing 127 of the riser element 122 described above, in conjunction with the pillow insert 125 having an inner casing formed with the four-way stretch material and having a clustered polyester fiber filler material can allow the riser element 122 to be malleable and shape-retaining. For example, in such an embodiment, the user can conform the riser element 122 to a desired thickness and/or shape for that user's needs and preference. For example, the user can conform or adjust the riser element 122 to form cavities or to otherwise fit or conform to the user's face, ear, arm, etc. The conformed shape can be maintained for an extended time period and/or until the user disperses the filler material of the pillow insert 125 by, for example, shaking or fluffing the riser element 122.

The body element 124 can include a pillow insert 129 that can be disposed within a sleeve member 131. The sleeve member 131 can include an opening or openings through which the pillow insert 129 can be inserted, and can include a fastener such as, for example, a zipper, buttons, snaps, or other suitable coupling method to close or partially close the opening(s). The pillow insert 129 can be formed the same as or similar to the pillow insert 125 described above for the riser element 122. For example, the pillow insert 129 can include an inner casing (not shown in FIG. 1) containing a filler material (not shown in FIG. 1). The filler material can be, for example, a clustered polyester fiber material, such as, for example, the materials described above for the riser element 122. The inner casing of the body element 124 can be formed with, for example, a four-way stretch material as described above for the inner casing of the riser element 122. The sleeve member 131 can be formed with, for example, a four-way stretch material as described above for the riser element 122 and the support element 120, or can be constructed of a two-way stretch material, such as, for example, jersey or interlock. Thus, as described above for the riser element 122, the body element 124 can also be manipulated, conformed, adjusted, dispersed, etc., to conform to a desired shape and/or thickness. The inner casing of the pillow insert 129 can also include an opening through which the filler material can be inserted, and can include a fastener such as, for example, a zipper, buttons, snaps, or other suitable coupling method to close or partially close the opening. In alternative embodiments, the inner casing may not include such an opening. For example, after the filler material has been inserted into the inner casing, the inner casing can be closed with, for example, stitching.

The body element 124 can have a variety of different shapes and be a variety of different sizes. For example, in some embodiments, the body element 124 can include an arc portion at a cephalad end connecting a first arm and a second arm of the body element 124. In some embodiments, the arc portion can have a curvature of, for example, substantially 180 degrees. In other embodiments, the arc portion can have a different curvature, for example, between about 30 degrees and 180 degrees. In some embodiments, the first arm and the second arm can extend parallel to each other away from the arc portion. In some embodiments, the first arm of the body element 124 can have a length that is about half a length of the second arm of the body element 124. In some embodiments, the first arm can be substantially the same length as the second arm.

The body element 124 can be reconfigurable into a variety of different shapes and configurations for use on the support element 120 and/or riser element 122 as described in more detail below. Optionally, in some embodiments, the body element 124 can be used independently of the support element 120 and the riser element 122. In some embodiments, the body element 124 and the riser element 122 can be integrally formed or incorporated within a single component. In such an embodiment, the body element 124 can be moved from a first position in which the body element 124 is unfolded and a second configuration in which the body element 124 is folded and such that a portion of the body element 124 is disposed on a portion of the riser element 122. In some embodiments, the body element 124 and the riser element 122 can be coupled by a flexible hinge such that the body element 124 can be moved between the folded configuration and the unfolded configuration. In some embodiments, the flexible hinge can be formed with, for example, a fabric material.

The sleeve member 131 of the body element 124 can be formed in a tubular shape such that the pillow insert 129 can be inserted therein through an opening defined on one end of the sleeve member 131. The sleeve member 131 can include stitching along a single outer edge such that the body element 124 can be free of stitching along an inner edge portion of the sleeve member 131 where a user typically contacts the sleeve member 131 during use. Such an embodiment can provide increased comfort for the user as many known body pillows that have such inner stitching can tend to become taut when tension is applied, resulting in an awkward and potentially painful fit for the user. In addition, the stitching being along an outer edge portion the sleeve member 131 can eliminate or reduce distortion of the body element 124 during use, which can further provide improved feel and comfort to the user. In some embodiments, stitching can be included on the body element 124 at additional targeted areas of the body element 124 as described, for example, with reference to FIGS. 26-28. The inner casing of the pillow insert 129 of the body element 124 can also be constructed in a tubular shape in the same or similar manner as the sleeve member 131. For example, the inner casing of pillow insert 129 can include stitching along an outer edge of the inner casing, and be free of stitching along an inner edge.

As described above, the user can manipulate, conform, disperse, etc., the clustered polyester fiber filler material within the body element 124 and/or the riser element 122 to create cavities or bulges to accommodate specific body parts and/or portions to accommodate the user's needs and/or preferences. The shape and/or cavity formed by the user can be maintained for an extended time period and/or until the user disperses the filler material of the riser element 122 and/or the body element 124 by, for example, shaking the riser element 122 and/or body element 124. The combination of the four-way stretch material and clustered polyester filler material can allow for the redistribution of the filler material in an equalized manner throughout the body element 124 and/or riser element 122. The reconfigurable filler material of the body element 124 and/or the riser element 122 can also minimize undesirable and irreversible migration of the filler material, which can occur in some known cushion systems due to their non-pliable stuffing and non-stretch material. In addition, the clustered polyester fiber filler material of the body element 124 and/or the riser element 122 can be machine washed and dried without causing clumping of the filler material. The combination of the filler material and the four-way stretch outer casing 127 and inner casing of pillow insert 125 of the riser element 122, and sleeve member 131 and inner casing of the pillow insert 129 of the body element 124, provides for post-laundering redistribution of the filler material to substantially its original state.

In some embodiments, the cushion system 100 can include a side support member or portion (not shown in FIG. 1) that can be used as an alternative to the body element 124. In some embodiments, the riser element 122 and the support element 120 are formed as single component and define a receiving portion (e.g., space or opening) in which the user's arm can be disposed during use. In some embodiments, the cushion system 100 can be implemented in an adjustable bed, such as, for example, a bed used in a medical facility. In some embodiments, the cushion system 100 can be implemented with a sling-type support element and riser element. For example, in such an embodiment, the sling-type support element and riser element can include a sling portion coupled to a frame member. In some such embodiment, support legs or feet and/or or wheels, such as castors, can be coupled to the frame member. In some embodiments, the cushion system 100 can include one or more inflatable chambers that can allow a user to adjust a height and/or firmness of the cushion system 100.

In some embodiments, the cushion system 100 can include stackable elements. For example, in some embodiments, the support element 120 can include multiple separate stackable support portions each having a cushion member and an outer casing, and multiple stackable riser elements 122 each having a cushion member or pillow insert within an outer casing. In some embodiments, the cushion system 100 can include multiple stackable elements that each include a support element and riser element formed as a single component. Example embodiments of cushion systems including such stackable elements are described in more detail below.

To use the cushion system 100, a user can removably couple the riser element 122 to the support element 120 as described above. The user can place the riser element 122 and the support element 120 on a support surface (e.g., a top surface of a bed) either before or after being coupled together. The body element 124 can be positioned on the support element 120 or with a portion of the body element 124 on the support element 120 and a portion on the riser element 120. The user can then lie on the assembled cushion system 100 in a RLD or LLD position such that the user is aligned in approximately a center portion of the support element 120. The user inserts the user's right or left arm beneath the body element 124 and within the receiving portion formed between the support element 120 and the riser element 122. Optionally, the user can adjust the position of the user's right or left arm and shoulder within the receiving portion between the support element 120 and the riser element 122, such that user's downside axilla rests within the centered concave portion of the support element 120.

With the user's arm within the space between the support element 120 and the riser element 122, the cushion system 100 can maintain the user in the inclined RLD or LLD position. Thus, the tendency of the user to slide down the angled portion of the support member 120 can be reduced or eliminated. Further illustrations and details of how a user can be positioned on the cushion system 100 are described below. In some embodiments, the support element 120 and the riser element 122 can be used without the use of the body element 124. In some embodiments, use of only the body element 124 may be desirable.

As described above, the cushion system 100 can be used as a method of treatment for GERD and/or other digestive disorders. To use the cushion system 100 for this purpose, the user can follow the steps described above for being positioned on the cushion system 100 in an inclined RLD position or an inclined LLD position. For example, in the inclined RLD position, the therapeutic cushion system 100 can serve to minimize, or eliminate, gastro-esophageal reflux while it facilitates the emptying of the stomach into the duodenum. For example, in the inclined RLD position, the exit valve (i.e., the pyloric sphincter) of the user's stomach will be positioned substantially at a bottom right side of the user's abdomen below or at an elevation lower than an elevation of the user's esophageal sphincter. Thus, when the user remains in the inclined RLD position for a sufficient period of time, the stomach contents of the user can drain out of the stomach and into the duodenum. For example, a time period between about 1-4 hours may be needed to empty the contents of the stomach into the duodenum such that the user feels relief from symptoms associated with GERD and/or other digestive disorders. The time frame can vary depending on various factors such as for example, the user's overall health, other conditions the user may have such as diabetes, or gastroparesis, or the type and amount of food the user has consumed prior to resting on the cushion system, etc. In another example, in the inclined LLD position, a reduction in the frequency of reflux episodes of the user can result.

FIGS. 2-25 illustrate a therapeutic cushion system and methods of using the therapeutic cushion system, according to an embodiment. A therapeutic cushion system 200 (also referred to herein as a "cushion system") includes a support element 220, a riser element 222 and a body element 224. As described above for cushion system 100, the cushion system 200 can be used, for example, for the treatment of symptoms associated with GERD and/or other digestive disorders.

Figure 7:
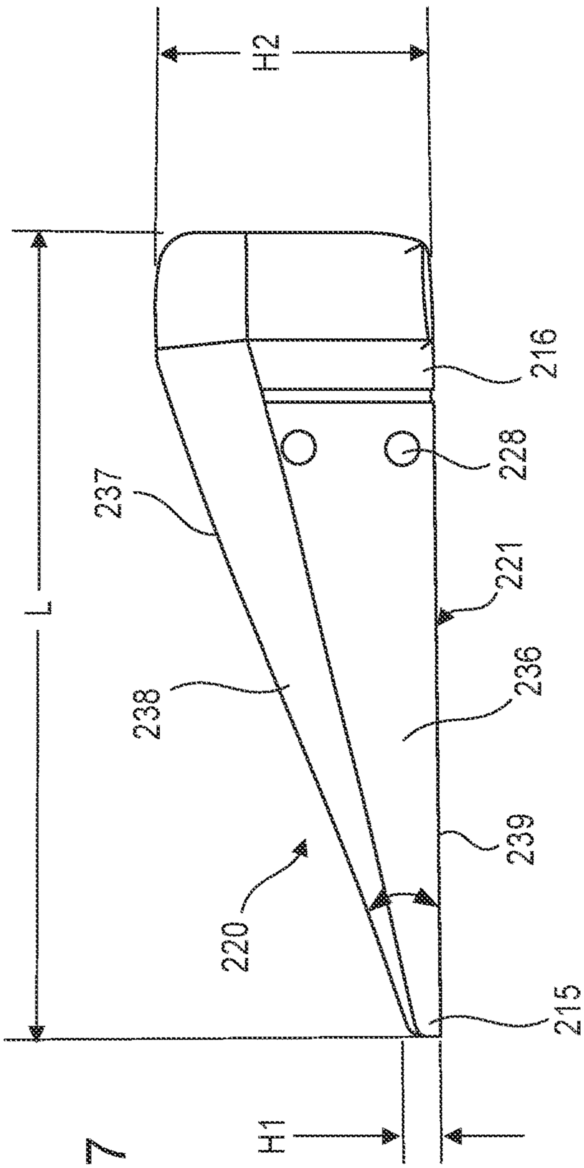
FIG. 7 is a side view of the support element of the therapeutic cushion system of FIG. 2.

The support element 220 can have a variety of different shapes and/or sizes. In this embodiment, the support element 220 has a substantially wedged shape as shown in the side view of, for example, FIG. 7. Specifically, the support element 220 includes a top surface 237 that is disposed at an angle θ relative to a bottom surface 239 as shown in FIG. 7. In some embodiments, the angle θ can be, for example, between about 6 degrees and about 30 degrees. Said another way, the support element 220 has a height H1 at a first end portion 215 of the support element 220 and a height H2 at a second end portion 216 of the support element 220 and the height H2 is greater than the height H1 as shown, for example, in FIG. 7. The height H1 can be for example, up to 2 inches, and the height H2 can be between, for example, about 6 inches and 14 inches. The support element 220 also has a length L that can be, for example, between about 20 inches and 40 inches, such that the support element 220 has a torso length (as described above) and can promote an appropriate torso angle for user to comfortably maintain a lateral decubitus position on the support element 220 during use.

The support element 220 also includes a concave portion 230 (see, e.g., FIGS. 4, 5, 8 and 9) disposed on the top surface 237 of the support element 220. As described above, the concave portion 230 can be used to relieve pressure in the user's downside axilla when the user is lying in a lateral decubitus position on the cushion system 200. The support element 220 also includes curved exterior portions that can help increase the comfort of a user lying in the lateral decubitus position for an extended period of time without uncomfortable pressure or pain in a downside shoulder or arm. In this embodiment, the support element 220 also includes beveled corners 233 on the second end portion of the support element 220 (see, e.g., FIGS. 4 and 6) that can accommodate additional ergonomic arm and elbow placement during use of the cushion system 200.

Figure 9:
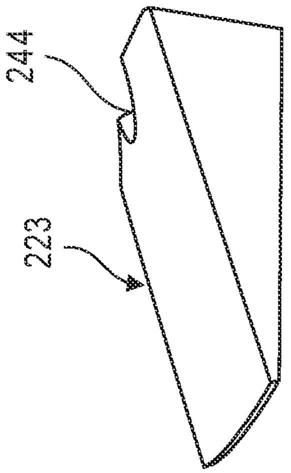
FIG. 9 is a side perspective view of the cushion member of the support element of FIG. 8.
Figure 8:
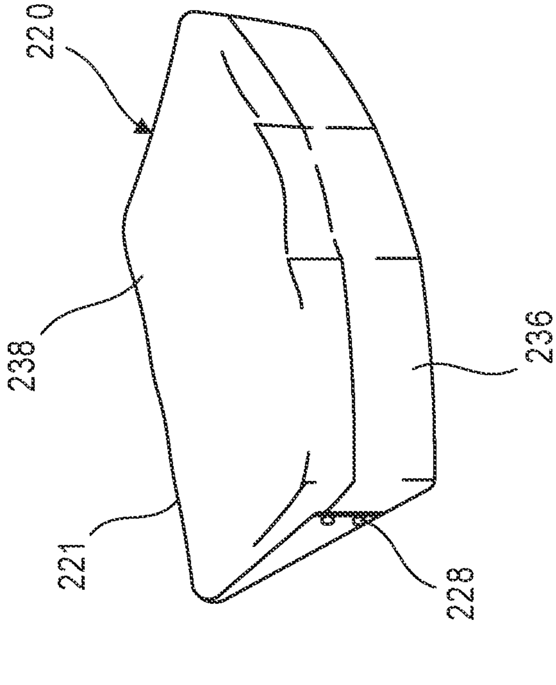
FIG. 8 is a front perspective view of the support element of the therapeutic cushion system of FIG. 2.
Figure 10:
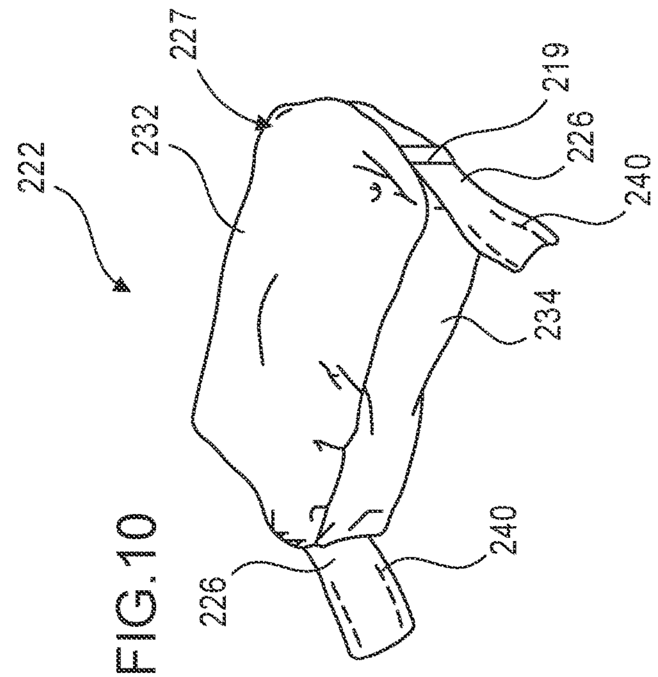
FIG. 10 is a front perspective view of the riser element of the therapeutic cushion system of FIG. 2.

The support element 220 includes an outer casing 221, as shown, for example, in FIGS. 4 and 6-8, and a cushion member 223, as shown in FIG. 9 that can be disposed within the outer casing 221. The outer casing 221 of the support element 220 can be formed with one or more materials as described above for support element 120. For example, the outer casing 221 can include a top portion 238 (see, e.g., FIGS. 7-8) on which the user contacts during use of the cushion system 200 that is formed with a first material, and a bottom portion 236 that contacts the support surface (e.g., top surface of a bed) on which the support element 220 is disposed during use that is formed with a second material that is different than the first material. The top portion of the outer casing 221 can be formed with, for example, a four-way stretch material and the bottom portion can be formed with a more robust material as described above for support element 120. The top portion 238 and the bottom portion 236 can be coupled together with, for example, stitching. In this embodiment, the support element 220 includes buttons 228 on lateral side edges of the support element 220 (see., e.g., FIGS. 2, 3 and 6-8) that can be used to removably couple the riser element 222 to the support element 220 as described in more detail below.

The outer casing 221 of the support element 120 can also include an opening (not shown) through which the cushion member 223 can be inserted and can include a fastener (not shown) such as, for example, a zipper, buttons, snaps, flaps, or other suitable coupling method to close or partially close the opening. In this embodiment, the cushion member 223 is formed with, for example, one or more foam materials as previously described. The cushion member 223 includes a cavity 244 defined on top surface portion of the cushion member 223, as shown in FIG. 9. The cavity 244 forms the concave portion 230 of the support element 220 when the cushion member 223 is disposed within the outer casing 221.

Figure 11:
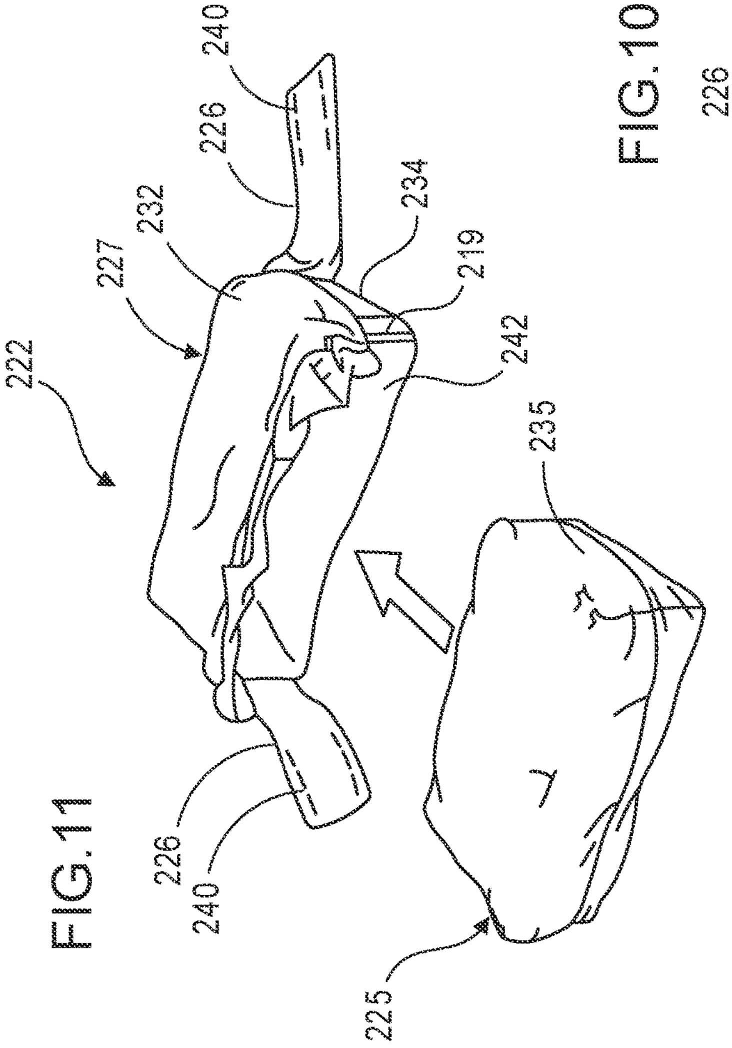
FIG. 11 is a partially unassembled view of the riser element of FIG. 10.
Figure 12:
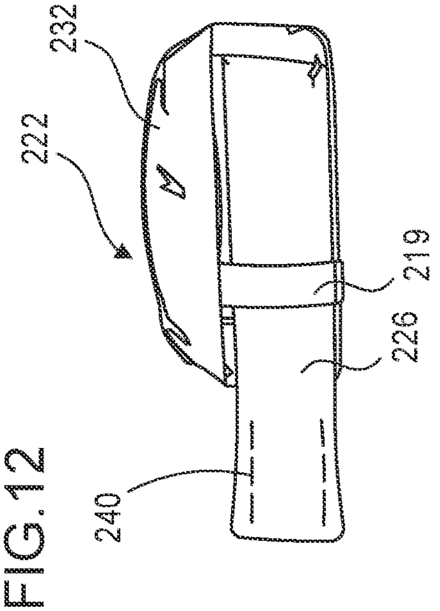
FIG. 12 is a side view of the riser element of FIG. 11.

The riser element 222 includes a pillow insert 225 that can be disposed within an outer casing 227. The outer casing 227 can include an opening 242 through which the pillow insert 225 can be inserted as shown in FIG. 11. The outer casing 227 can include a fastener (not shown) such as, for example, a zipper, buttons, snaps, or other suitable coupling method to close or partially close the opening, as previously described for cushion assembly 100. The outer casing 227 can be formed with the same or similar materials as the outer casing 221 described above for the support element 220. For example, the outer casing 227 can include a first portion 232 formed with a four-way stretch material and a second portion 234 formed with a more robust material. The pillow insert 225 can include an inner casing 235 that can be formed with a four-way stretch material as described above and that can contain a filler material (not shown) therein. The filler material can be, for example, a clustered polyester fiber material, such as, for example, a material described above for pillow insert 125. The inner casing 235 of the pillow insert 225 can also include an opening (not shown) through which the filler material can be inserted, and can include a fastener (not shown) such as, for example, a zipper, buttons, snaps, or other suitable coupling method to close or partially close the opening. In alternative embodiments, the inner casing 235 may not include such an opening. For example, after the filer material has been inserted into the inner casing 235, the inner casing 235 can be closed with, for example, stitching.

As described above for cushion assembly 100, the four-way stretch material of the outer casing 227 of the riser element 222, in conjunction with the four-way stretch material of the inner casing 235 and the clustered polyester fiber filler material of the pillow insert 225 can allow the riser element 222 to be malleable and shape-retaining. For example, the user can conform the riser element 222 into a desired thickness and/or shape and/or form cavities or bulges to meet that user's needs and preference, as previously described.

Figure 2:
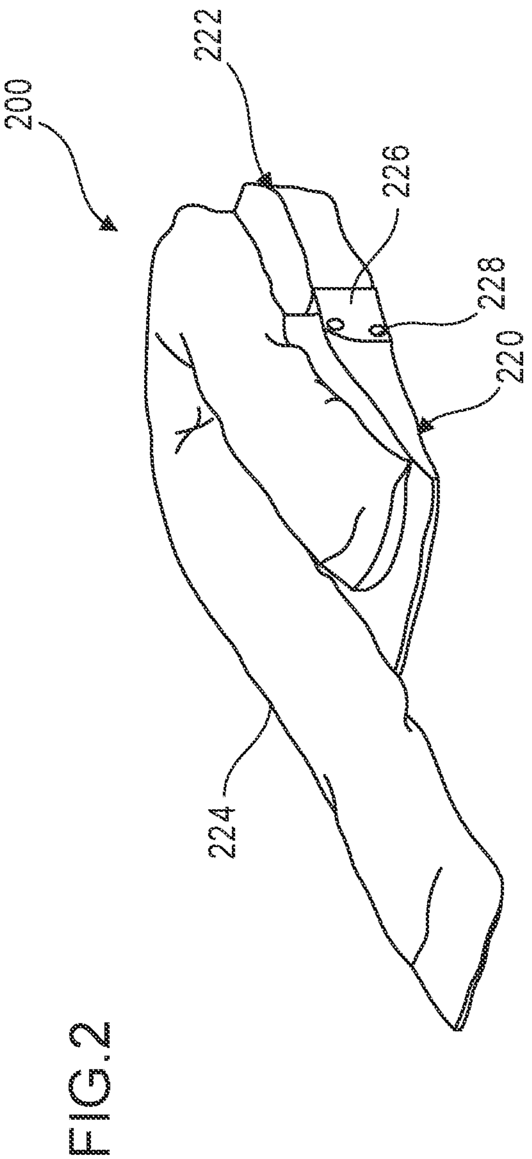
FIG. 2 is a perspective view of a therapeutic cushion system, according to an embodiment.
Figure 3:
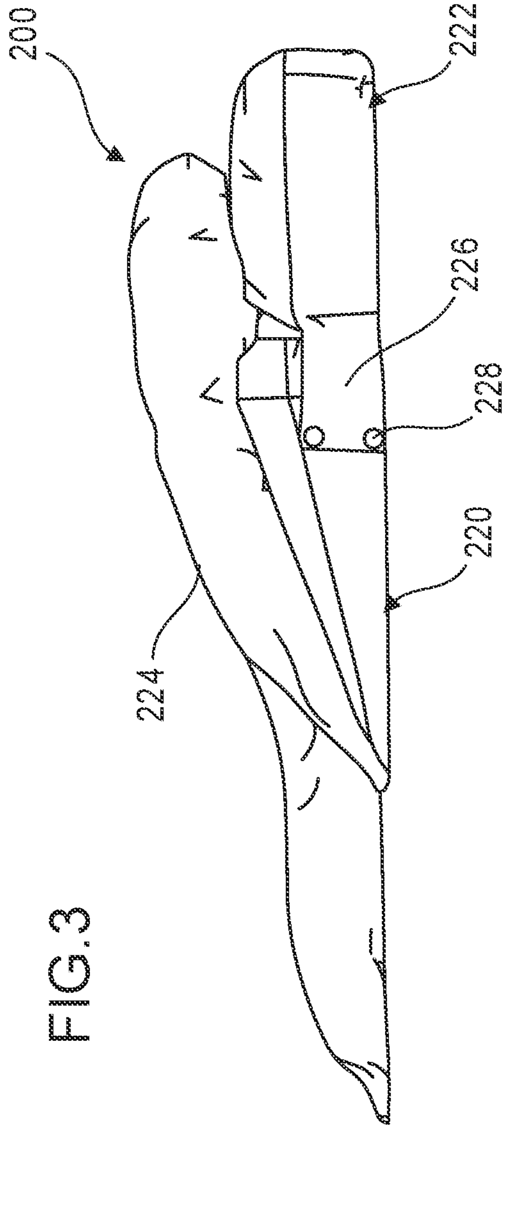
FIG. 3 is a side view of the therapeutic cushion system of FIG. 2.
Figure 4:
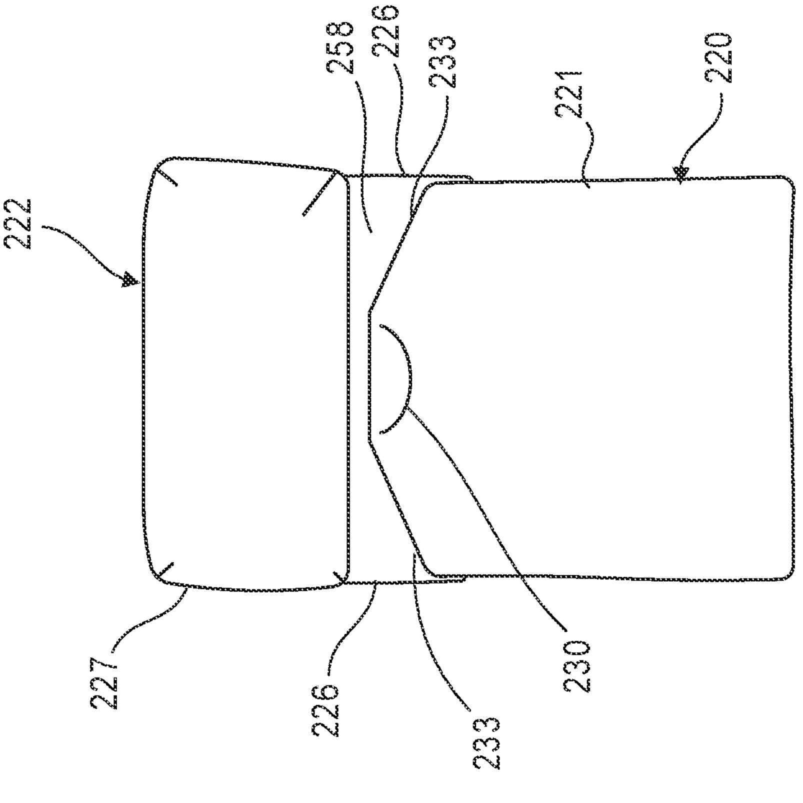
FIG. 4 is top view of the riser element and support element of the therapeutic cushion system of FIG. 2.
Figure 6:
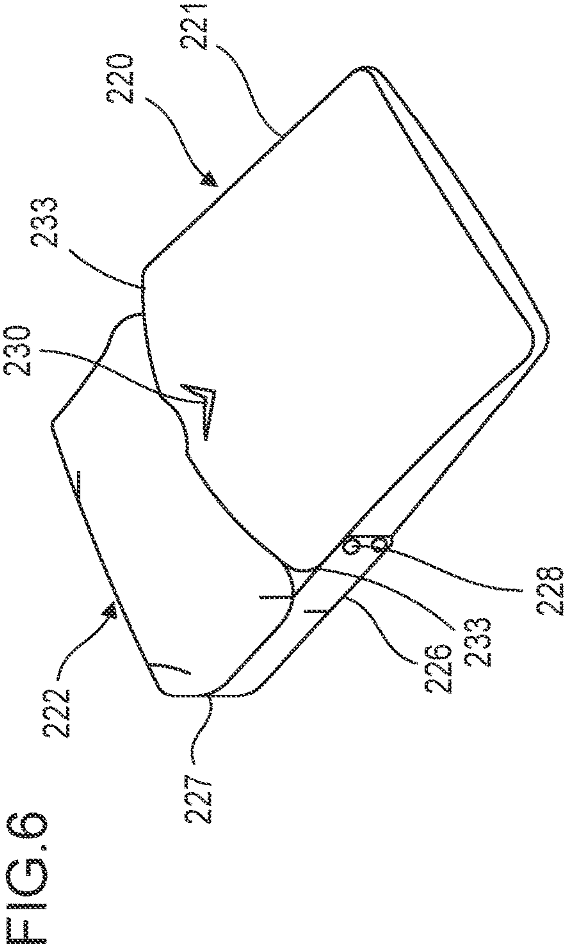
FIG. 6 is a side perspective view of the riser element and support element of the therapeutic cushion system of FIG. 2.

The riser element 222 can be removably coupled to the support element 220 as shown, for example in FIGS. 2-4. For example, in this embodiment, the riser element 222 includes straps 226 along lateral side edge portions of the riser element 222 and the straps 226 each include multiple sets of button holes 240 that can be selectively coupled to the buttons 226 on the support element 220. The riser element 222 can also include bands 219 (see, e.g., FIGS. 10-12) that can be used to hold the straps 226 against the lateral side edge of the riser element 222. In this manner, the riser element 222 and the support element 220 can be adjustably coupled together to meet a user's particular needs, as described in more detail below. For example, as previously described, the riser element 222 can be coupled to the support element 220 such that a receiving portion 258 (e.g., space, opening, void, pocket, etc.) (see, e.g., FIG. 4) is defined between the second end portion 216 of the support element 220 and the riser element 222. A user can place a downside shoulder and arm within the receiving portion 258 when lying in a RLD or LLD position. The straps 226 can be formed with, for example, the same material as the bottom portion 234 (e.g., poplin, canvas, gabardine or twill made using any combination of cotton, polyester or nylon) of the riser element 222 to provide strength to the straps 226. Similarly, the buttons 228 of the support element 220 can be disposed on the bottom portion 236 of the support element 220, which can be formed with the same material as the bottom portion 234 of the riser element 222.

Figure 5:
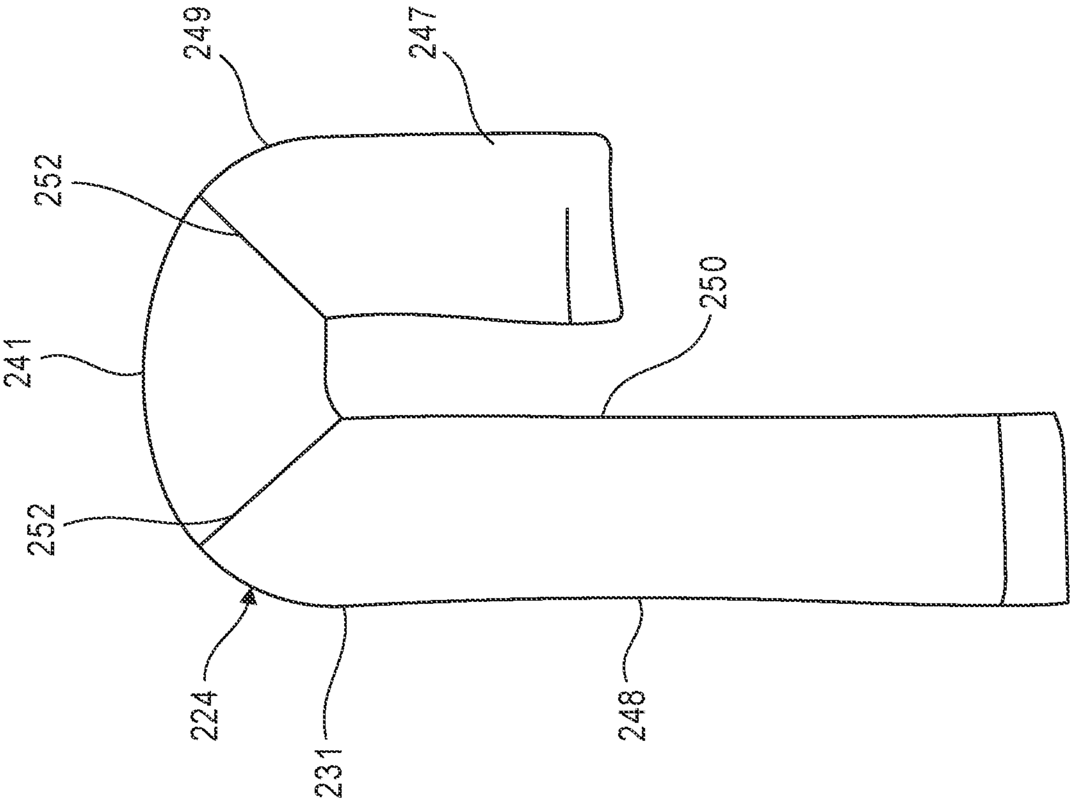
FIG. 5 is a top view of the body element of the therapeutic cushion system of FIG. 2.
Figure 13:
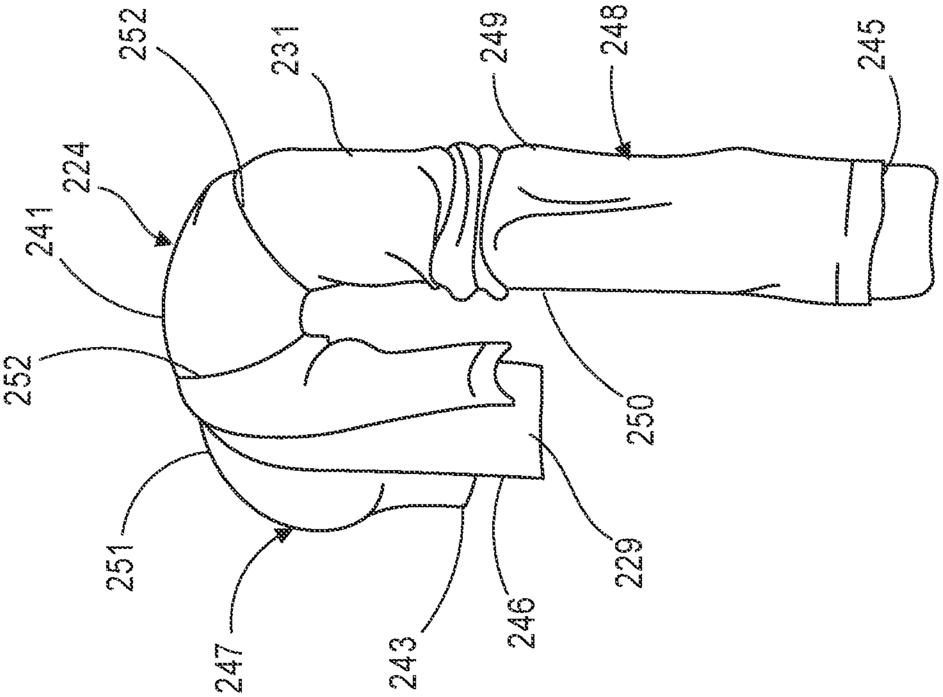
FIG. 13 is a top view of the body element of the therapeutic cushion system of FIG. 2.

As shown in FIGS. 5 and 13, in this embodiment, the body element 224 includes an arc portion 241 that has a substantially 180 degree curvature at a cephalad end portion, a first arm 247 and second arm 248 each extending from the arc portion 241 in a caudad direction. In this embodiment, the first arm 247 has a length that is shorter than a length of the second arm 248. For example, the first arm 247 can have a length, for example, about half a length of the second arm 248. The body element 224 is reconfigurable into a variety of different shapes for use on the support element 220 and/or riser element 222 as described in more detail below. Optionally, in some embodiments, the body element 224 can be used independently of the support element 220 and the riser element 222.

The body element 224 includes a pillow insert 229 (see e.g., FIG. 13) that can be disposed within a sleeve member 231. The sleeve member 231 can be formed in a tubular shape and includes a first opening 243 and a second opening 245 through which the pillow insert 229 can be inserted. The opening 243 can include a fastener (not shown) such as, for example, a zipper that can be used to close the opening 243. The fastener can also extend along an outer edge of the sleeve member 231 such that a portion 251 of the sleeve member 231 along the outer edge portion 249 can be opened to aid in insertion and removal of the pillow insert 229, as shown in FIG. 13. Optionally, a second fastener (not shown) can be included that can be used to open and close the opening 245 in a similar manner.

The tubular shape of the sleeve member 231 can be formed, for example, by sewing or stitching along an outer edge portion 249 of the sleeve member 231. Thus, the sleeve member 231 can be free of stitching along an inner edge portion 250 of the sleeve member 231 where a user typically contacts the sleeve member 231 during use. As described above, having the inner edge portion 250 free of stitching can provide increased comfort for the user and can eliminate or reduce distortion of the body element 224 during use. In this embodiment, the sleeve member 231 also includes stitching features 252 that extend at an angle from the inner edge portion 250 to the outer edge portion 249. The stitching 252 can extend, for example, at a 45 degree angle.

The pillow insert 229 can be formed the same as or similar to the pillow insert 225 described above for the riser element 222. For example, the pillow insert 229 can include an inner casing 246 that can contain a filler material (not shown). The filler material can be, for example, a clustered polyester fiber material, as previously described for pillow insert 129. The inner casing 246 can be formed with, for example, a four-way stretch material as described above. The sleeve member 231 can be formed with, for example, a four-way stretch material as described above for the riser element 222 and the support element 220, or alternatively can be formed with, for example, a two-way stretch material as described for sleeve member 131. Thus, as described above for the riser element 222, the body element 224 can also be manipulated, conformed, adjusted, dispersed, etc., to conform to a desired shape and/or thickness. Although not shown, the inner casing 246 of the pillow insert 229 can also include an opening through which the filler material can be inserted, and can include a fastener (not shown) such as, for example, a zipper, buttons, snaps, or other suitable coupling method to close or partially close the opening. In alternative embodiments, the inner casing 246 may not include such an opening. For example, after the filler material has been inserted into the inner casing 246, the inner casing 246 can be closed with, for example, stitching.

Figure 14A:
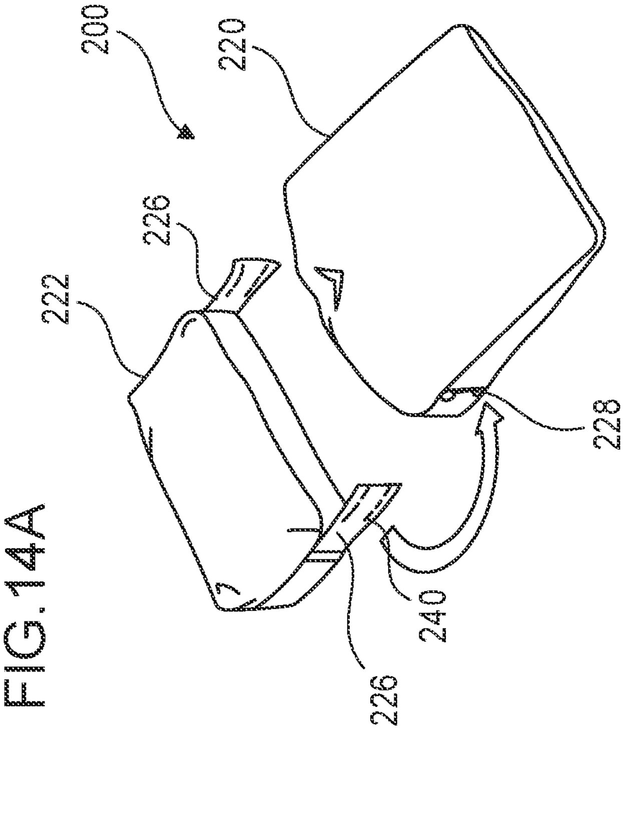
FIGS. 14A and 14B illustrate a method of assembling the therapeutic cushion system of FIG. 2.
Figure 14B:
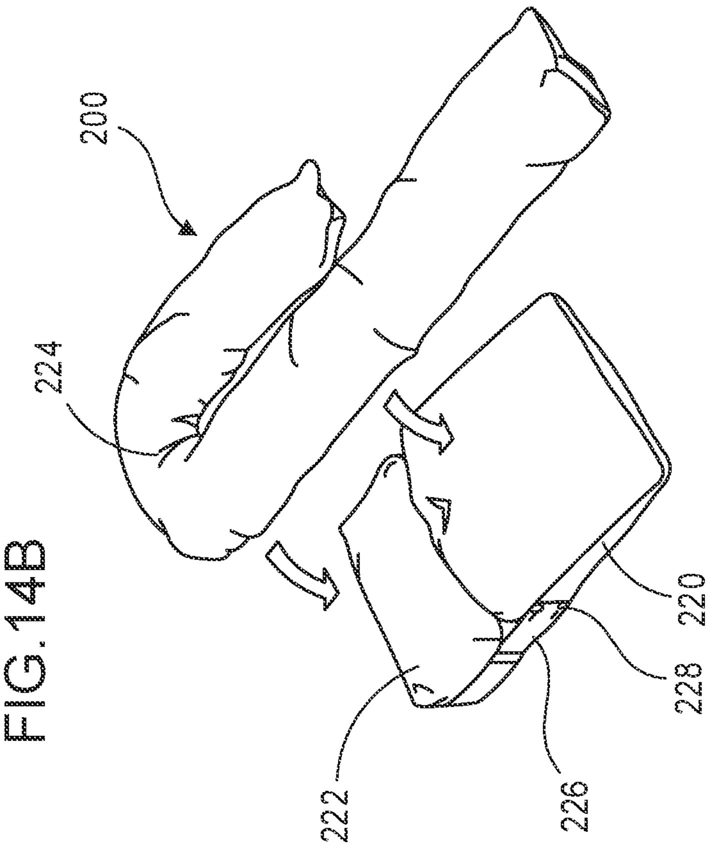
Figure 15A:
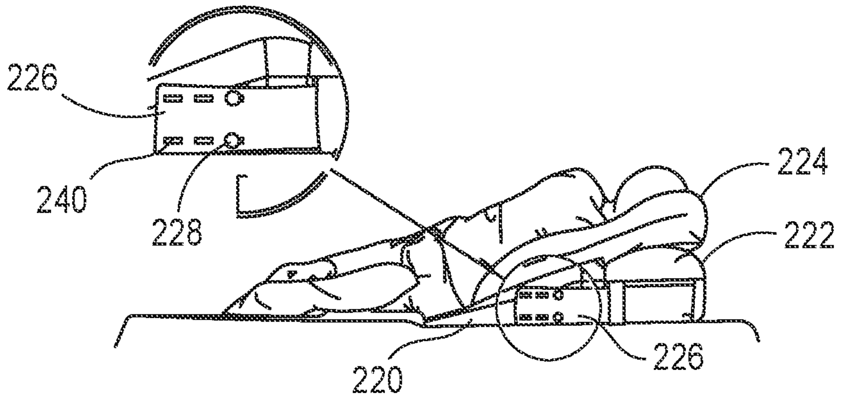
FIGS. 15A-15C illustrate a method of adjusting a position of the riser element relative to the support element of the therapeutic cushion system of FIG. 2.
Figure 15B:
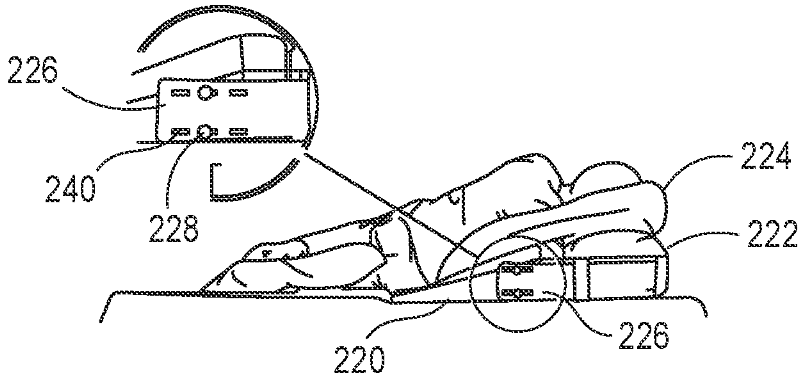
Figure 15C:
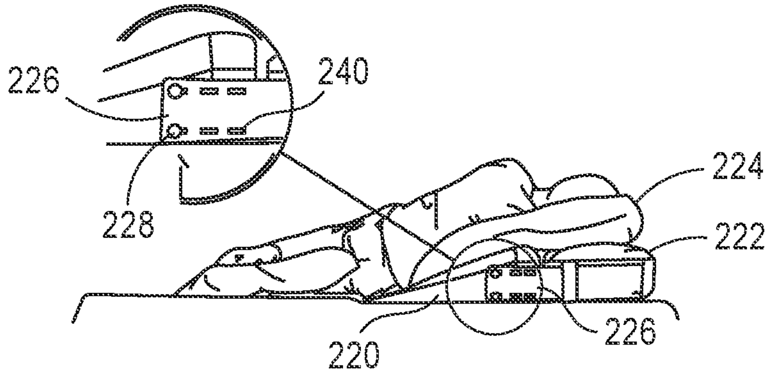

To use the cushion system 200, the user can removably couple the riser element 222 to the support element 220 as shown in FIGS. 13, 14 and 15A-15C. Specifically, the user can select one of the set of openings 240 on the straps 226 to couple to the buttons 228 on the support element 220 such that the riser element 222 is disposed at a desired position relative to the support element 222. For example, the riser element 222 can be positioned relative to the support element 220 such that the riser element 222 is at a desired height to place the user's head and neck and at a desired longitudinal distance from the support element 220. As shown in FIG. 15A, if the user couples the first set of button holes 240 (the set furthest from an end of the straps 226) to the buttons 228, the riser element 222 will be at a maximum height. If the user uses the second set of button holes 240, as shown in FIG. 15B, the riser element 222 will be at a medium height, and if the user uses the third set of button holes 240 (the set closest to the end of the straps 226) the riser element 222 will be at a lowest height. The user can place the riser element 222 and the support element 220 on, for example, a bed or other surface on which the user intends to use the cushion system 200 either before or after coupling the riser element 222 to the support element 220.

With the riser element 222 coupled to the support element 220, the user can place the body element 224 on top of the riser element 222 and the support element 220, as shown for example, in FIG. 14. Specifically, the arc portion 241 is placed on the riser element 222 and the second arm 248 of the body element 224 is positioned on a left side of the riser element 222 and support element 220 (as viewed in a top view of the cushion system) such that a portion of the second arm 248 (depending on its length) extends off the support element 220, as shown, for example, in FIGS. 2, 3, 14 and 15A-15C. Although the cushion system 200 is described below for a user positioned in a RLD position, it should be understood that the cushion system 200 can alternatively be assembled for a user to be positioned in a LLD position on the cushion system 200 in a similar manner.

Figure 16:
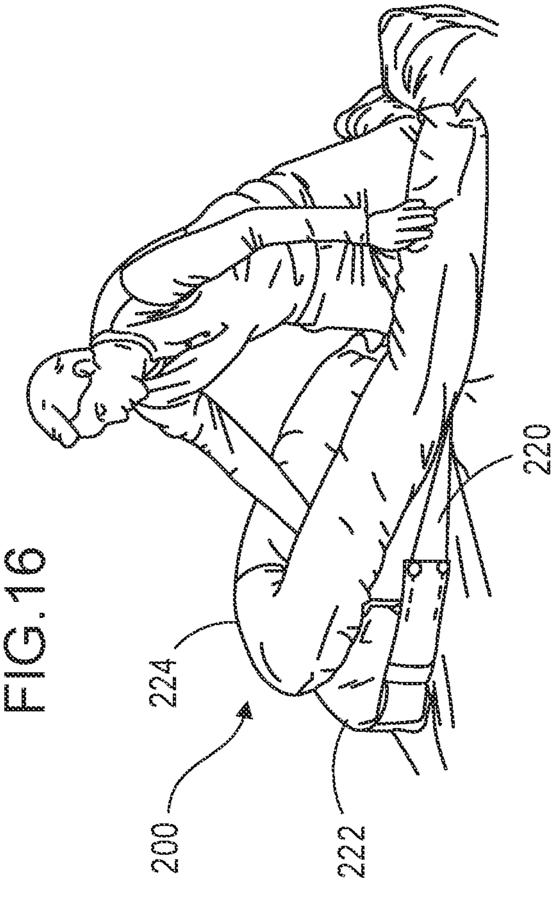
FIGS. 16-19 illustrate a method of using the therapeutic cushion system of FIG. 2.
Figure 17:
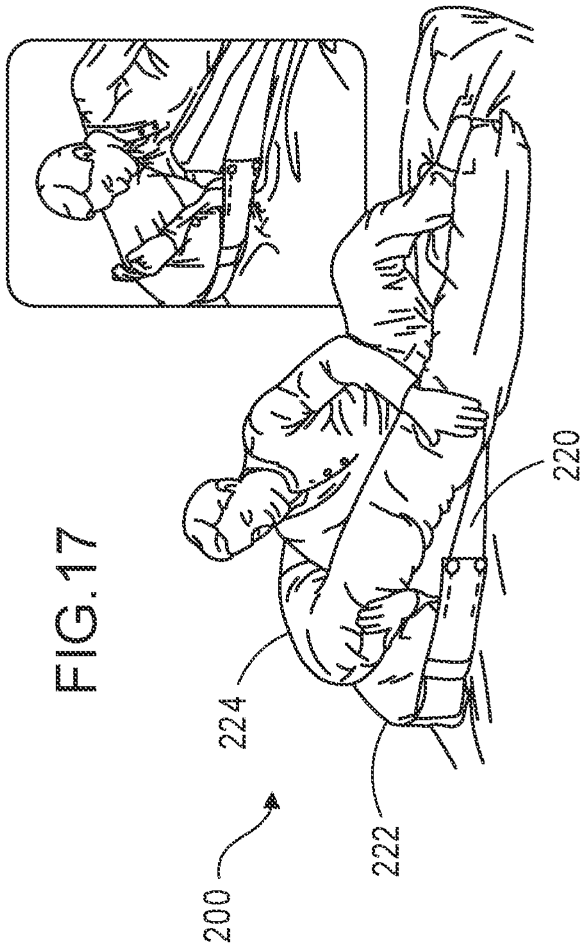
Figure 18:
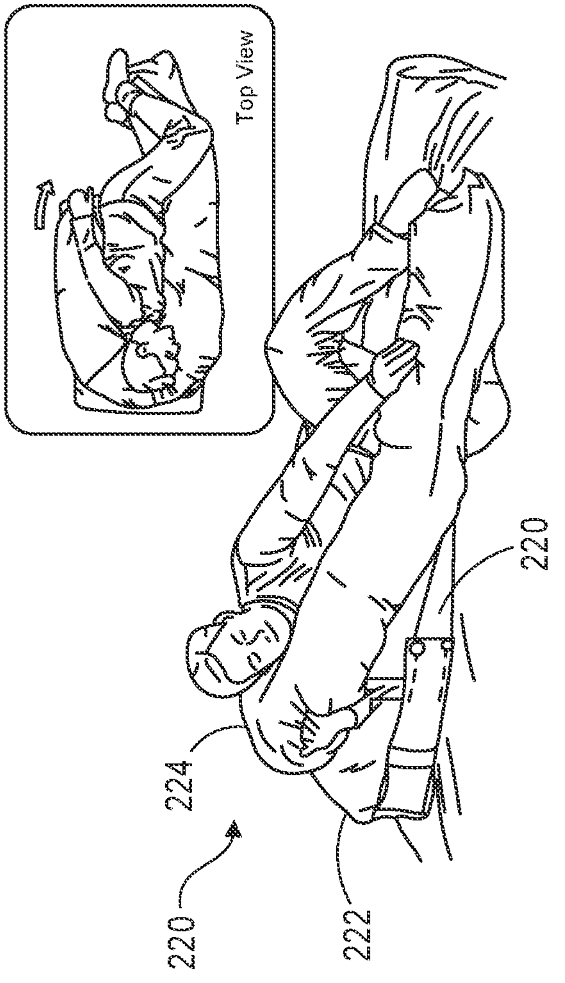
Figure 19:
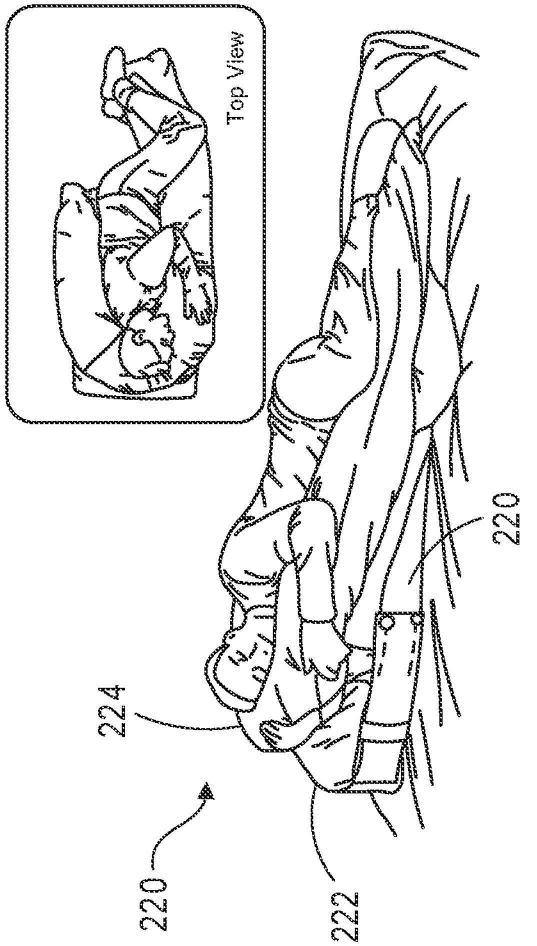

The user can then lie on the assembled cushion system 200 in the RLD position such that the user is aligned in approximately a center portion of the support element 220. For example, the user can insert the user's right arm below the arc portion 241 of the body element 224 and within the receiving portion 258 between the riser element 222 and the support element 220, as shown in FIG. 16, and then out through the space on an outer side of the second arm 248 of the body element 224, as shown in FIG. 17. In other words, the user's arm can be positioned within the receiving portion 258 and the user's hand can extend out of the space. The user can check to ensure the user's body is in approximately the middle of the support element 220. Optionally, the user can adjust the position of the user's right arm and shoulder within the space between the support element 220 and the riser element 222, such that user's downside axilla rests within the centered concave portion 230 of the support element 220. The user can then place the second arm 248 (i.e., the long arm) between the user's legs and place or tuck the first arm (the short arm) behind or under the user's back, hips and/or buttocks with the user's knees in a bent position, as shown in FIG. 18. The user can situate the user's head, neck and arms until the user is in a comfortable position, as shown in FIG. 19. In some embodiments, the user's hip can be anchored or supported on the bed or support surface on which the cushion system 200 is disposed to help limit or prevent the user from sliding down the support element 220, and maintain the user in a desired position on the cushion system 200. For example, in some embodiments, the support element 220 can have a length such that the user's hip is positioned at least partially on the bed or support surface when the user is positioned on the cushion system 200.

With the user's arm within the space between the support element 220 and the riser element 222, the cushion system 200 can maintain the user in an inclined RLD position. Thus, the tendency of the user to slide down the angled top surface portion 237 of the support member 220 can be reduced or eliminated. As described above, the user can also manipulate, conform, disperse, etc., the clustered polyester fiber filler material within the body element 224 and/or the riser element 222 to create cavities or bulges to accommodate specific body parts and/or portions related to its use for GERD or other medical conditions to accommodate the user's needs and/or preferences, for example, a user may accommodate a breathing apparatus or other similar device.

Figure 21:
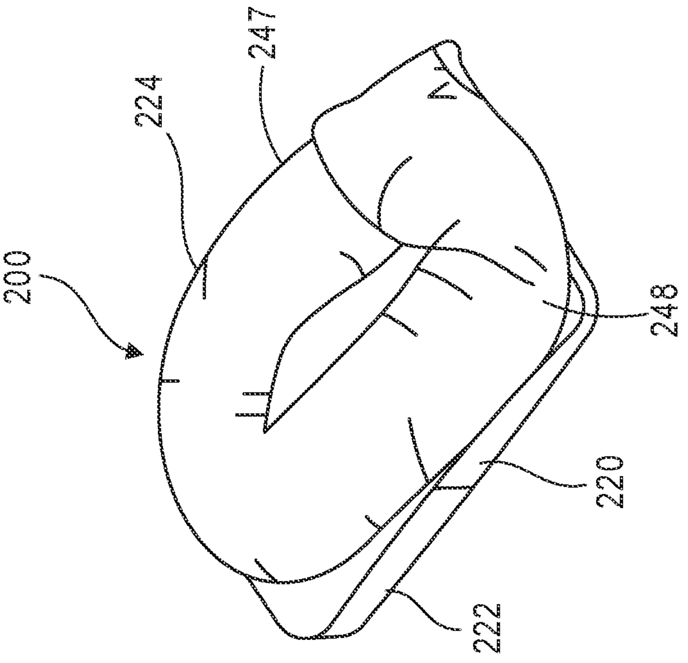
FIGS. 20 and 21 are each a perspective view of the therapeutic cushion system of FIG. 2 illustrating the body element in different configurations.
Figure 20:
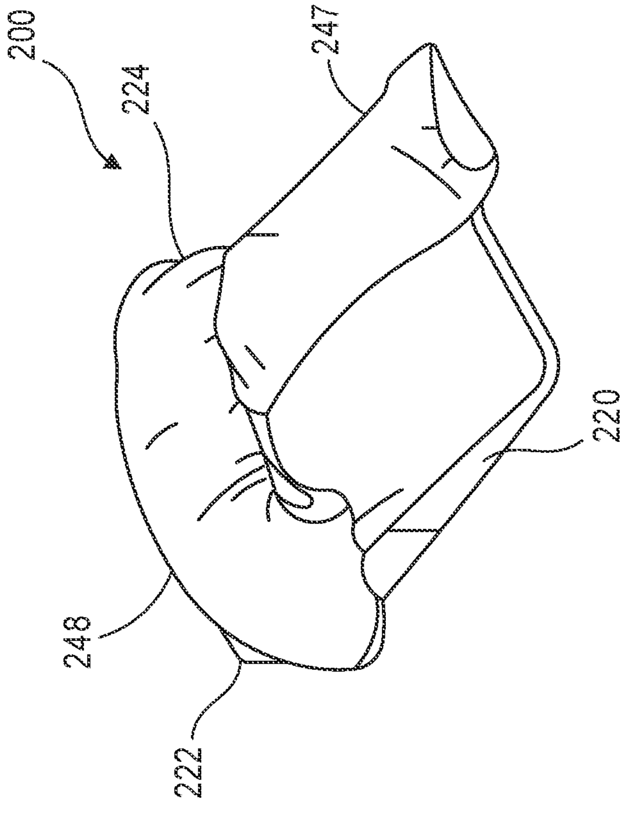
Figure 23:
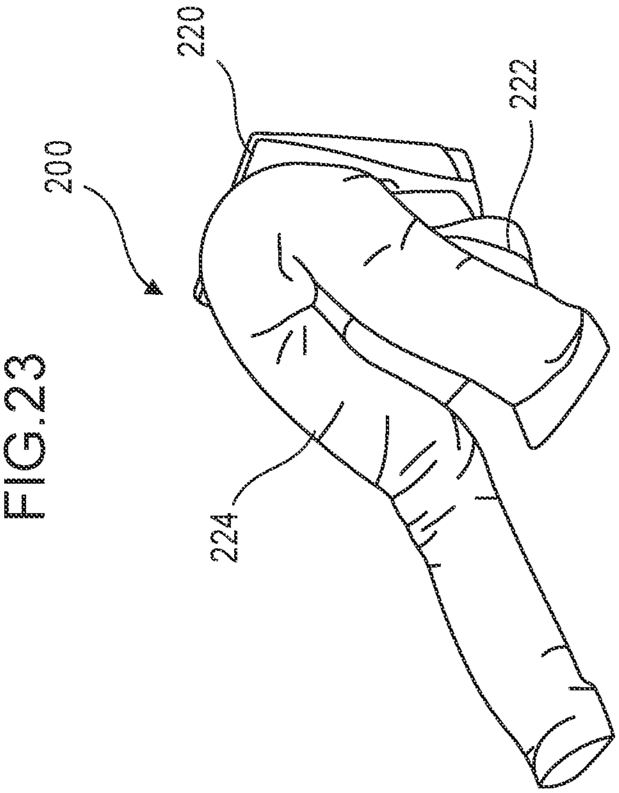
FIGS. 22 and 23 are each a perspective view of the therapeutic cushion system of FIG. 2 illustrating an alternative orientation for use of the therapeutic cushion system.
Figure 22:
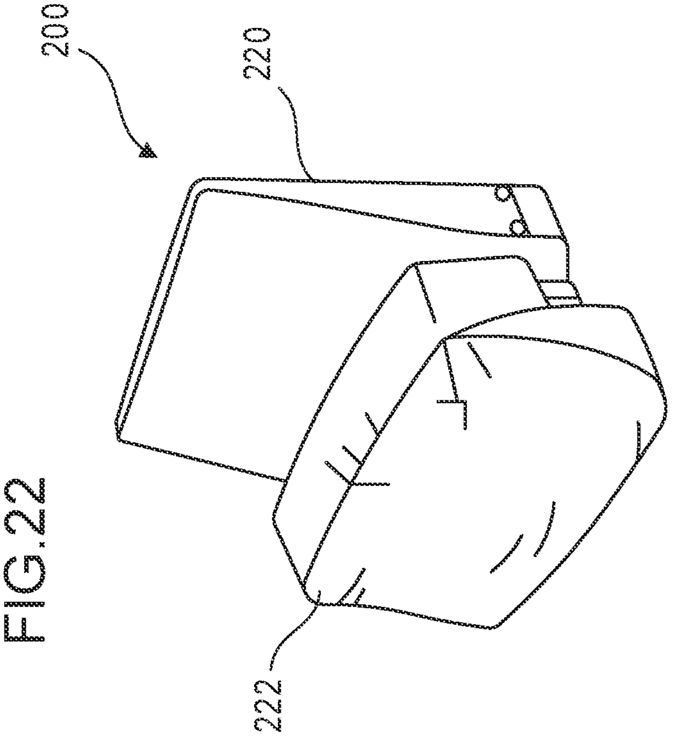

FIGS. 20-23 illustrate different alternative configurations for using the cushion system 200. FIG. 20 illustrates the body element 224 disposed with the second arm 228 folded over the arc portion 241. FIG. 21 illustrates the body element 224 with the second arm 248 folded toward the first arm 247 such that the second arm 248 does not extend substantially off the support element 220. FIGS. 22 and 23 illustrate use of the cushion system 200 with the riser element 222 and the support element 220 disposed in an alternative position. Specifically, FIG. 22 illustrates the support element 220 disposed in an upright position with the second end portion 216 supported on a support surface (e.g., a bed or a floor) and the riser element 222 disposed in an upright position proximate to the support element 220. As shown in FIG. 23, the body element 224 can be positioned against the riser element 222 and the support element 220 such that a user can use the cushion system 200 as a back rest in a seated or semi-seated position. FIG. 24 illustrates use of the cushion system 200 without the riser element 222. As shown in FIG. 24, the body element 224 can be placed on the support element 220.

Figure 24A:
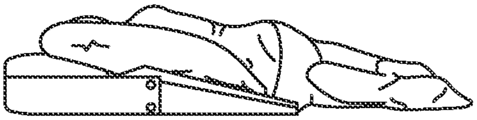
FIGS. 24(A)-24(J) each illustrate the therapeutic cushion system of FIG. 2 in use by a user with the body element in different configurations and the user in different positions.
Figure 24B:
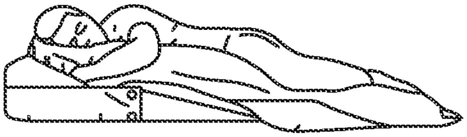
Figure 24C:
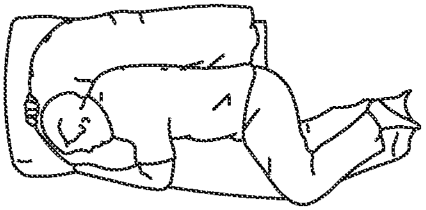
Figure 24D:
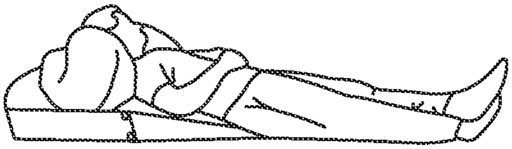
Figure 24E:
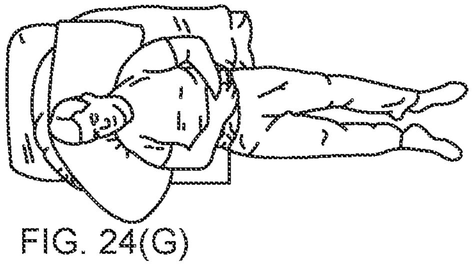
Figure 24F:
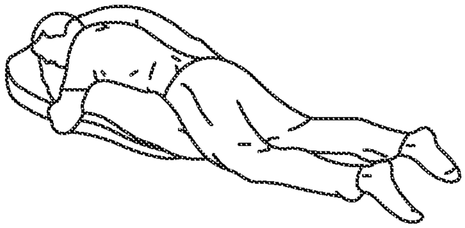
Figure 24G:
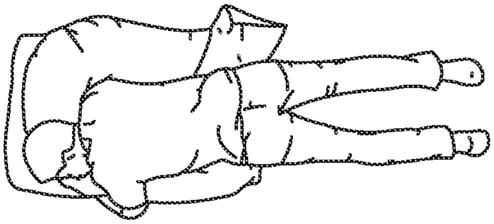
Figure 24H:
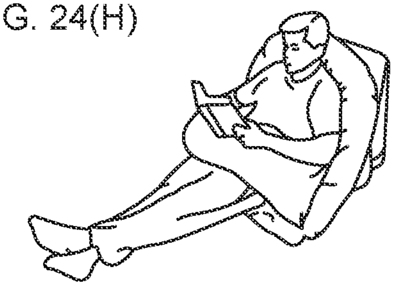
Figure 24I:
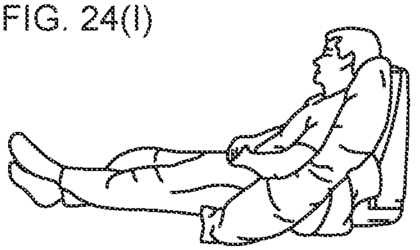

FIGS. 24(A)-24(J) each illustrate a user using the cushion system 200 in various configurations and positions. FIG. 24(A) illustrates the user positioned in an inclined LLD position. In other words, the body element 224 is positioned on the support element 220 and the riser element 222 with the second arm 248 (i.e., the long arm) on a right side of the cushion system 200 (as viewed from a top view of the cushion system 200). FIGS. 24(B) and 24(C) illustrate the user in an inclined RLD position, as described above, for example, with reference to FIGS. 16-19. FIGS. 24(D) and 24(E) illustrate the body element 224 in a folded position similar to the configuration shown with reference to FIG. 20, and the user positioned in an inclined supine position on the cushion system 200. FIGS. 24(F) and 24(G) illustrate the body element 224 folded position similar to the configuration shown with reference to FIG. 21 and the user positioned in a prone position on the cushion system 200. FIG. 24(I) illustrates the cushion system 200 in an upright reclined configuration similar to the configuration shown with reference to FIGS. 22 and 23, and FIG. 24(H) illustrates the cushion system 200 in a similar configuration as with FIG. 24(I) but with the body element 224 wrapped around to the front of the user. This position can be used, for example, to support the user's hand(s), a book, or in the case of a nursing mother, a nursing infant.

Figure 24J:
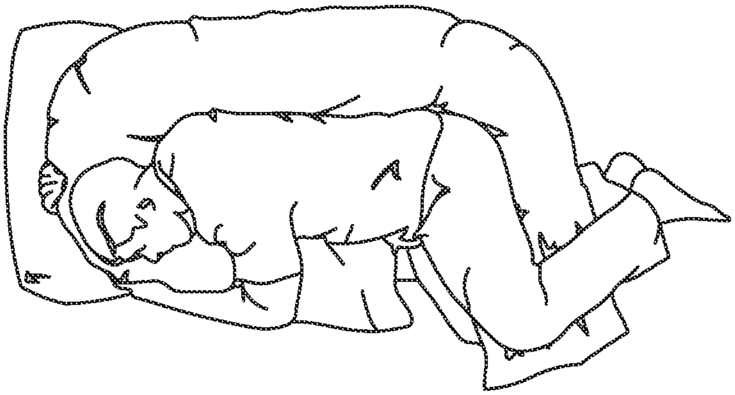

FIG. 24(J) illustrates the cushion system 200 with a user in a right side inclined position similar to the position shown in FIG. 24(C), except in FIG. 24(J) the second arm 248 (the long arm) of the body element 224 running along the user's back and tucked or placed forward between the user's knees. This position can allow the user to change from a RLD position to a LLD position (and vice versa) without having to flip over the body element 224.

Figure 25:
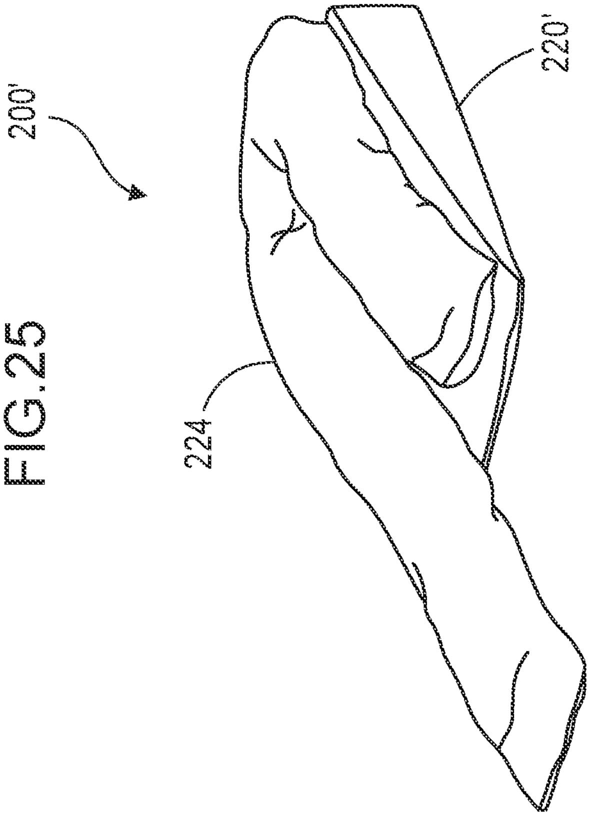
FIG. 25 is a perspective view of a therapeutic cushion system, according to another embodiment.

FIG. 25 illustrates use of a cushion system 200' that is similar to the cushion system 200. The cushion system 200' includes a support element 220' that can be configured the same as or similar to the support element 220. In this embodiment, the support element 220' has a longer length than the support element 220 and can be used without a riser element. As shown in FIG. 25, the support element 220' can be used with a body element 224 described above, or with another body element as described herein.

Figure 28:
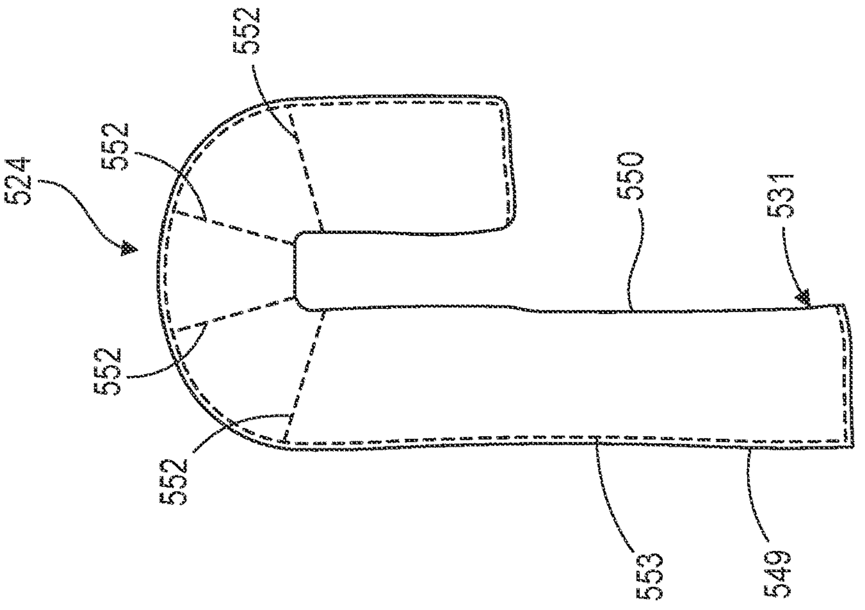
FIGS. 26-29 and 30(A)-30(I) each illustrate a different embodiment of a body element.
Figure 27:
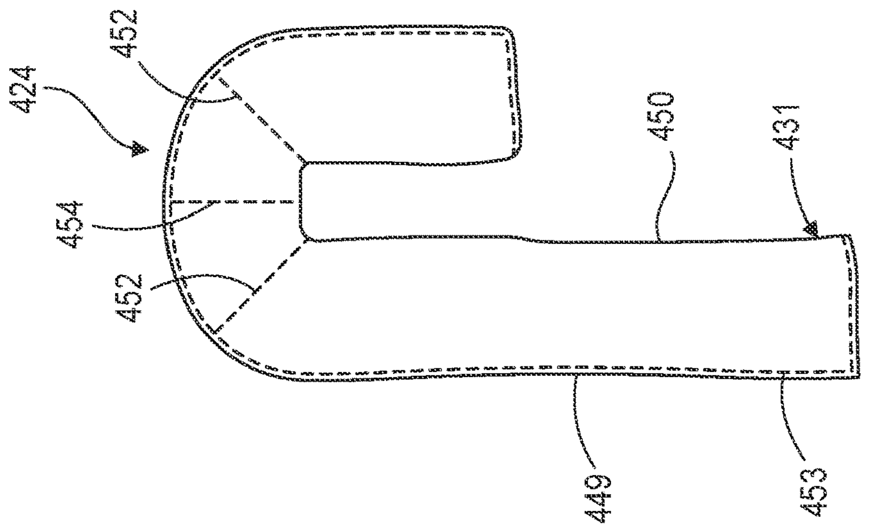
Figure 26:
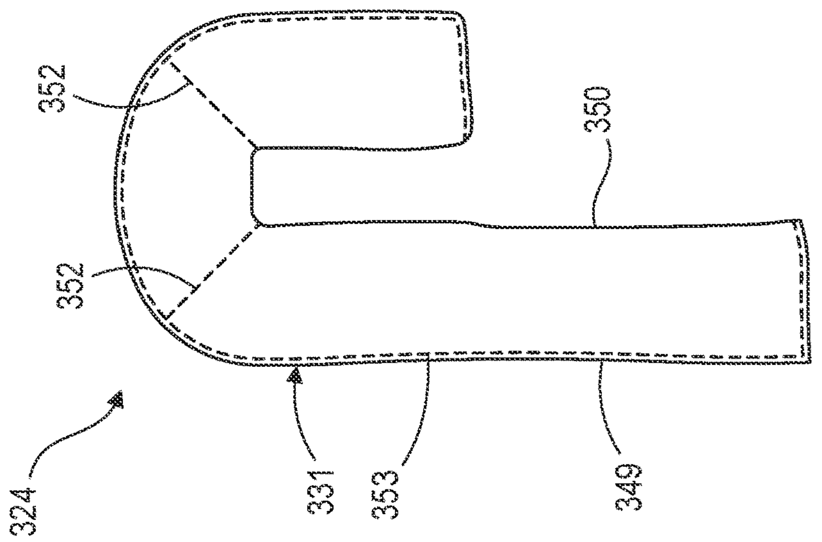

FIGS. 26-28 each illustrate different embodiments of a body element showing various stitching features. The body elements of FIGS. 26-28 can each be configured the same as or similar to and function the same as or similar to the embodiments of a body element described above. FIG. 26 illustrates a body element 324 that is similar to the body element 224 described above and includes a sleeve member 331 that has stitching 353 along an outer edge portion 349 of the body element 324 and a pair of stitching features 352 disposed at angles and extend from an inner edge portion 350 of the body element 324 to the outer edge portion 349. FIG. 27 illustrates a body element 424 that includes a sleeve member 431 that has stitching 453 along an outer edge portion 449 and a pair of stitching features 452 each disposed at an angle and extending from an inner edge portion 450 to the outer edge portion 449. The body element 424 also includes a stitching feature 454 that extends from the inner edge portion 450 to the outer edge portion 449 and is disposed between the stitching features 452. FIG. 28 illustrates a body element 524 that includes a sleeve member 53 lthat has stitching 553 along an outer edge portion 549 of the body element 524 and four stitching features 552 that extend at an angle from an inner edge portion 550 of the body element 524 to the outer edge portion 549 of the body element 524.

The stitching features 352, 452, 454, 552 described above can be disposed on the respective body elements 324, 424, 524 at a substantially equal distance from each other or at different distances from each other. Further, in alternative embodiments, more or less stitching features can be included on a body element of a cushion system described herein.

Figure 29:
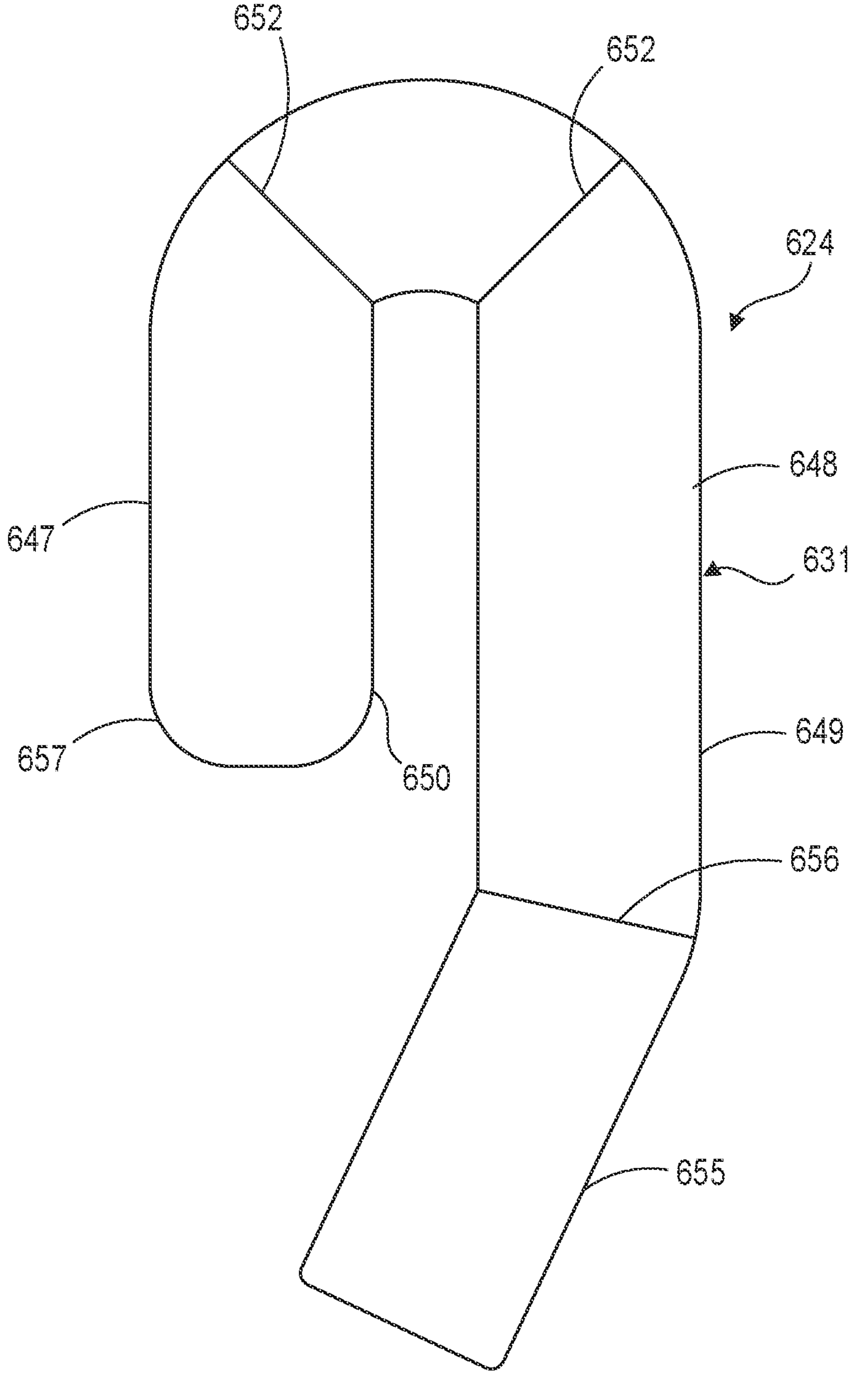
Figures 30A, 30B, 30C, 30D, 30E, 30F, 30G, 30H, 30I:
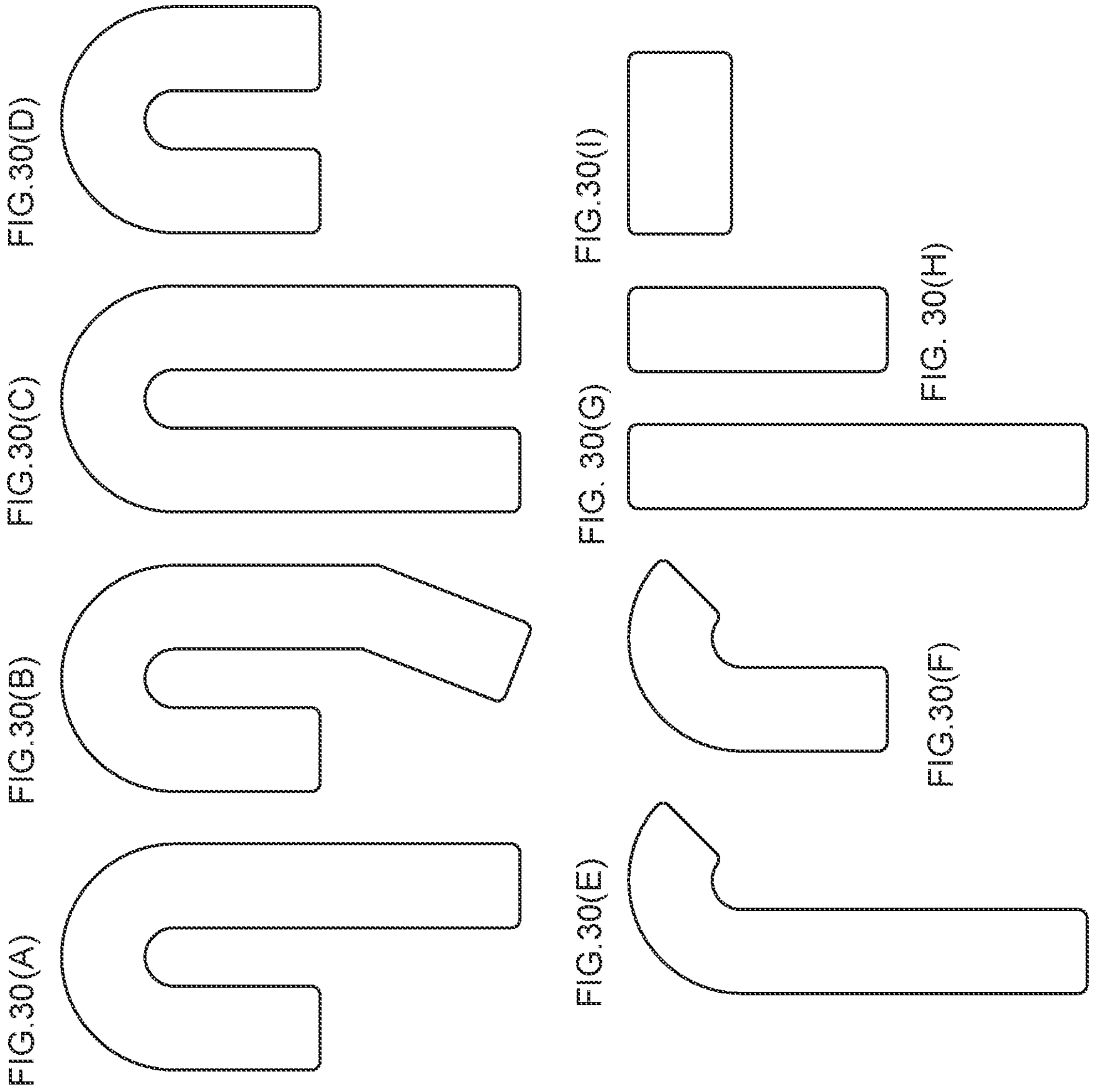

FIGS. 29 and 30(A)-30(I) illustrate different embodiments of a body element that can be used alone or within a cushion system as described herein. Each of the body elements described with respect to FIGS. 29 and 30(A)-30(I) can be configured the same as or similar to and function the same as or similar to the embodiments of a body element described above. FIG. 29 illustrates a body element 624. The body element 624 includes a first arm 647 and a second arm 648 and a sleeve member 631 that has an inner edge portion 650 and an outer edge portion 649 in which a pillow insert (not shown) can be disposed. The sleeve member 631 includes stitching features 652 similar that extend at an angle from the inner edge portion 650 to the outer edge portion 649 and can include stitching (not shown along the outer edge portion 649 as described above for previous embodiments. In this embodiment, the second arm 648 includes an end portion 655 that is disposed at an angle relative to a remainder of the second arm 648. The end portion 655 can be disposed, for example, at an angle of up to about 25 degrees. A stitching feature 656 can be disposed at the start of the bend portion 655. The first arm 647 includes a rounded or curved end portion 657, and the end of the end portion 655 can optionally be similarly rounded. FIGS. 30(A)-30(I) each illustrate different embodiments of a body element having different shapes and sizes.

FIGS. 31(A)-31(E) each illustrate further different embodiments of a body element that can be used alone or within a cushion system as described herein and that include various different filler zoning options. Filler zoning can allow various filler materials and/or filler materials with different densities to be placed at targeted locations within the body element. Filler zones can be formed, for example, by way of internal fabric baffles, sewn-in segmentation, or by self-contained individual insert members. Each zone within a body element can be accessed and/or inserted within a body element during manufacturing, for example, via a semi-permanently stitched closure. Alternatively, each zone can be accessed by a user (e.g., during in-home use) via a closure member, including, for example, zipper(s), snap(s), button(s), hook and loop fasteners, etc. Each embodiment of a body element described with reference to FIGS. 31(A)-31(E) can include the same or similar features, and can function the same or similar to, other embodiments of a body element described herein, and therefore certain details are not described with reference to FIGS. 31(A)-31(E).

Figure 31A:
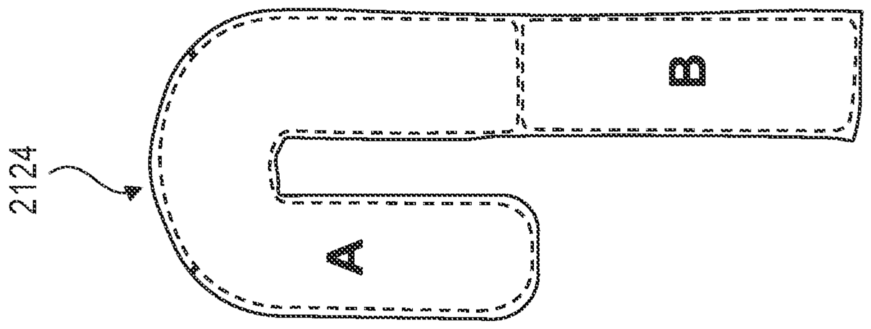
FIGS. 31(A)-31(E) each illustrate a different embodiment of a body element including different filler zoning options.
Figure 31B:
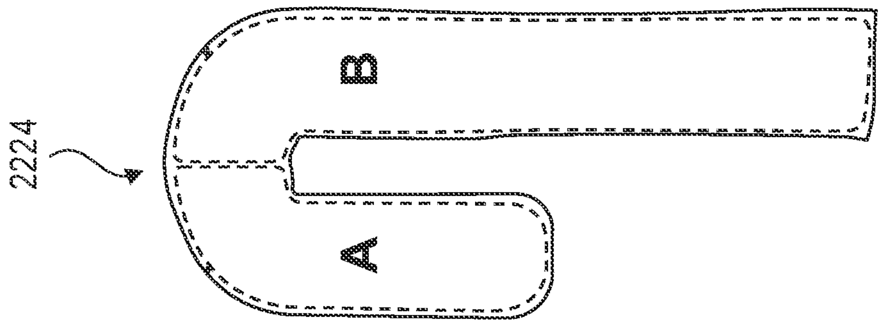
Figure 31C:
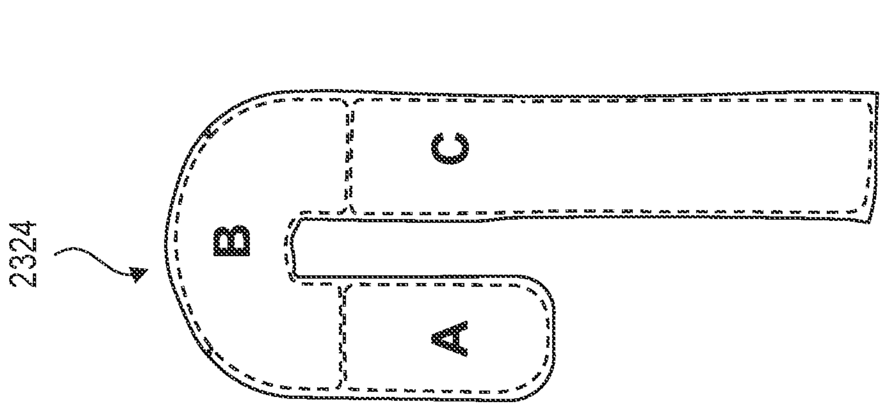
Figure 31E:
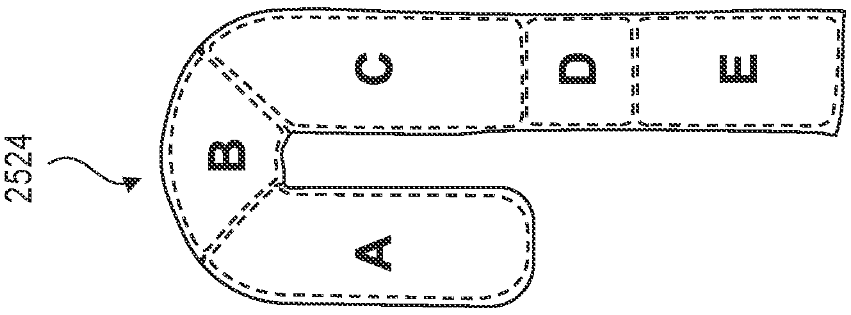
Figure 31D:
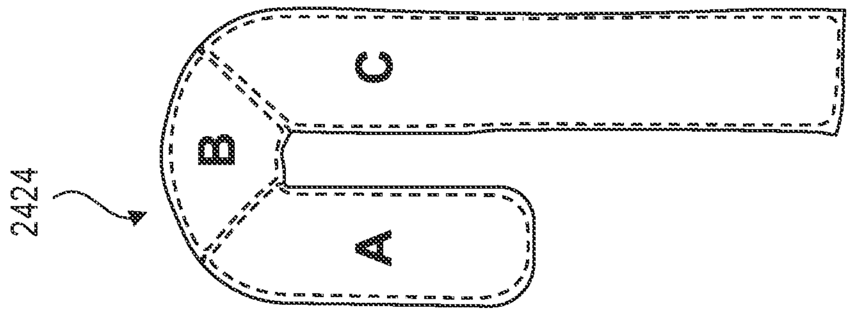

FIG. 31(A) illustrates a body element 2124 that includes a first filler zone A and a second filler zone B. FIG. 31(B) illustrates a body element 2224 that includes a first filler zone A and a second filler zone B. FIG. 31(C) illustrates a body element 2324 that includes a first filler zone A, a second filler zone B, and a third filler zone C. FIG. 31(D) illustrates a body element 2424 that includes a first filler zone A, a second filler zone B, and a third filler zone C. FIG. 31(E) illustrates a body element 2524 that includes a first filler zone A, a second filler zone B, a third filler zone C, a fourth filler zone D and a fifth filler zone E.

The fillers zones shown and described with respect to FIGS. 31(A)-31(E) are example embodiments of body elements having various quantity and types of filler zones. It should be understood that alternative embodiments can include a different quantity, size and/or shape of filler zone. Further, although not shown with respect to other embodiments of a body element described herein, it should be understood that other embodiments of a body element can include filler zones.

FIGS. 32(A), 32(B) and 33-35 illustrate another embodiment of a therapeutic cushion system. A therapeutic cushion system 700 (also referred to herein as a "cushion system") includes a support element 720, a riser element 722 and a body element 724. The support element 720, riser element 722 and body element 724 can each be constructed the same as or similar to, and can function the same as or similar to, the support elements, riser elements, and body elements described above for previous embodiments. Therefore, some details are not described below with respect to support element 720, riser element 722 and/or the body element 724.

The support element 720 can be formed the same as or similar to the support elements described above. For example, the support element 720 can include a first end portion 715 and a second end portion 716 and a top surface 737 that is angled relative to a bottom surface 739, as shown, for example, in FIG. 33.

Figure 32A:
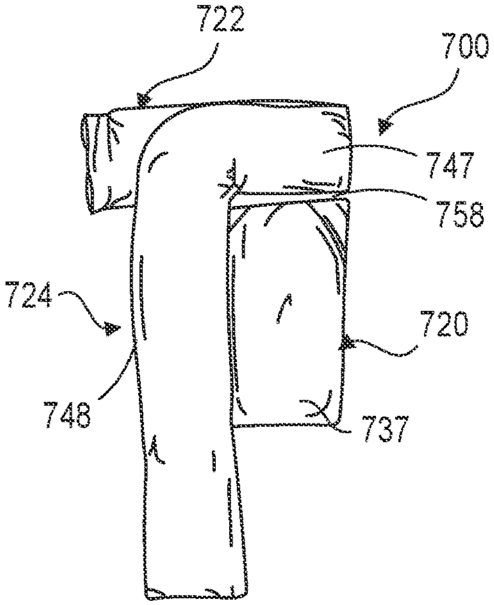
FIG. 32(A) is a top view of a therapeutic cushion system, according to another embodiment shown in a first configuration.
Figure 32B:
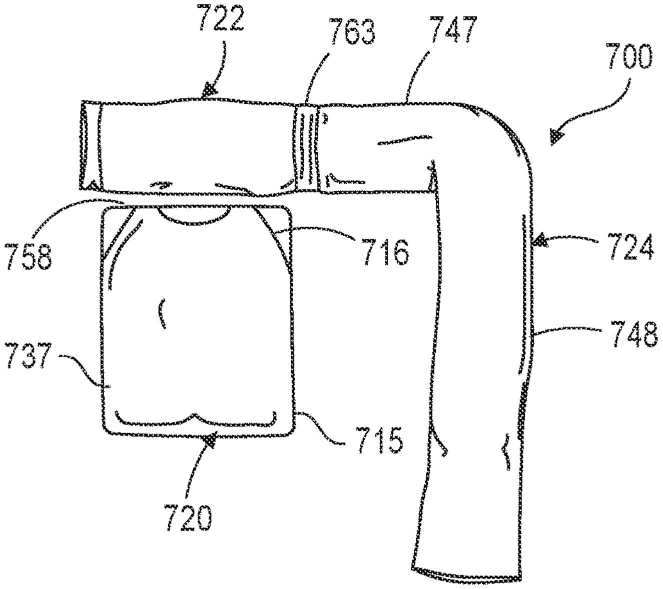
FIG. 32(B) is a top view of the therapeutic cushion system of FIG. 32(A) shown in a second configuration.
Figure 33:
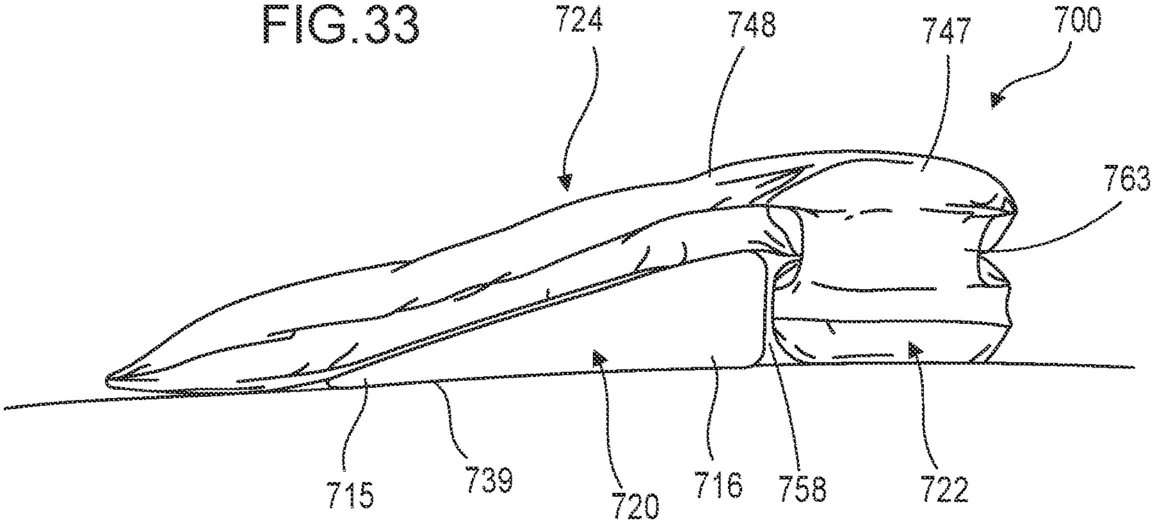
FIG. 33 is a side view of the therapeutic cushion system of FIGS. 32(A) and 32(B).

In this embodiment, the body element 724 and the riser element 722 are formed as a single component and the body element 724 can be moved between a first unfolded configuration, as shown in FIG. 32(B), and a second folded configuration, as shown in FIG. 32(A). A fabric hinge portion 763 is formed between a portion of the body element

724 and a portion of the riser element 722 that allows a user to fold a portion of the body element 724 for use. Specifically, the body element 724 includes a first arm 747 connected to the riser element 722 by the fabric hinge portion 763, and a second arm 748. When in the second folded configuration, the first arm 747 is substantially disposed on the riser element 722 as shown in FIGS. 32(A), 32(B) and 33-35.

Figure 35:
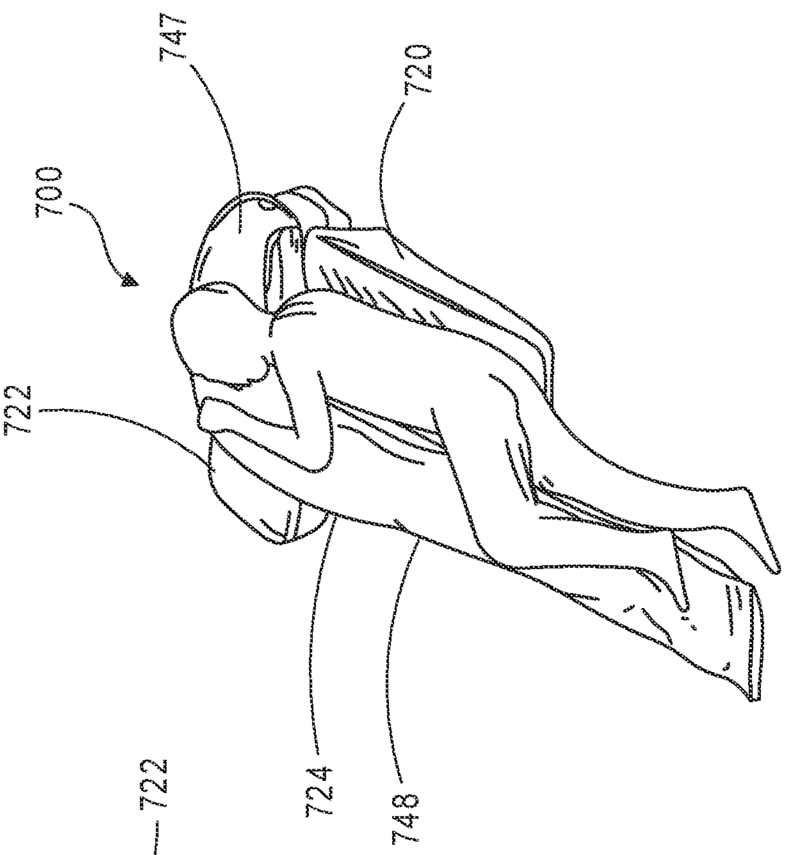
FIG. 35 is a perspective view of the therapeutic cushion system of FIGS. 32(A) and 32(B) illustrating a user positioned on the therapeutic cushion system.
Figure 34:
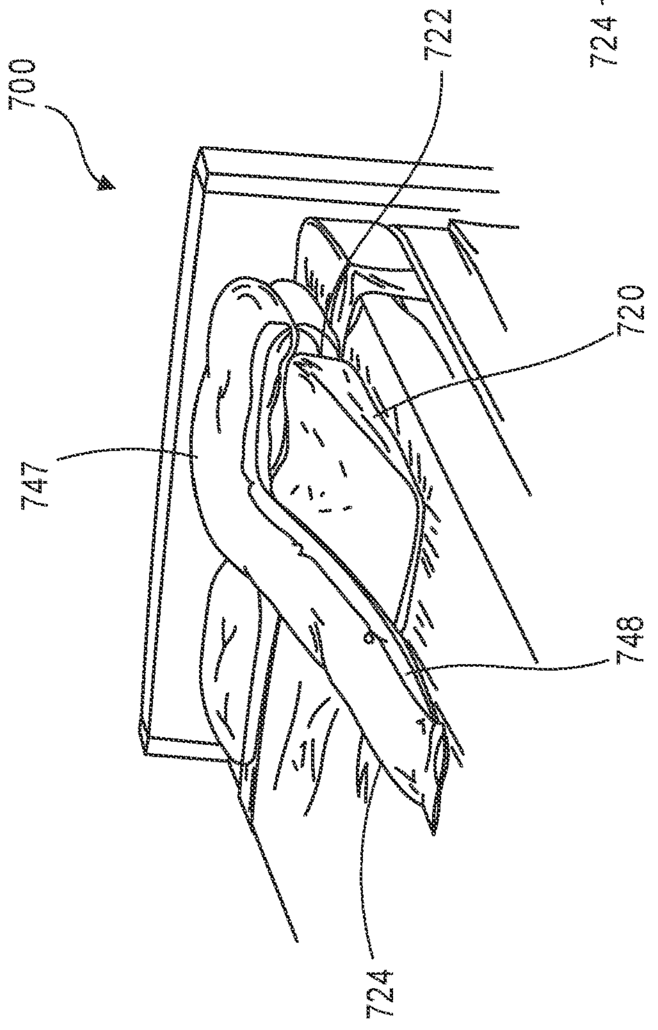
FIG. 34 is a perspective view of the therapeutic cushion system of FIGS. 32(A) and 32(B) shown on a bed.
Figure 36:
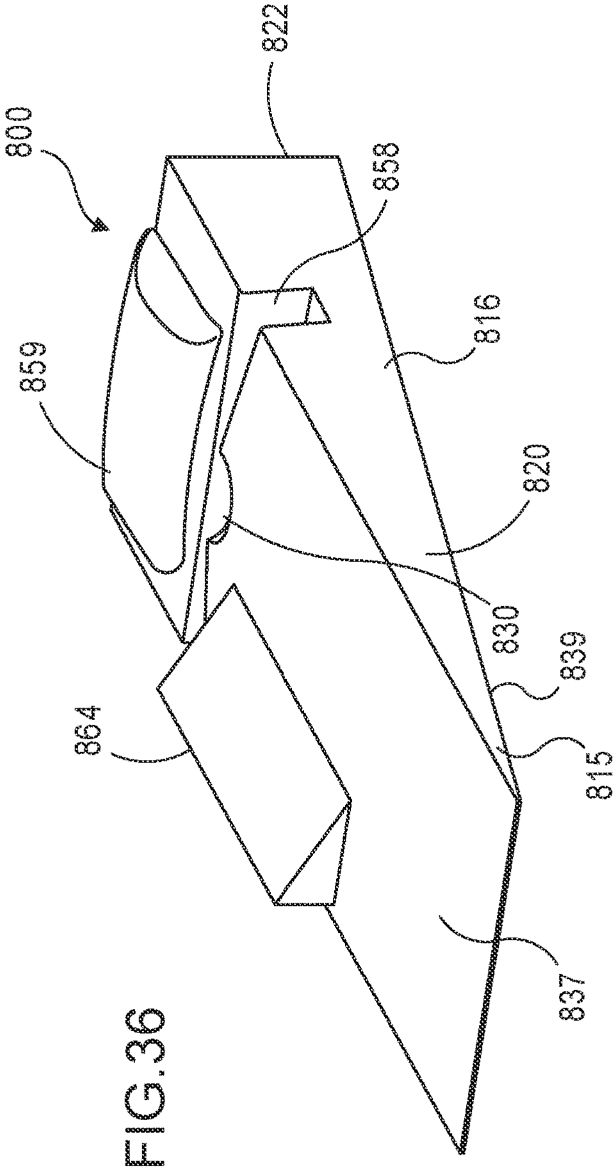
FIG. 36 is a perspective view of a therapeutic cushion system, according to another embodiment with an optional pillow.

A user can use the cushion system 700 in the same or similar manner as described above for previous embodiment. For example, as shown in FIG. 34 the user can place the cushion system 700 on bed, and position the combination riser element 722 and body element 724 proximate to the second end portion 716 of the support element 720. For example, the riser element 722 can be positioned at a desired distance from the support element 720 such that a receiving portion (e.g., a gap, opening, pocket, etc.) 758 is defined between the riser element 722 and the support element 720. The body element 724 can be folded over the riser element 722 as described above and as shown for example, in FIGS. 34 and 35. As shown in FIG. 35, the user can be positioned on the cushion system 700 in an inclined side position with the user's arm disposed within the receiving portion 758.

FIGS. 36-41 illustrate an embodiment of a therapeutic cushion system that includes a bed length support element. A therapeutic cushion system 800 (also referred to herein as a "cushion system") includes a support element 820, a riser element 822 and a side support member 864. The support element 820 and the riser element 822 can each be constructed the same as or similar to, and can function the same as or similar to, the support elements and riser elements, respectively, described above for previous embodiments. Therefore, some details with respect to the support element 820 and riser element 822 are not described below. The cushion system 800 can also include an optional pillow 859 or the pillow 859 can be a pillow provided by a user.

In this embodiment, the support element 820 and the riser element 822 are formed as a single component and define a receiving portion 858 between the support element 820 and the riser element 822. The receiving portion 858 can be used as a shoulder relief area for the user to place a portion of a user's arm when using the cushion system 800. In this embodiment, the support element 820 and the riser element 822 can collectively have a wedge shape. Specifically, the support element 820 includes a top surface 837 that is angled relative to a bottom surface 839 between a first end portion 815 and a second end portion 816. The riser element 822 includes a top surface 817 that is angled relative to a bottom surface 818 that is continuous with the bottom surface 839 of the support element 820.

Figure 38:
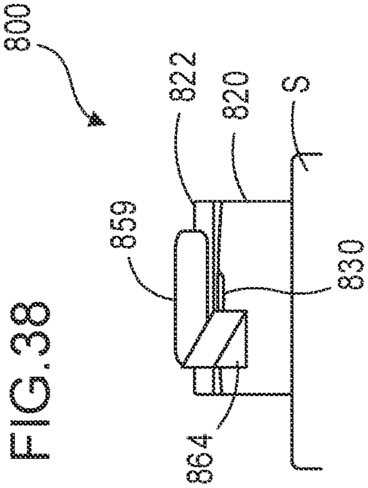
FIG. 38 is an end view taken along line A-A in FIG. 37.
Figure 37:
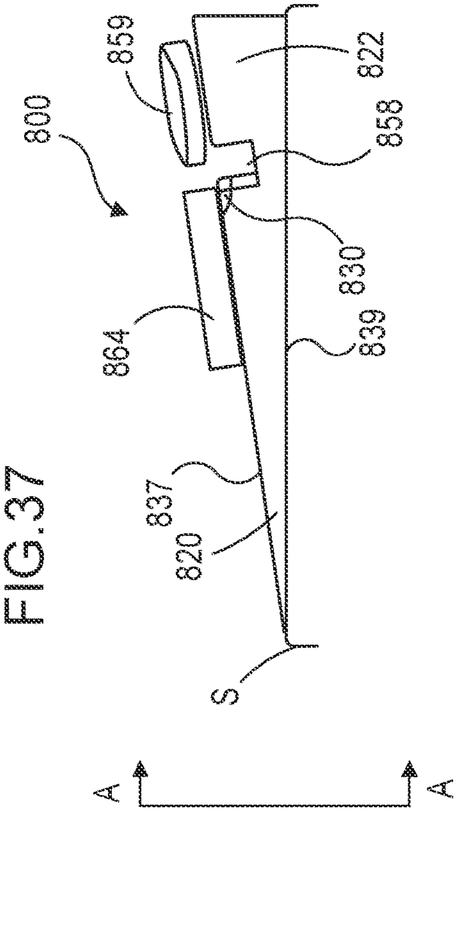
FIG. 37 is a side view of the therapeutic cushion system of FIG. 36.
Figure 41:
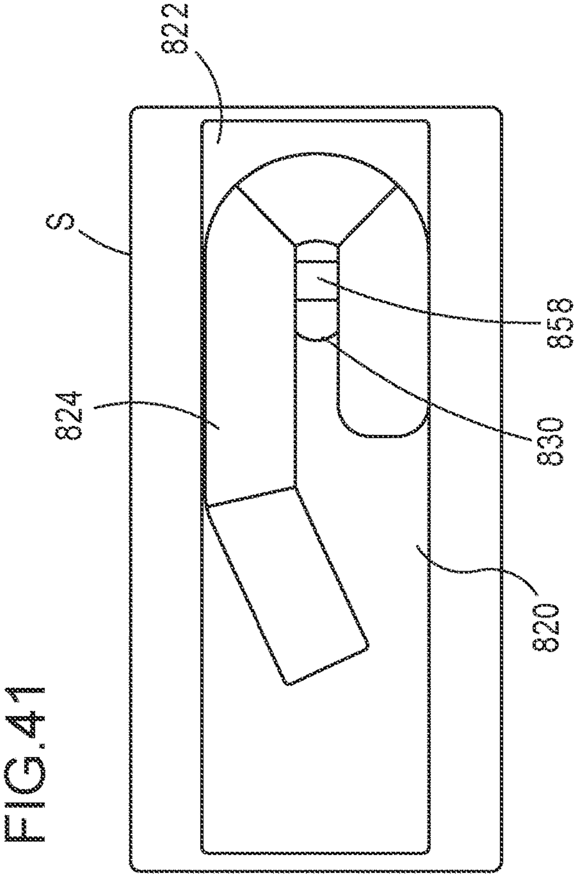
FIG. 41 is a top view of the therapeutic cushion system of FIG. 36 with an optional body element.
Figures 42A, 42B, 42C, 42D:
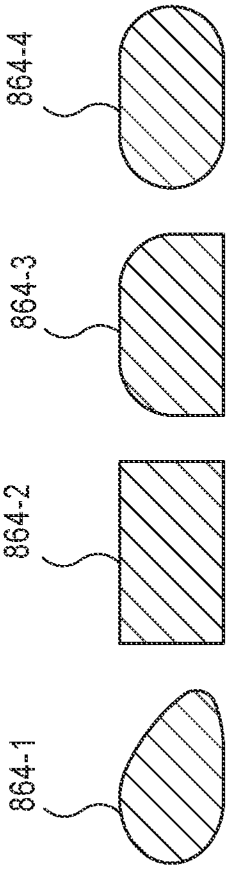
FIGS. 42(A)-42(D) each illustrate a cross-sectional view of alternative embodiments of a side support member.
Figure 43:
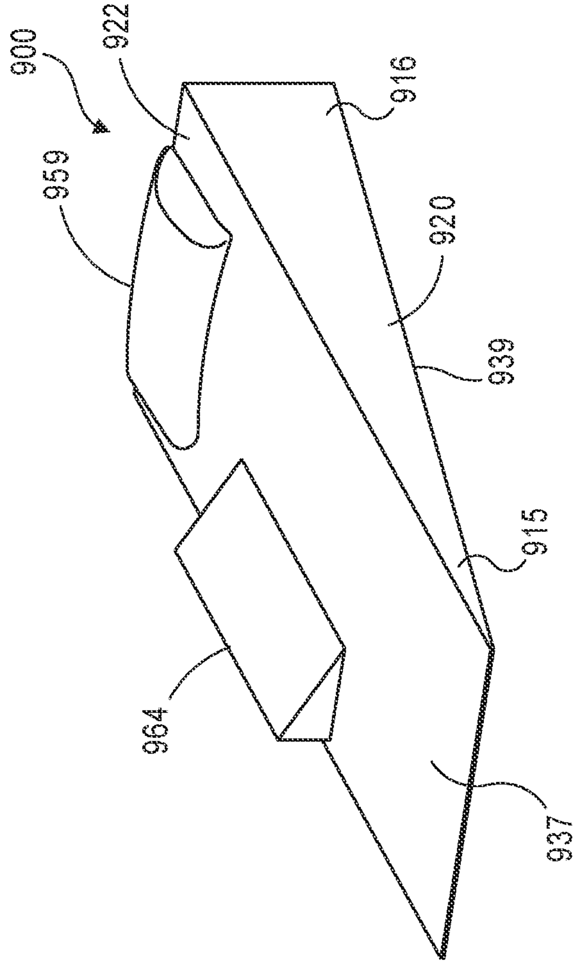
FIG. 43 is a perspective view of a therapeutic cushion system, according to another embodiment with an optional pillow.

The support element 820 and the riser element 822 can be placed on a support surface S (as shown in FIGS. 37, 38 and 41), such as, for example, a bed, box spring, bed foundation or floor, for use by a user. The support element 820 and the riser element 822 collectively have a length that is substantially the same as a length of the support surface (e.g., bed) on which it is to be used as shown in FIGS. 37, 38 and 41. In alternative embodiments, the cushion system 800 can have a torso size as described above, for example, for cushion systems 200 and 700.

The support element 820 can include a cushion member (not shown) and a concave portion 830 as described above for previous embodiments. The cushion member can be formed with, for example, one or more foam materials as described above for previous embodiments. The riser element 822 can include a pillow insert (not shown) and a riser foam portion (not shown). The riser foam portion can be integral with the cushion member of the support element 820 or can alternatively be a separate foam portion or portions constructed the same as or similar to the cushion member. An outer casing 861 can encase both cushion member of the support member and the pillow insert and foam portion of the riser element. The outer casing 861 can be formed with one or more materials as described above, for example, for outer casing 121 and outer casing 127.

The pillow insert can be disposed, for example, within a pocket formed in the riser foam portion or can be disposed on top of the riser foam portion. The pillow insert can include an inner casing (not shown) and filler material (not shown) as described above for previous embodiments such that the riser element 822 can include a compliant region to allow a user to form cavities or bulges to accommodate specific body parts and/or portions to accommodate the user's needs and/or preferences.

Figure 40:
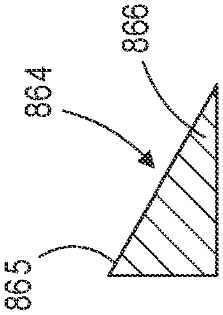
FIG. 40 is a cross-sectional view of the side support member of the therapeutic cushion system of FIG. 36.

The side support member 864 can be placed on the support element 820 during use and used to help maintain a user in a lateral position. In alternative embodiments, the side support member 864 can be fixedly attached to the support element 820 or integrally formed with the support element 820. In this embodiment, the side support member 864 has a wedge shape with a substantially triangular cross-section as shown in FIG. 40. In alternative embodiments, the side support member 864 can have different shapes, sizes, and cross-sections, such as, for example, the cross-sectional views of alternative embodiments of a side support member 864-1, 864-2, 864-3 and 864-4 illustrated in FIGS. 42(A)-42(D). The side support member 864 can include an outer casing 865 (see, e.g., FIG. 39) and an insert member 866 (see, e.g., FIG. 40). The outer casing 865 can be constructed, for example, the same as or similar to the outer casings 125 and 127 or the sleeve member 131 described above. The insert member 866 of the side support member 864 can be formed with, for example, one or more foam materials, or can include a filler material such as the filler material described above, for example, for pillow insert 125.

Figure 39:
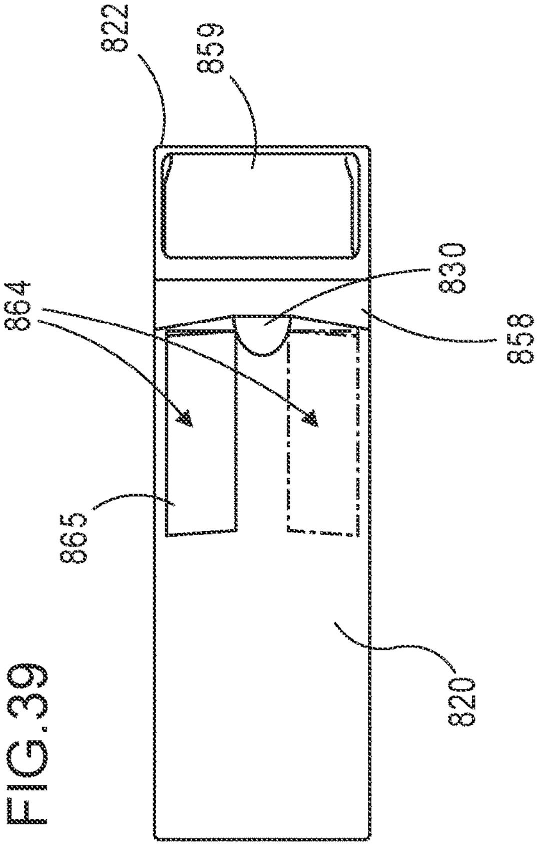
FIG. 39 is a top view of the therapeutic cushion system of FIG. 37 with a side support member shown on two sides of the support element.

The user can be positioned on the cushion system 800 as described above for previous embodiments, in an inclined RLD or LLD position, depending on the particular needs of the user, with the user's right or left arm disposed within the receiving portion 858. As described above, the side support member 864 can be placed on the support element 820 and used to help maintain the user in the RLD or LLD position. For example, as shown in FIG. 39, the side support 864 can be disposed on the support element 820 on either a right or left side of the support element 820.

FIG. 41 illustrates the cushion system 800 with an optional body element 824 instead of the side support member 864 and pillow 859. The body element 824 can be formed the same as or similar to and function the same as or similar to the body elements described above for previous embodiment. When using the body element 824, the user may not use the pillow 859.

FIGS. 43-47 illustrate an embodiment of a therapeutic cushion system that is similar to the cushion system 800. A therapeutic cushion system 900 (also referred to herein as a "cushion system") includes a support element 920, a riser element 922 and a side support member 964. The support element 920, riser element 922 can each be constructed the same as or similar to, and can function the same as or similar to, the support elements and riser elements described above for previous embodiments. The cushion system 900 can also include an optional pillow 959 or the pillow 959 can be a pillow provided by a user.

Figure 45:
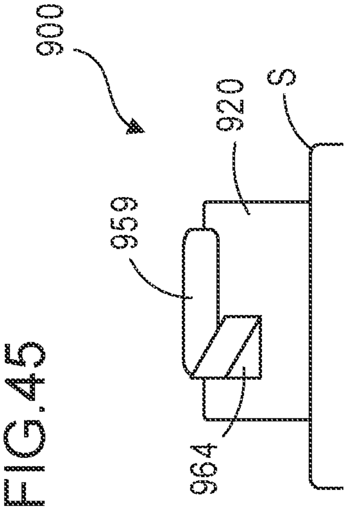
FIG. 45 is an end view taken along line B-B in FIG. 44.
Figure 44:
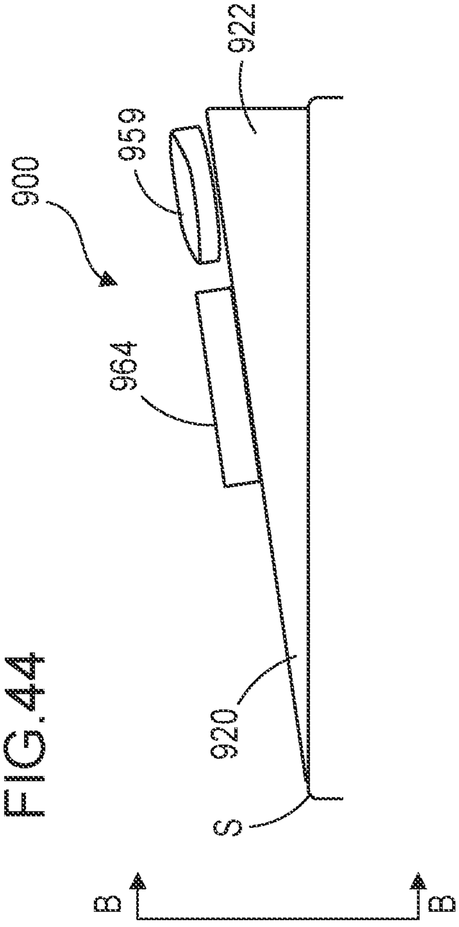
FIG. 44 is a side view of the therapeutic cushion system of FIG. 43.
Figure 47:
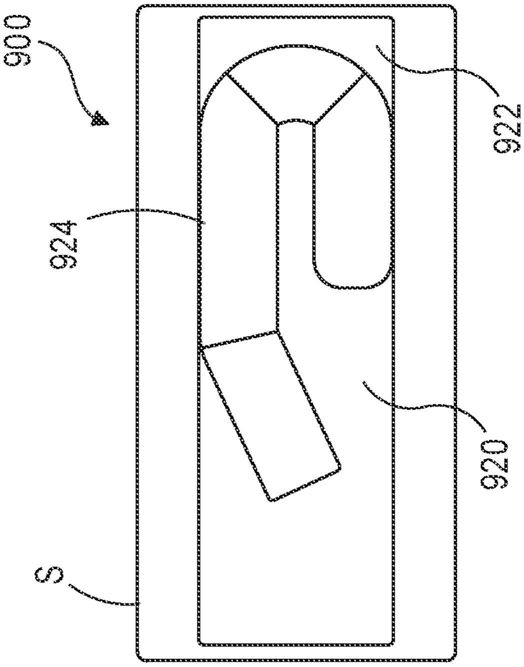
FIG. 47 is a top view of the therapeutic cushion system of FIG. 43 with an optional body element.

In this embodiment, the support element 920 and the riser element 922 are integrally formed as a single component and collectively have a wedge shape. In this embodiment, the support element 920 and the riser element 922 collectively have a top surface 937 that is angled relative to a bottom surface 939 between a first end portion 915 and a second end portion 916, as shown, for example, in FIG. 43. The support element 920 and the riser element 933 can be formed the same as or similar to, and include the same or similar features as described above for the support element 820 and the riser element 822, except in this embodiment, the support element 920 and the riser element 922 do not define a space or receiving portion in which a user's arm can be disposed. The support element 920 and the riser element 922 can be placed on a support surface S (as shown in FIGS. 44, 45 and 47), such as, for example, a bed, for use by a user. The support element 920 and the riser element 922 collectively have a length that is substantially the same as a length of the support surface (e.g., bed) on which it is to be used as shown in FIGS. 44, 45 and 47. In alternative embodiments, the cushion system 900 can have a torso size as described above, for example, for cushion systems 200 and 700.

The side support member 964 can also be constructed the same as or similar to and include the same features as described above for side support member 864. The side support member 964 can be placed on the support element 920 during use and used to help maintain a user in a side position. In alternative embodiments, the side support member 964 can be fixedly attached to the support element 920 or integrally formed with the support element 920.

Figure 46:
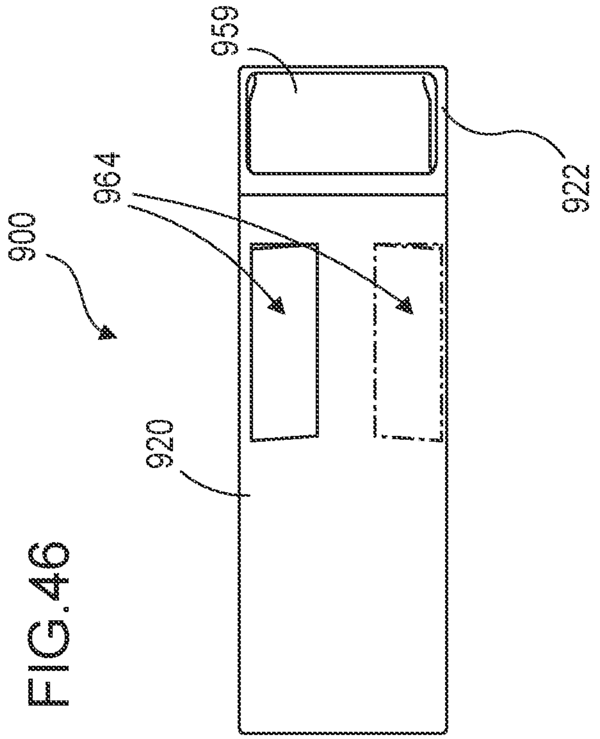
FIG. 46 is a top view of the therapeutic cushion system of FIG. 43 with a side support member shown disposed on two sides of the support element.
Figure 49:
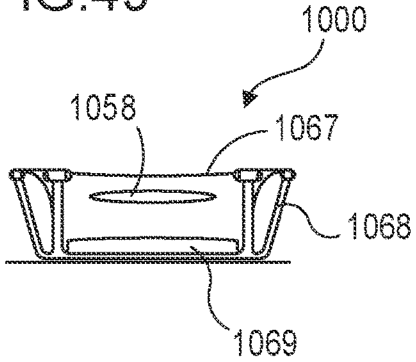
FIG. 49 is an end view of the therapeutic cushion system of FIG. 61 taken along line C-C in FIG. 48.
Figure 48:
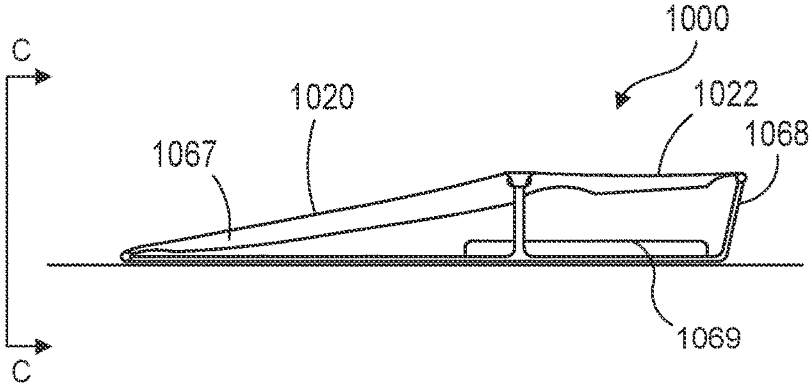
FIG. 48 is a side view of a therapeutic cushion system, according to another embodiment.
Figure 50:
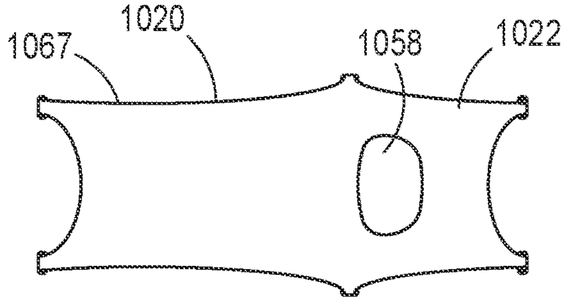
FIG. 50 is a top view of a sling member of the therapeutic cushion system of FIG. 48

The user can be positioned on the cushion system 900 as described above for previous embodiments, in an inclined RLD or LLD position, depending on the particular needs of the user. As described above, the side support member 964 can be placed on the support element 920 and used to help maintain the user in the inclined RLD or LLD position. For example, as shown in FIG. 46, the side support 964 can be disposed on the support element 920 on either a right or left side of the support element 920. FIG. 47 illustrates the cushion system 900 with an optional body element 924 instead of the side support member 964 and optional pillow 959. The body element 924 can be formed the same as or similar to and function the same as or similar to the body elements described above for previous embodiment.

FIGS. 48-52 illustrate a sling-type therapeutic cushion system, according to an embodiment. A therapeutic cushion system 1000 (also referred to herein as a "cushion system") includes a support element 1020, a riser element 1022 and an optional body element 1024 (shown in FIG. 51). In this embodiment, the support element 1020 and the riser element 1022 are integrally formed and include a sling member 1067 coupled to a frame member 1068. The support element 1020 has a wedge shape as shown, for example, in the side view of FIG. 48.

The sling member 1067 can be formed with, for example, a fabric material such as, for example, any suitable stretch or non-stretch fabric material, such as for example, canvas or nylon. The frame member 1068 can be formed with, for example, one or more metal, wood or plastic materials. The sling member 1067 can be coupled to the frame member 1068 with a variety of different coupling methods. For example, the sling member 1067 can be coupled to the frame member 1068 with ties, straps, rivets, buttons, snaps, hook and loop fasteners, or any other suitable coupling method, such that the sling member 1067 is sufficiently taut to support a user. The sling member 1067 defines a receiving portion 1058 (e.g., opening, space, gap, etc.) through which a user can place the user's right or left arm during use of the cushion system 1000. The cushion system also includes a lower pad member 1069 such that when the user's arm is extended through the opening 1058, the arm can rest on the pad member 1069.

Figure 51:
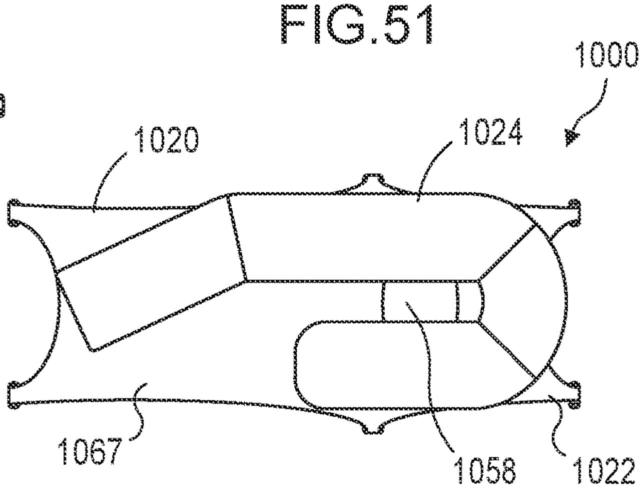
FIG. 51 is a top view of a sling member of the therapeutic cushion system of FIG. 48 with an optional body element.
Figure 52:
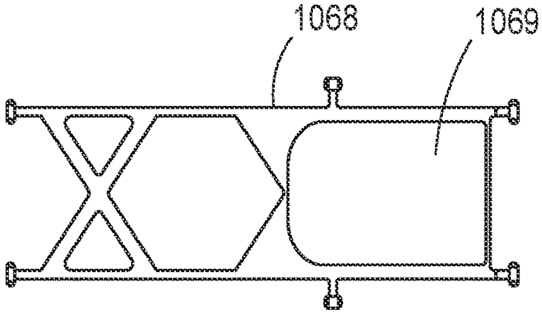
FIG. 52 is a top view of the frame and pad member of the therapeutic cushion system of FIG. 48.

As shown in FIG. 51, the cushion system 1000 can also include a body element 1024. The body element 1024 can be formed the same as or similar to, and can be used in the same or similar manner as, other body elements described herein, such as, for example, the body element 624 shown in FIG. 29. For example, the body element 1024 can be help maintain the user in a side position and help the user from sliding down the angled portion of the support element 1022 when using the cushion system 1000. During use the cushion system 1000 can be placed on a support surface S, such as a bed, as shown in FIG. 53.

Figure 53:
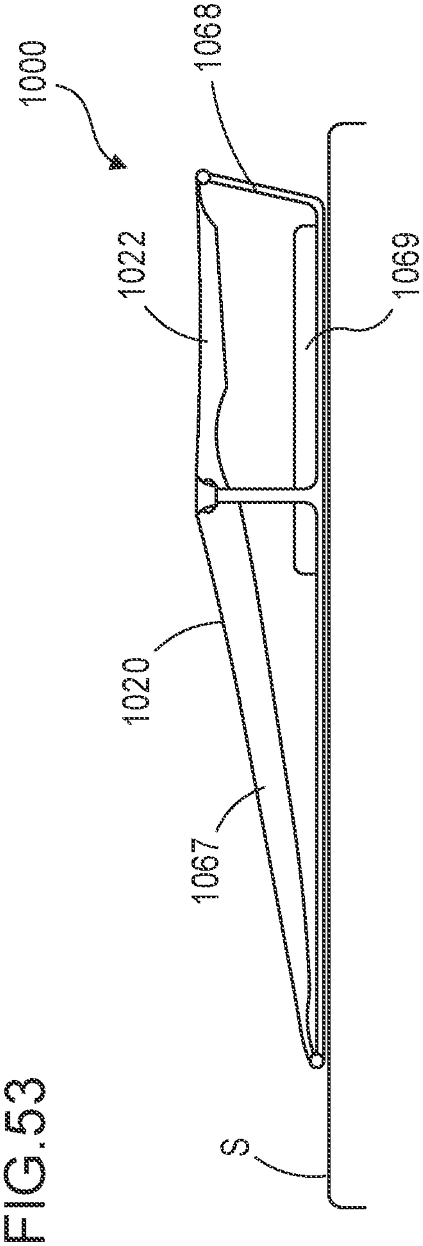
FIG. 53 is a side view of the therapeutic cushion system of FIG. 48 illustrating a bed length version.
Figure 54:
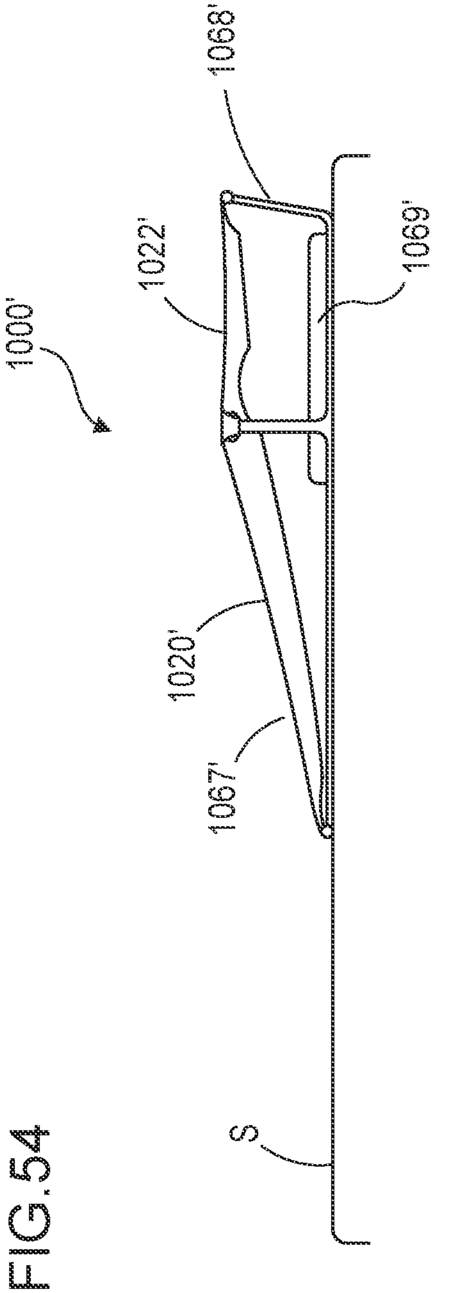
FIG. 54 is side view of the therapeutic cushion system of FIG. 48 illustrating a torso length version.

FIG. 53 illustrates the cushion system 1000 having a bed size length and FIG. 54 illustrates an alternative embodiment of the cushion system 1000 having a torso size length. The cushion system 1000' can be formed the same as or similar to the cushion system 1000 and can function the same as or similar to the cushion system 1000 and can be supported on a support surface S as shown in FIG. 54. For example, the cushion system 1000' includes a support element 1020' and a riser element 1022' that are integrally formed and define an opening (not shown) that can be used as a shoulder relief area to place the user's arm. The support element 1020' and riser element 1022' include a sling member 1067' coupled to a frame member 1068' and a pad member 1069' disposed below the opening.

Figure 55:
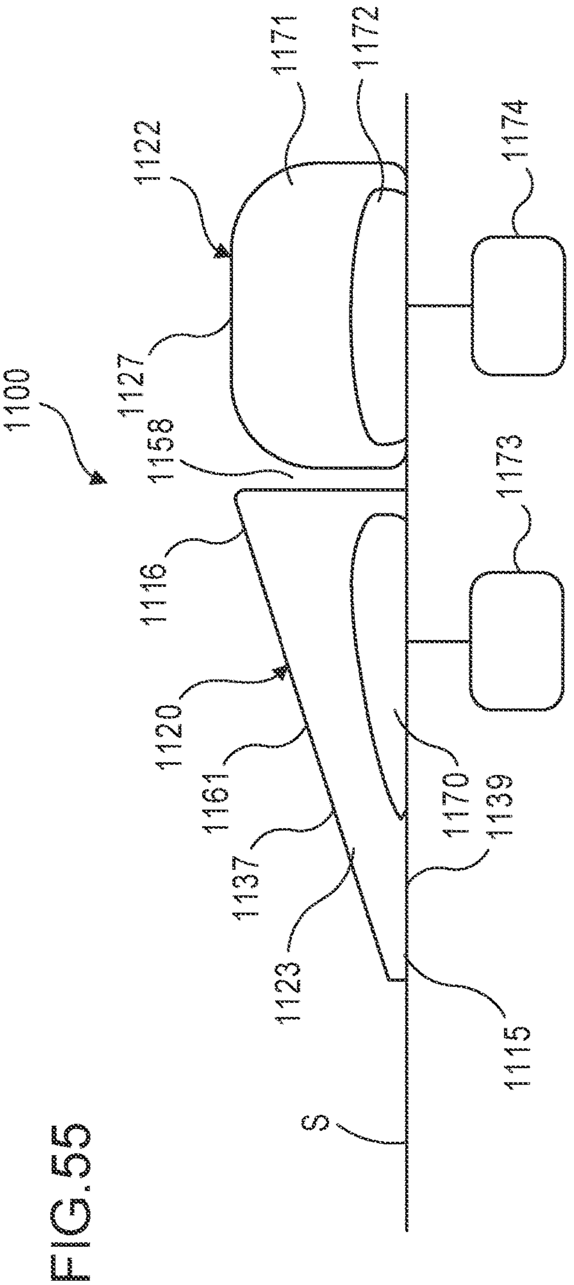
FIG. 55 is a side view of a therapeutic cushion system, according to another embodiment.

FIG. 55 illustrates an embodiment of a cushion system that includes inflatable air chambers. A therapeutic cushion system 1100 (also referred to herein as a "cushion system") includes a support element 1120 and a riser element 1122. Although not shown, the cushion system 1100 can also include a body element as described above for previous embodiments. In this embodiment, the support element 1120 includes a cushion member 1123 and an inflatable chamber 1170 each encased within an outer casing 1121. Similarly, the riser element 1122 includes a cushion member 1171 and an inflatable chamber 1172 each encased within an outer casing 1127. The cushion member 1123 and the cushion member 1171 can be formed with, for example, one or more foam materials as described above, for example, for cushion member 123. The outer casing 1121 and the outer casing 1127 can each be formed with, for example, one or more materials, as described above, for example, with respect to outer casing 121 and outer casing 127.

As described above for previous embodiments, the support element 1120 can include a first end portion 1115 and a second end portion 1116 and a top surface 1137 that is angled relative to a bottom surface 1139 between the first end portion 1115 and the second end portion 1116. The support element 1120 can also include a concave portion (not shown) and beveled or angled corners (not shown) disposed on the second end portion 1116 of the support element 1120, as described above for previous embodiments. In some embodiments, the riser element 1122 can also include a pillow insert portion (not shown) that can be disposed, for example, within a pocket formed in the cushion member 1171 of the riser element 1122 or can be disposed on top of the cushion member 1171. The pillow insert portion can include an inner casing (not shown) and filler material (not shown) as described above for previous embodiments such that the riser element 1122 can include a compliant region to allow a user to form cavities or bulges to accommodate specific body parts and/or portions to accommodate the user's needs and/or preferences.

The inflatable air chamber 1170 can be coupled to an air pump device 1173 and the inflatable chamber 1172 can be coupled to an air pump device 1174. The air pump device 1173 and/or the air pump device 1174 can be, for example, a manual pump in which the user can manually pump air into and out of the inflatable air chambers 1170 and 1172, and adjust the air pressure within the inflatable air chambers 1170 and 1172. In alternative embodiments, the air pump device 1173 and/or the air pump device 1174 can be an automated pump and include controls (not shown) for the user to adjust the air pressure within the inflatable air chambers 1170 and 1172. In alternative embodiments, a single air pump device (e.g., manual or automated) can be used to pump air into and out of both the inflatable air chambers 1170 and 1172.

The cushion system 1100 can be used the same as or similar to the cushion systems described above for previous embodiments. In this embodiment, the user can place the support element 1120 and the riser element 1122 on a support surface S (e.g., a bed) such that the second end portion 1116 (e.g., the highest end) of the support element 1120 is disposed at a desired distance from the riser element 1122. Thus, a receiving portion 1158 between the support element 1122 and the riser element 1120 can be defined such that the user can place an arm within the receiving portion 1158 during use of the cushion system 1100. The user can also adjust the air pressure within the air chambers 1170 and 1172 such that the support element 1120 and the riser element 1122 each have a desired firmness. As described above for previous embodiments, the support element 1120 and the riser element 1122 can collectively have a bed size length that is substantially the same as a length of the support surface (e.g., bed) on which it is to be used, or can alternatively have a torso size length as described above, for example, for cushion systems 200 and 700.

Figure 56:
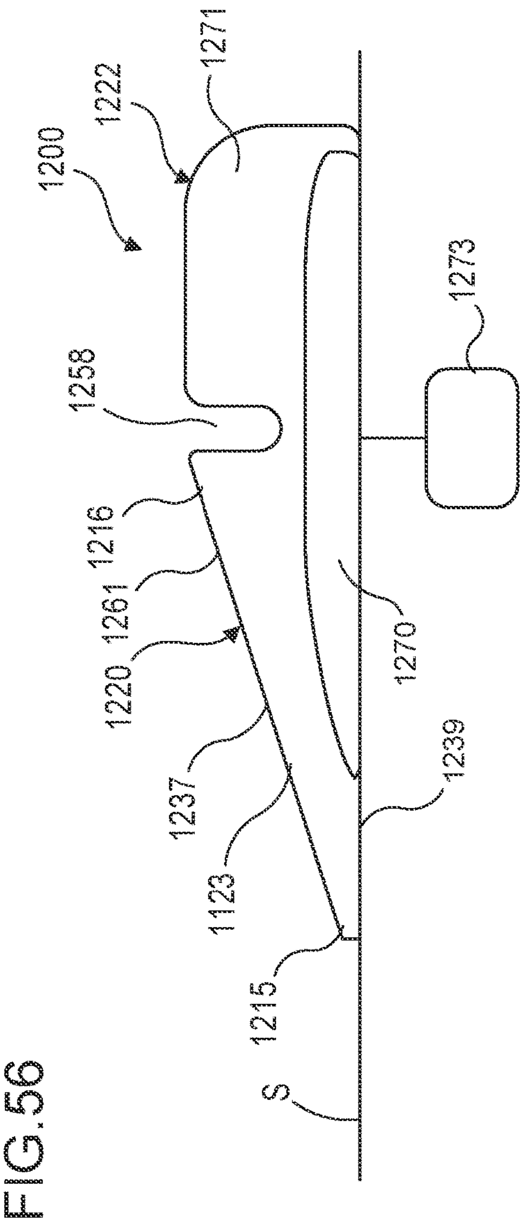
FIG. 56 is a side view of a therapeutic cushion system, according to another embodiment.

FIG. 56 illustrates another embodiment of a cushion system that includes an air chamber. A therapeutic cushion system 1200 (also referred to herein as a "cushion system") includes a support element 1220 and a riser element 1222 and can also include a body element (not shown) as described above for previous embodiments. In this embodiment, the support element 1220 and the riser element 1222 are integrally formed and include a cushion member 1223, a cushion member 1271 and an inflatable chamber 1170 each encased within an outer casing 1261. The cushion member 1223 and the cushion member 1271 can be integrally formed as a single component or be separate components. The cushion member 1223 and the cushion member 1271 can each be formed with, for example, one or more foam materials as described above, for example, for cushion member 123. The outer casing 1621 can be formed with, for example one or more materials, as described above, for example, for outer casing 121 and outer casing 127. The support element 1220 and the riser element 1222 define a receiving portion (e.g., an opening, space, gap, pocket, etc.) 1258 in which a user can place an arm during use of the cushion system 1200.

As described above for previous embodiments, the support element 1220 can include a first end portion 1215 and a second end portion 1216 and a top surface 1237 that is angled relative to a bottom surface 1239 between the first end portion 1215 and the second end portion 1216. The support element 1220 can also include a concave portion (not shown) and beveled or angled corners (not shown) disposed on the second end portion 1216, as described above for previous embodiments. In some embodiments, the riser element 1222 can also include a pillow insert portion (not shown) that can be disposed, for example, within a pocket formed in the cushion member 1271 of the riser element 1222 or can be disposed on top of the cushion member 1271. The pillow insert portion can include an inner casing (not shown) and filler material (not shown) as described above for previous embodiments such that the riser element 1222 can include a compliant region to allow a user to form cavities or bulges to accommodate specific body parts and/or portions to accommodate the user's needs and/or preferences.

The inflatable air chamber 1270 can be coupled to an air pump device 1273. The air pump device 1273 can be, for example, a manual pump in which the user can manually pump air in and out of the inflatable air chamber 1273 and adjust the air pressure within the inflatable air chambers 1270. In alternative embodiments, the air pump device 1273 can be an automated pump and include controls (not shown) for the user to adjust the air pressure within the inflatable air chamber 1270. In alternative embodiments, the riser element 1222 and the support element 1220 can each include an inflatable air chamber and two separate air pump devices (e.g., manual or automated) can be used to pump air into and out of both the inflatable air chambers, in a similar manner as described above for cushion system 1100.

The cushion system 1200 can be used the same as or similar to the cushion systems described above for previous embodiments. In this embodiment, the user can place the cushion system 1200 on a support surface S (e.g., a bed) and can adjust the air pressure within the air chamber 1270 such that the support element 1220 and the riser element 1222 each have a desired firmness. As described above for previous embodiments, the support element 1220 and the riser element 1222 can collectively have a bed size length that is substantially the same as a length of the support surface (e.g., bed) on which it is to be used, or can alternatively have a torso size length as described above, for example, for cushion systems 200 and 700.

Figure 57:
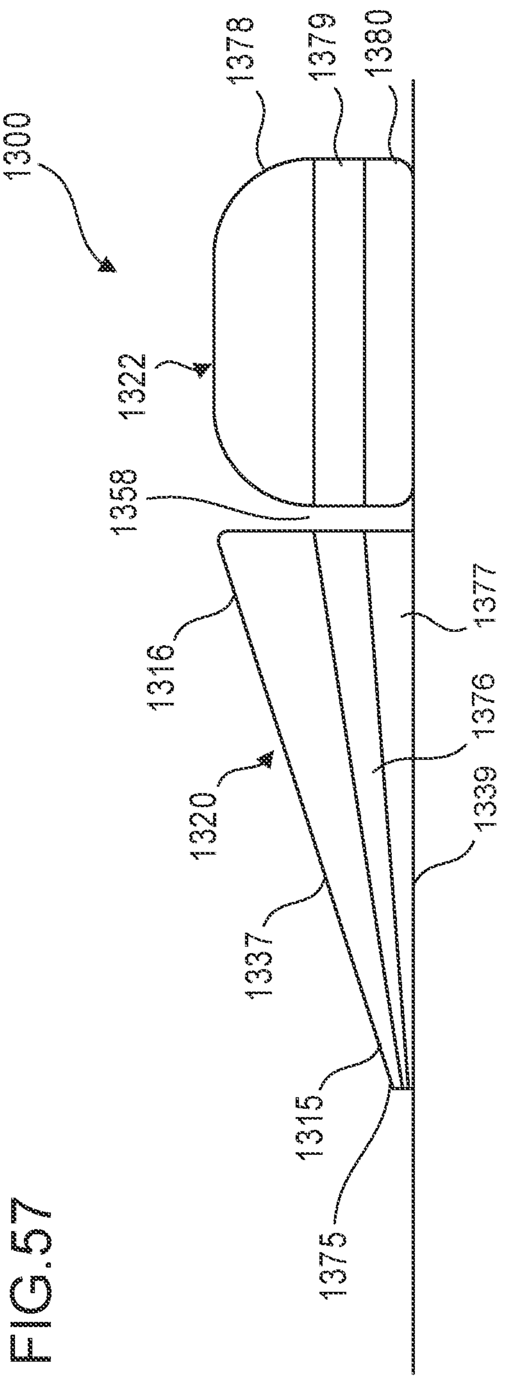
FIG. 57 is a side view of a therapeutic cushion system, according to another embodiment.
Figure 58:
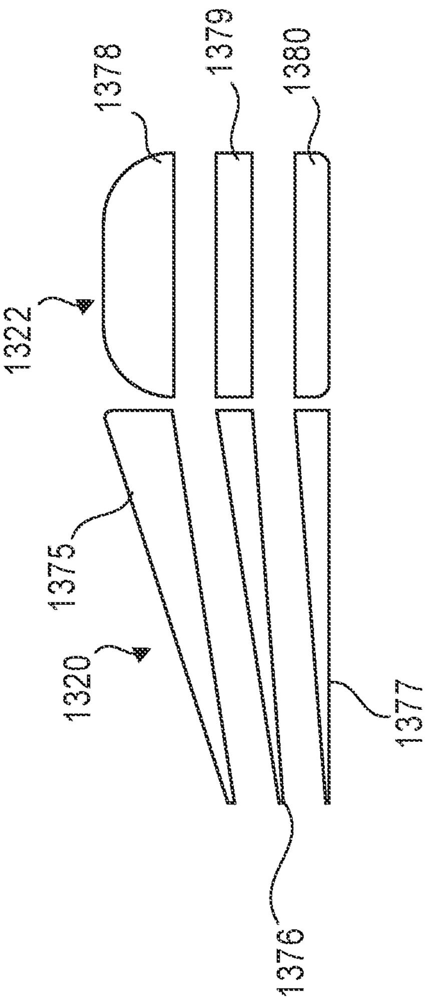
FIG. 58 is a side exploded view of the therapeutic cushion system of FIG. 57.

FIGS. 57 and 58 illustrate an embodiment of a cushion system that includes stackable portions to allow a user to assemble the cushion system to have a desired thickness and/or firmness. A therapeutic cushion system 1300 (also referred to herein as a "cushion system") includes a support element 1320 and a riser element 1322. Although not shown, the cushion system 1300 can also include a body element as described above for previous embodiments. In this embodiment, the support element 1320 includes multiple stackable support elements 1375, 1376 and 1377 and the riser element 1322 includes multiple stackable riser elements 1378, 1379 and 1380 (collectively also referred to herein as stackable elements). Although the support element 1320 is shown with three stackable support elements and the riser element 1322 is shown with three stackable riser elements, it should be understood that more or less stackable support elements and stackable riser elements can alternatively be included. In addition, the support element 1320 can include a different number of stackable support elements than the stackable riser elements of the riser element 1322.

The stackable elements 1375-1380 can each include a cushion member encased within an outer casing as described above for previous embodiments of a support element (e.g., support element 123). The cushion members can be formed with, for example, one or more foam materials, as described above, for example, for cushion member 123. Each stackable element 1375-1380 can have a cushion member formed with a foam material having the same or different density.

The stackable support elements 1375-1377 can be selectively stacked to form the support element 1320 such that the support element 1320 has a desired height or thickness and/or a desired firmness. Similarly, the stackable riser members 1378-1380 can be selectively stacked to form the riser element 1322 such that the riser element 1322 has a desired height or thickness and/or a desired firmness.

Each of the stackable support elements 1375-1377 of the support element 1320 can include an angled top surface such that the support element 1320 has a wedge shape with a top surface 1337 that is angled relative to a bottom surface 1339 from a first end portion 1315 to a second end portion 1316, as shown in FIG. 57. In alternative embodiments, each of the stackable elements 1375-1377 can have a top surface that is substantially horizontal or flat, or can have a top surface that is tiered or stepped. Each of the stackable support elements 1375-1377 of the support element 1320 can also include a concave portion (not shown) at, for example, a substantially center location on the highest or second end portion 1316 of the support element 1320, and beveled or angled corners (not shown) as described above for previous embodiments.

Each of the stackable elements 1378-1380 include a top surface that is at least partially substantially horizontal or flat. In alternative embodiments, each of the stackable elements 1378-1380 can have a top surface that is angled or can be tiered or stepped. In some embodiments, the riser element 1322 can also include a pillow insert portion (not shown) that can be disposed, for example, within a pocket formed in at least one of the stackable riser elements, such as, the stackable riser element 1378 intended to be used as a top of the riser element 1322. The pillow insert portion can include an inner casing (not shown) and filler material (not shown) as described above for previous embodiments such that the stackable riser element 1378 of the riser element 1322 can include a compliant region to allow a user to form cavities or bulges to accommodate specific body parts and/or portions to accommodate the user's needs and/or preferences. In some embodiments, the stackable riser element 1378 may not include a pillow insert, but instead include filler material disposed on a top portion of the cushion member of the stackable riser element 1378.

The cushion system 1300 can be used the same as or similar to the cushion systems described above for previous embodiments. In this embodiment, the user can place the support element 1320 and the riser element 1322 on a support surface S (e.g., a bed) such that the second end portion 1316 (e.g., the highest end) of the support element 1320 is disposed at a desired distance from the riser element 1322. Thus, a receiving portion 1358 between the support element 1322 and the riser element 1320 can be defined such that the user can place an arm within the receiving portion 1358 during use of the cushion system 1300. For example, the user can stack one or more of the stackable support elements 1375-1377 of the support element 1320 such that the support element 1320 is at a desired height (or has a desired thickness), and has a desired firmness. The user can also stack one or more of the stackable riser elements 1378-1380 of the riser element 1322 such that the riser element 1322 is at a desired height (or has a desired thickness), and has a desired firmness. The user can stack the stackable elements 1375-1380 on the support surface S, or can stack the stackable elements 1375-1380 first then place the assembled support element 1320 and assembled riser element 1322 on the support surface S. As described above for previous embodiments, the support element 1320 and the riser element 1322 can collectively have a bed size length that is substantially the same as a length of the support surface (e.g., bed) on which it is to be used, or can alternatively have a torso size length as described above, for example, for cushion systems 200 and 700.

Figure 59:
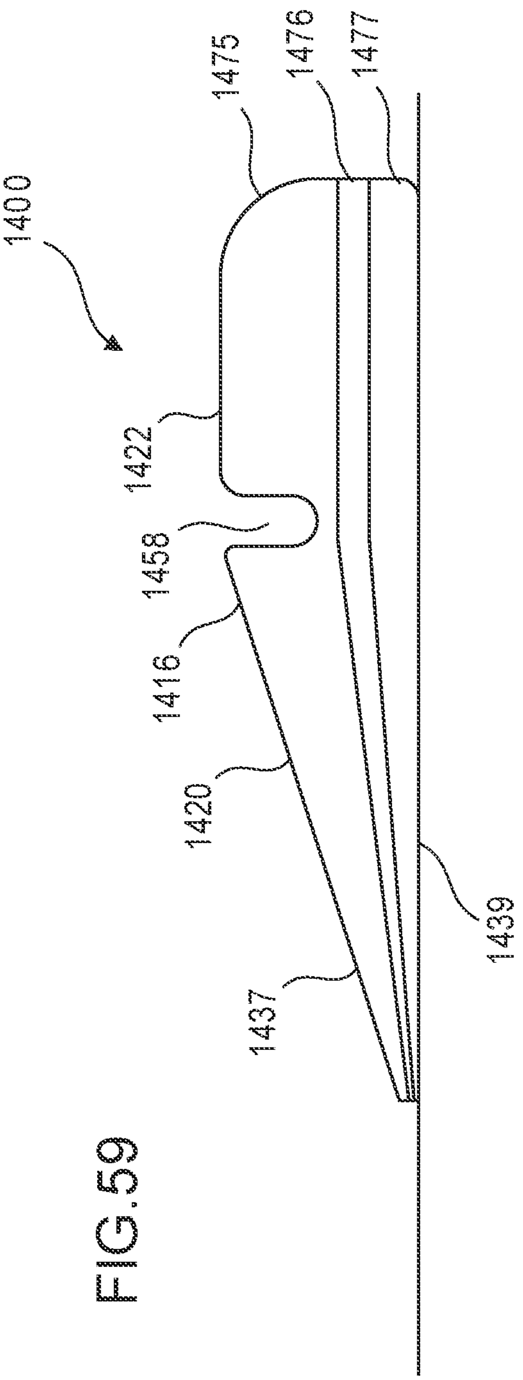
FIG. 59 is a side view of a therapeutic cushion system, according to another embodiment.
Figure 60:
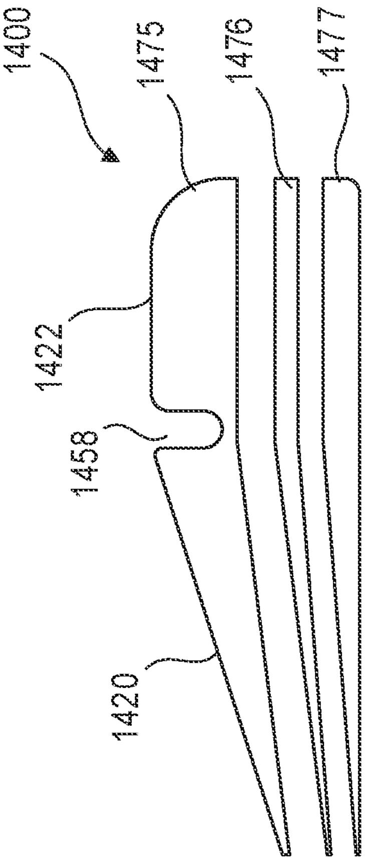
FIG. 60 is a side exploded view of the therapeutic cushion system of FIG. 59.
Figure 61:
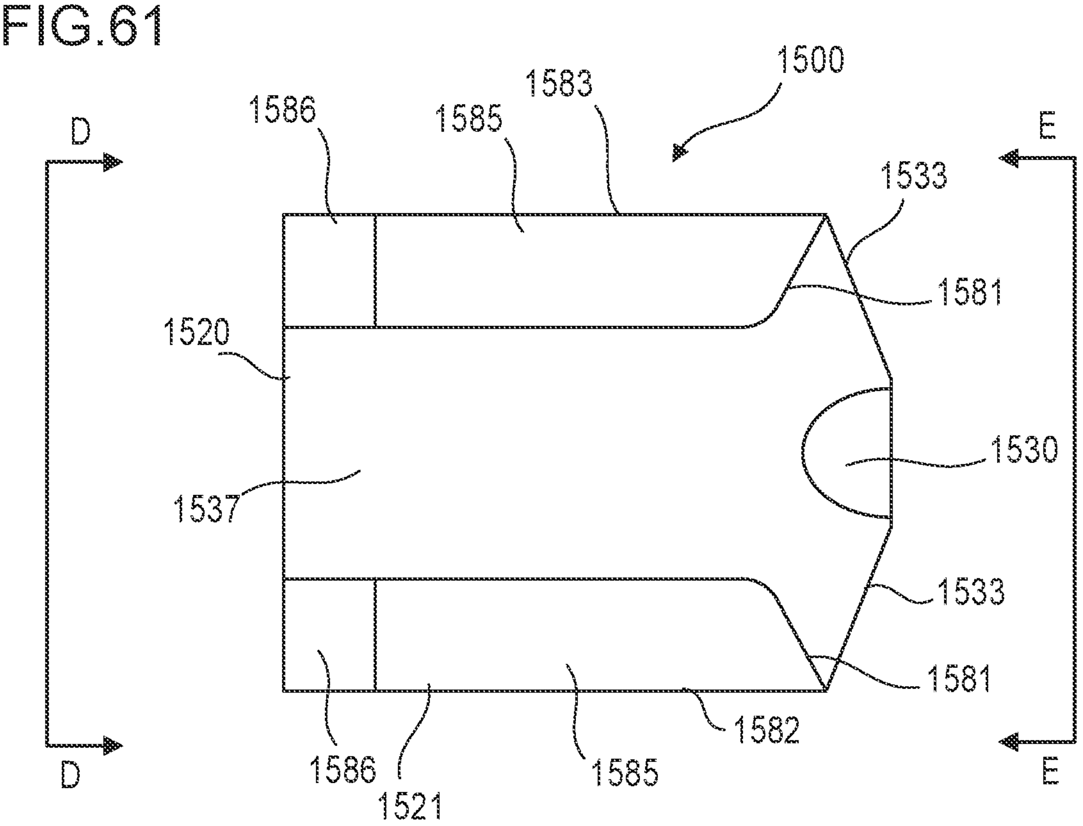
FIG. 61 is a top view of a support element, according to an embodiment.
Figure 62:
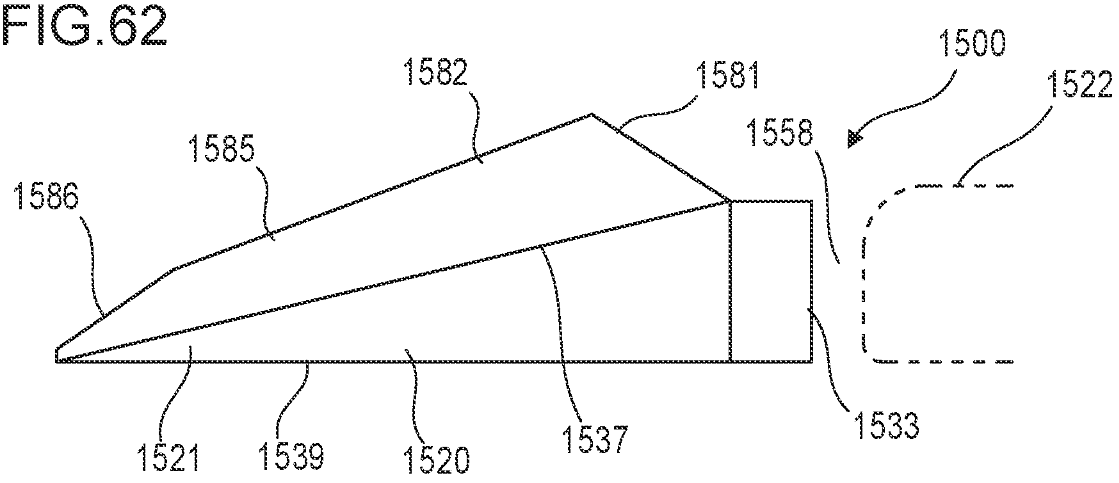
FIG. 62 is a side view of the support element of FIG. 61, shown adjacent a portion of a riser element.
Figure 64:
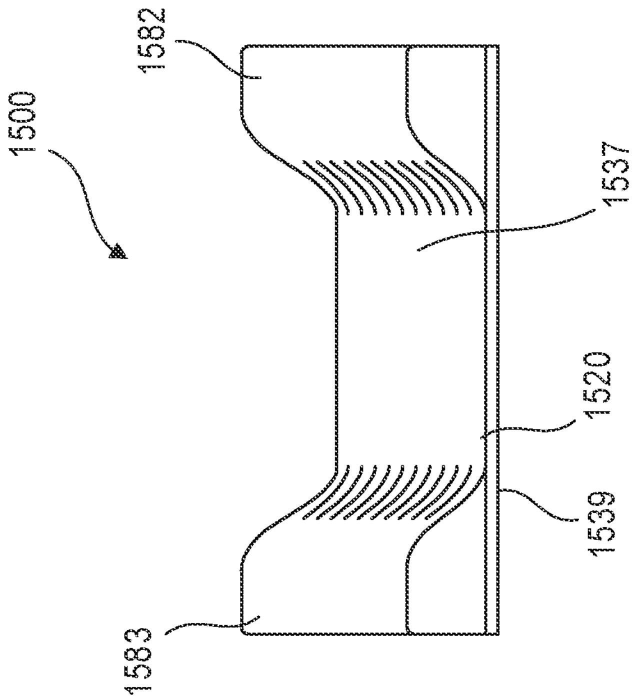
FIG. 64 is a foot end view of the support element of FIG. 61 taken along line D-D in FIG. 61.
Figure 63:
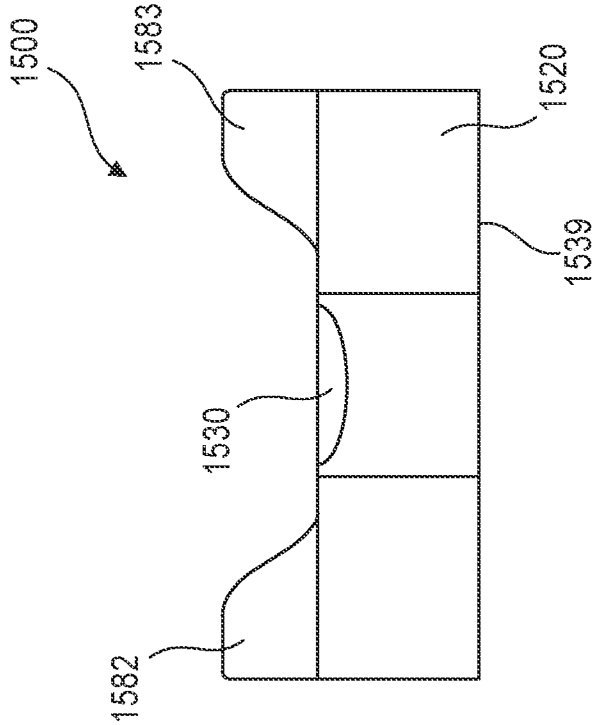
FIG. 63 is a front end view of the support element of FIG. 61 taken along line E-E in FIG. 61.

FIGS. 59 and 60 illustrate another embodiment of a cushion system that includes stackable portions to allow a user to assemble the cushion system to have a desired thickness and/or firmness. A therapeutic cushion system 1400 (also referred to herein as a "cushion system") includes a support element 1420 and a riser element 1422 and can also include a body element (not shown) as described above for previous embodiments. In this embodiment, the support element 1420 and the riser element 1422 are formed as a single cushion element and include multiple stackable cushion elements 1475, 1476 and 1477 that can be stacked on top of each other to form the support element 1420 and riser element 1422. At least one of the stackable cushion elements 1475-1477 can define a receiving portion 1458 between the riser element 1422 and the support element 1420 in which a user can place an arm during use of the cushion system 1400. For example, as shown in FIGS. 59-60, the stackable cushion element 1475 defines the receiving portion 1458. Although the combined support element 1420 and the riser element 1422 is shown with three stackable cushion elements, it should be understood that more or less stackable cushion elements can alternatively be included.

The stackable cushion elements 1475-1477 can each be formed, for example, similar to the stackable support elements and stackable riser elements described above for cushion system 1300. For example, the stackable cushion elements 1475-1480 can each include a cushion member formed with one or more foam materials, as described above, for example, for cushion member 123. Each of the cushion members 1475-1477 can be formed with a foam material having the same or different density.

Each cushion member 1475-1477 can also include an outer casing formed with, for example one or more materials, as described above, for example, for outer casing 121 and outer casing 127. Each of the cushion members 1475-1477 can include a top surface angled relative to a bottom surface such that the support element 1420 has a wedge shape with a top surface 1437 that is angled relative to a bottom surface 1439 from a first end portion 1415 to a second end portion 1416, as shown in FIG. 59. In alternative embodiments, each of the stackable elements 1475-1477 can have a top surface that is substantially horizontal or flat, or can have a top surface that is tiered or stepped. Each of the stackable cushion elements 1475-1477 can also include a concave portion (not shown) at, for example, a substantially center location on the highest portion of the stackable cushion element and beveled or angled corners (not shown), as described above for previous embodiments.

Each of the stackable elements 1478-1380 includes a top surface that is at least partially substantially horizontal or flat. In alternative embodiments, each of the stackable elements 1478-1480 can have a top surface that is angled or can be tiered or stepped. As described above for riser element 1322, the riser element 1422 can also include a pillow insert portion (not shown) that can be disposed, for example, within a pocket formed in the stackable cushion element 1475. The pillow insert portion can include an inner casing (not shown) and filler material (not shown) as described above for previous embodiments such that the riser element 1422 can include a compliant region to allow a user to form cavities or bulges to accommodate specific body parts and/or portions to accommodate the user's needs and/or preferences. In some embodiments, the stackable cushion element 1475 may not include a pillow insert, but instead include filler material disposed on a top portion of the cushion element 1475.

The cushion system 1400 can be used the same as or similar to the cushion system 1300 described above. In this embodiment, the user can place the cushion system 1400 (i.e., collectively the support element 1420 and the riser element 1422) on a support surface S (e.g., a bed). For example, the user can stack one or more of the stackable cushion elements 1475-1477 such that the support element 1420 and the riser element 1422 are at a desired height (or have a desired thickness), and have a desired firmness. As described above for previous embodiments, the support element 1420 and the riser element 1422 collectively can have a bed size length that is substantially the same as a length of the support surface (e.g., bed) on which it is to be used, or can alternatively have a torso size length as described above, for example, for cushion systems 200 and 700.

FIGS. 61-64 illustrate an embodiment of a cushion system that includes a support element with side bolster portions that can be used to help maintain a user in a lateral position on the cushion system. A therapeutic cushion system 1500 (also referred to herein as a "cushion system") includes a support element 1520 that can be used with a riser element 1522 (see FIG. 62), such as, for example, the riser element 1122 or 1322. The cushion system 1500 also includes a first side bolster portion 1582 and a second side bolster portion 1583 disposed on an opposite side of the support element 1520. The side bolster portions 1582 and 1583 can be used to help maintain a user in a lateral position during use of the cushion system 1500. In this embodiment, the side bolster portions 1582 and 1583 each include a first top surface portion 1585 and a second top surface portion 1586 disposed at a different angle than the first top surface portion 1586 relative to a bottom surface 1539 of the support element 1520. The side bolster portions 1582 and 1583 also each include an angled or beveled portion 1581 as shown for example in FIGS. 61 and 62.

The support element 1520 also includes an angled top surface 1537, a concave portion 1530 and beveled or angled portions 1533 at a second end of the support element 1520. As with previous embodiments, the support element 1520 can include a cushion member (not shown) that can be formed with, for example, one or more foam materials, and an outer casing 1521 that can encase the cushion member and the side bolster portions 1582 and 1583. In some embodiments, the side bolster portions 1582 and 1583 can be formed with a foam material that has a different density than the foam material forming the support element 1520. In alternative embodiments, the side bolster portions 1582 and 1583 can each be formed as separate components (i.e., separate from the support element 1520 similar to the side support members 864 and 964 described above).

The cushion system 1500 can be used the same as or similar to the cushion systems described above for previous embodiments. For example, in this embodiment, the user can place the support element 1520 on a support surface such that the second end (e.g., the highest end) of the support element 1520 is disposed at a desired distance from the riser element 1522 (shown in FIG. 62). Thus, a receiving portion 1558 between the support element 1520 and the riser element 1522 can be defined such that the user can place an arm within the receiving portion 1558 during use of the cushion system 1500. For example, the user can position the user's body in a lateral position (i.e., either a right-side lateral position or a left-side lateral position) and place the user's arm within the open space 1558. An optional body element (not shown) can also be used in the same or similar manner as described above for previous embodiments. As described above for previous embodiments, the support element 1520 can be sized such that the support element 1520 and the riser element 1522 collectively have a bed size length, or can alternatively have a torso size length.

Figure 65:
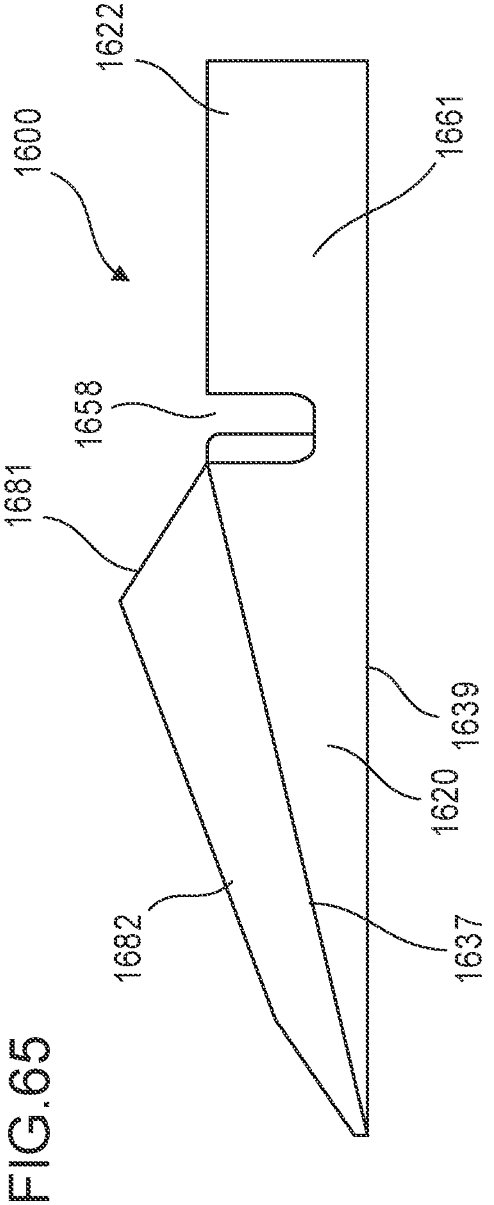
FIG. 65 is a side view of a support element, according to another embodiment.
Figure 66:
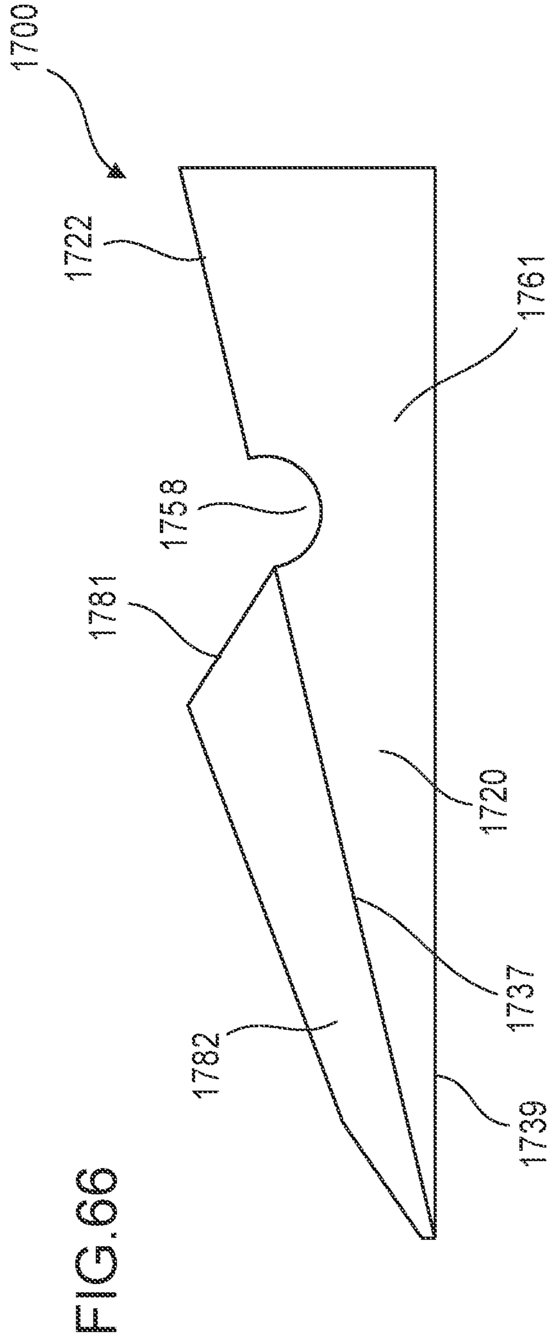
FIG. 66 is a side view of a support element, according to another embodiment.
Figure 67:
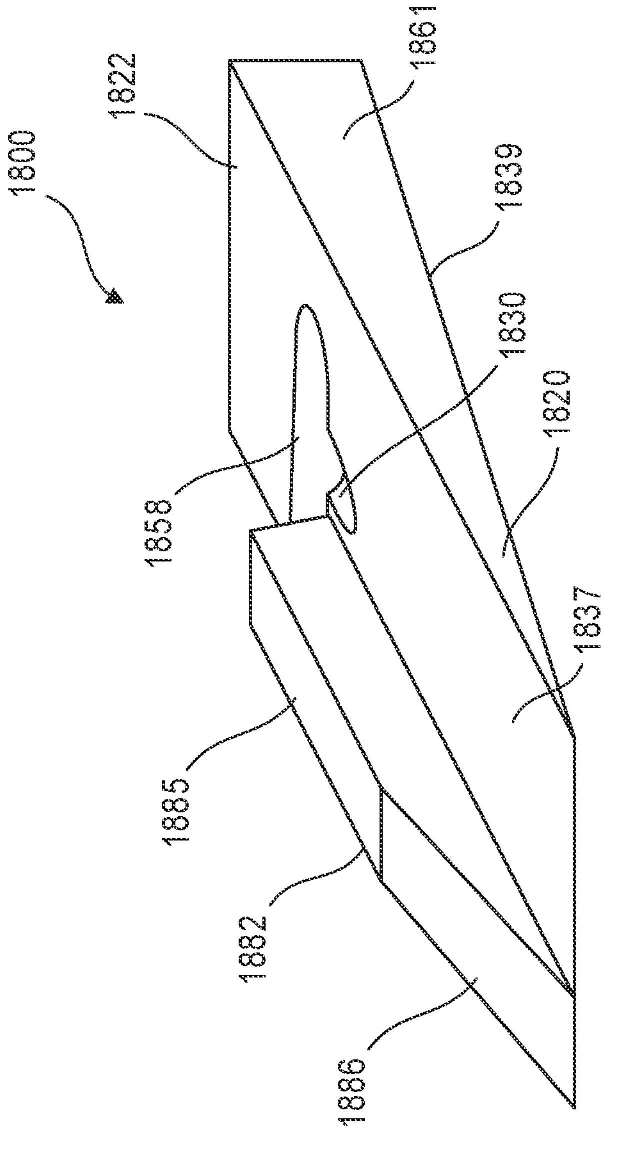
FIG. 67 is a perspective view of a therapeutic cushion system, according to another embodiment.
Figure 68:
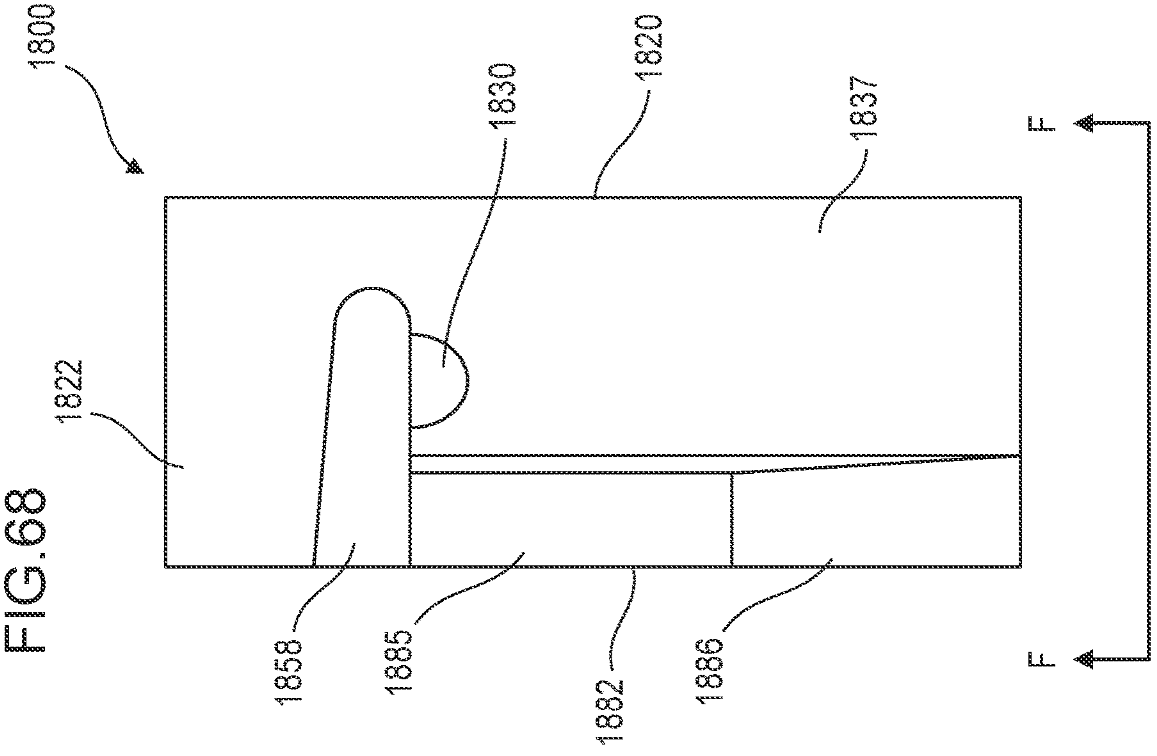
FIG. 68 is a top view of the therapeutic cushion system of FIG. 67.
Figure 69:
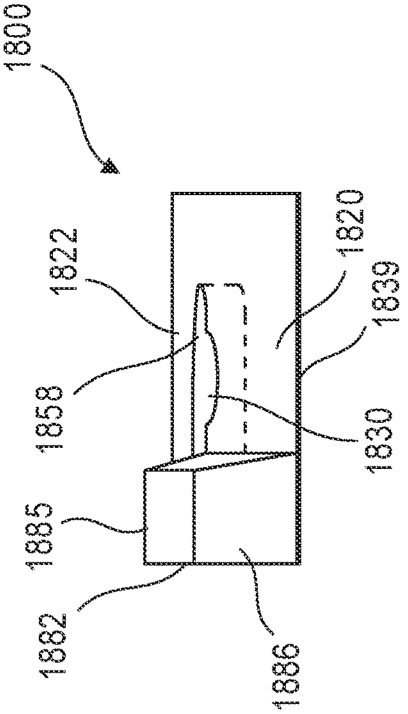
FIG. 69 is an end view of the therapeutic cushion system of FIG. 67 taken along line F-F in FIG. 68.
Figure 70:
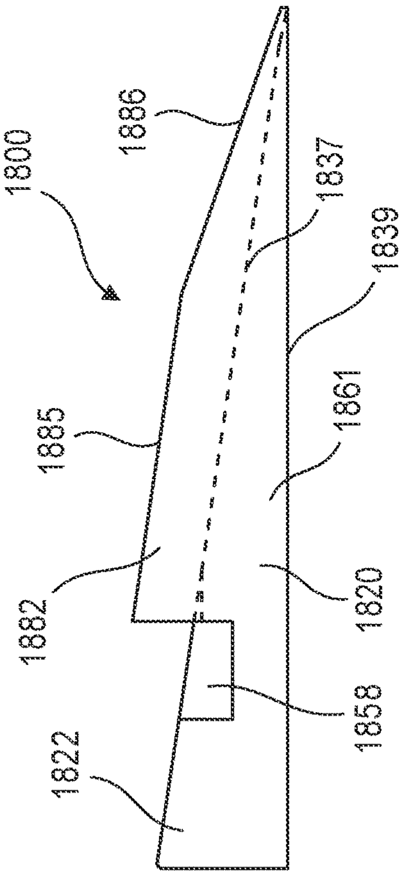
FIG. 70 is a side view of the therapeutic cushion system of FIG. 67.
Figure 71:
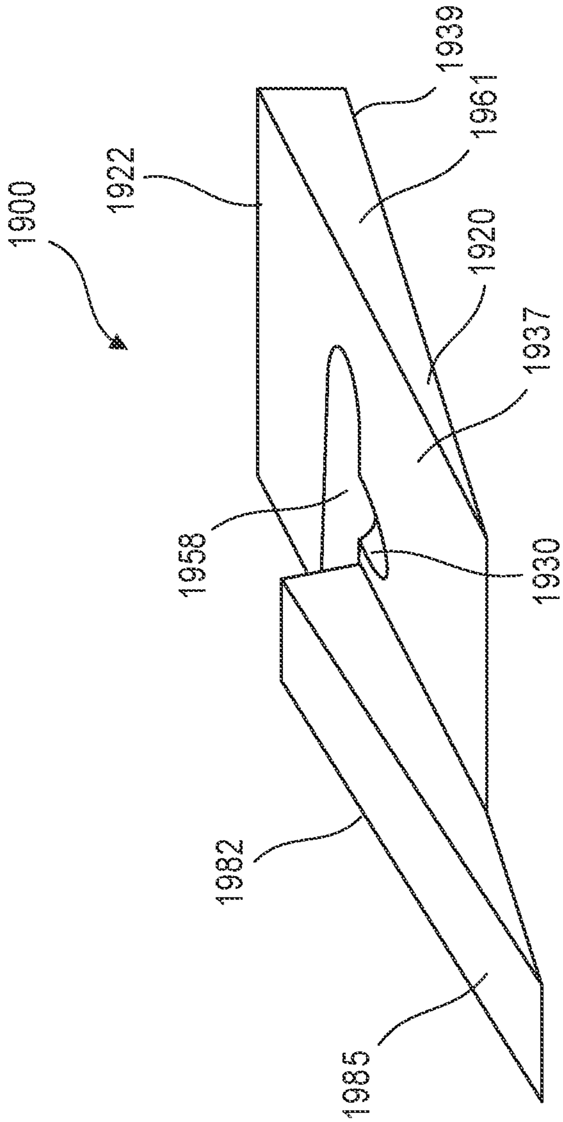
FIG. 71 is a perspective view of a therapeutic cushion system, according to another embodiment.
Figure 73:
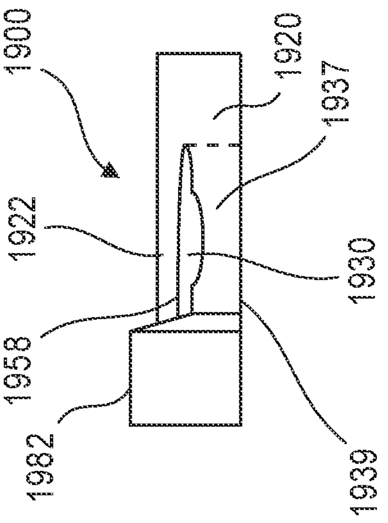
FIG. 73 is an end view of the therapeutic cushion system of FIG. 71 taken along line G-G in FIG. 72.
Figure 74:
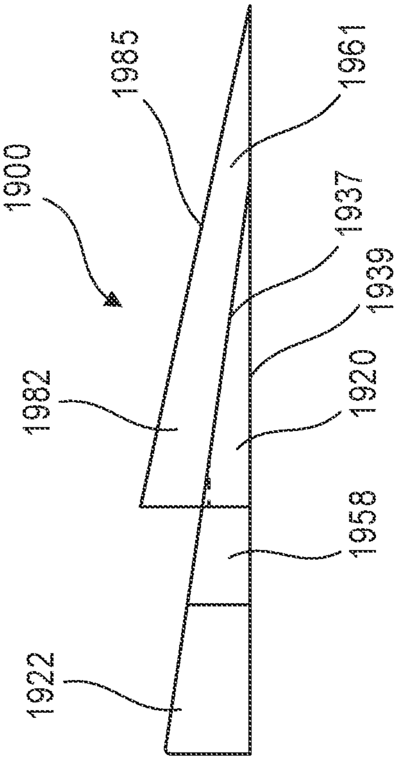
FIG. 74 is a side view of the therapeutic cushion system of FIG. 71.
Figure 72:
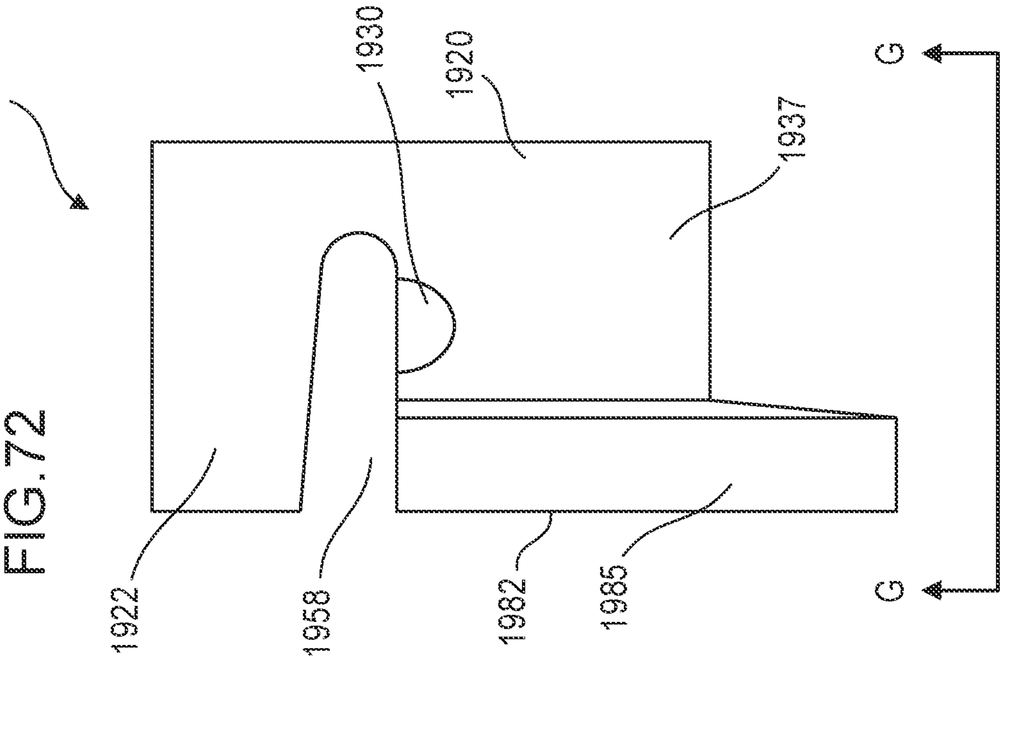
FIG. 72 is a top view of the therapeutic cushion system of FIG. 71.

FIGS. 65 and 66 each illustrate an embodiment of a cushion system that includes side bolster portions. FIG. 65 illustrates a therapeutic cushion system 1600 (also referred to herein as a "cushion system") that includes a support element 1620 and a riser element 1622 formed as a single component. The support element 1620 and the riser element 1622 collectively define a receiving portion 1658 in which a user can place an arm during use of the cushion system 1600. As with the previous embodiment, the cushion system 1600 also includes a first side bolster portion 1682 and a second side bolster portion (not shown in FIG. 65) on an opposite side of the support element 1620 that can each be used to help maintain a user in a lateral position during use of the cushion system 1600. As with the previous embodiment, the first side bolster portion 1682 and the second side bolster portion (not shown) each include a first top surface portion 1685 and a second top surface portion 1686 disposed at a different angle than the first top surface portion 1685 relative to a bottom surface 1639 of the support element 1620. The first side bolster portion 1682 (and the second side bolster portion) also each include an angled or beveled portion 1681.

The support element 1620 includes an angled top surface 1637, and can include a concave portion (not shown) at a second end of the support element 1620, as described above for previous embodiments. As with previous embodiments, the support element 1620 can include a cushion member (not shown) that can be formed with, for example, one or more foam materials, and an outer casing 1661 can encase the cushion member, the first side bolster portion 1682 and the second side bolster portion (not shown). The outer casing 1661 can also encase a cushion member (not shown) and pillow insert portion (not shown) of the riser element 1622.

FIG. 66 illustrates a therapeutic cushion system 1700 (also referred to herein as a "cushion system") that includes a support element 1720 and a riser element 1722 formed as single component. The support element 1720 and the riser element 1722 collectively define a receiving portion 1758 in which a user can place an arm during use of the cushion system 1700. As with the previous embodiment, the cushion system 1700 also includes a first side bolster portion 1782 and a second side bolster portion (not shown in FIG. 66) on an opposite side of the support element 1720 that can each be used to help maintain a user in a side position during use of the cushion system 1700. As with the previous embodiment, the first side bolster portion 1782 and the second side bolster portion (not shown) each include a first top surface portion 1785 and a second top surface portion 1786 disposed at a different angle than the first top surface portion 1785 relative to a bottom surface 1739 of the support element 1720. The first side bolster portion 1782 (and the second side bolster portion) also each include an angled or beveled portion 1781.

The support element 1720 includes an angled top surface 1737, and can include a concave portion (not shown) at a second end of the support element 1720 as described above for previous embodiments. As with previous embodiments, the support element 1720 can include a cushion member (not shown) that can be formed with, for example, one or more foam materials, and an outer casing 1761 can encase the cushion member, the first side bolster portion 1782 and the second side bolster portion (not shown). The outer casing 1761 can also encase a cushion member (not shown) and pillow insert portion (not shown) of the riser element 1722.

The cushion systems 1600 and 1700 can each be used in the same or similar manner as described above for previous embodiments of a cushion system. For example, the user can place the cushion system 1600 or 1700 (i.e., the support element 1620, 1720 and the riser element 1622, 1722) on a support surface and the user can position the user's body in a side position (i.e., either a right-side lateral position or a left-side lateral position) and place the user's arm within the receiving portion 1658 or 1758. As described above for previous embodiments, the cushion system 1600 (i.e., the support element 1620 and the riser element 1622 collectively) and the cushion system 1700 (i.e., the support element 1720 and the riser element 1722 collectively) can have a bed size length, or can alternatively have a torso size length. An optional body element (not shown) can also be used in the same or similar manner as described above for previous embodiments.

FIGS. 67-70 illustrate another embodiment of a cushion system with a side bolster portion. In this embodiment, a therapeutic cushion system 1800 (also referred to herein as a "cushion system") includes a support element 1820 and a riser element 1822 formed as a single component. The support element 1820 and the riser element 1822 collectively define a receiving portion 1858 in which a user can place an arm during use of the cushion system 1800. The cushion system 1800 also includes a side bolster portion 1882 disposed on one side of the support element 1820. The side bolster portion 1882 can be used to help maintain a user in a right-side position during use of the cushion system 1800. In this embodiment, the side bolster 1882 includes a first top surface portion 1885 and a second top surface portion 1886 disposed at a different angle than the first top surface portion 1885 relative to a bottom surface 1839 of the support element 1820.

The support element 1820 includes an angled top surface 1837 and a concave portion 1830 at a second end of the support element 1820 as described above for previous embodiments. As with previous embodiments, the support element 1820 can include a cushion member (not shown) that can be formed with, for example, one or more foam materials, and an outer casing 1861 (see, e.g., FIGS. 67 and 70) can encase the cushion member and the side bolster portion 1882. The outer casing 1861 can also encase a cushion member (not shown) and pillow insert portion (not shown) of the riser element 1822. In this embodiment, the side bolster 1882 includes a first top surface portion and a second top surface portion angled at a different angle than the first top surface portion relative to a bottom surface 1839 of the support element 1820.

The cushion system 1800 can be used in the same or similar manner as described above for previous embodiments of a cushion system. For example, the user can place the cushion system 1800 (i.e., the support element 1820 and the riser element 1822) on a support surface. In this embodiment, the user can position the user's body in a right-side position and place the user's right arm within the open space 1858. An optional body element (not shown) can also be used in the same or similar manner as described above for previous embodiments.

The cushion system 1800 (i.e., the support element 1820 and the riser element 1822 collectively) has a bed size length. FIGS. 71-74 illustrate a cushion system 1900 (also referred to herein as a "cushion system") that can be configured the same as or similar to the cushion system 1800 but has a torso size length. The cushion system 1900 includes a support element 1920, a riser element 1922, and a side bolster 1982. The support element 1920 and the riser element 1922 are formed as a single component and collectively define a receiving portion 1958 in which a user can place an arm during use of the cushion system 1900. The side bolster portion 1982 is disposed on one side of the support element 1920 and can be used to help maintain a user in a right-side position during use of the cushion system 1900. In this embodiment, the side bolster 1982 includes an angled top surface 1985 that is angled relative to a bottom surface 1939 of the support element 1920. As shown for example, in FIGS. 71 and 72, the side bolster 1982 extends beyond a tail or foot end of the support element 1920.

The support element 1920 includes an angled top surface 1937 and a concave portion 1930 at a second end of the support element 1920 as described above for previous embodiments. As with previous embodiments, the support element 1920 can include a cushion member (not shown) that can be formed with, for example, one or more foam materials, and an outer casing 1961 (see, e.g., FIGS. 71 and 74) can encase the cushion member and the side bolster portion 1982. The outer casing 1961 can also encase a cushion member (not shown) and pillow insert portion (not shown) of the riser element 1922.

The cushion system 1900 can be used in the same or similar manner as described above for previous embodiments of a cushion system. For example, the user can place the cushion system 1900 (i.e., the support element 1920 and the riser element 1922) on a support surface. In this embodiment, the user can position the user's body in a right-side position on the cushion system 1900 and place the user's right arm within the open space 1958. An optional body element (not shown) can also be used in the same or similar manner as described above for previous embodiments.

Figure 75:
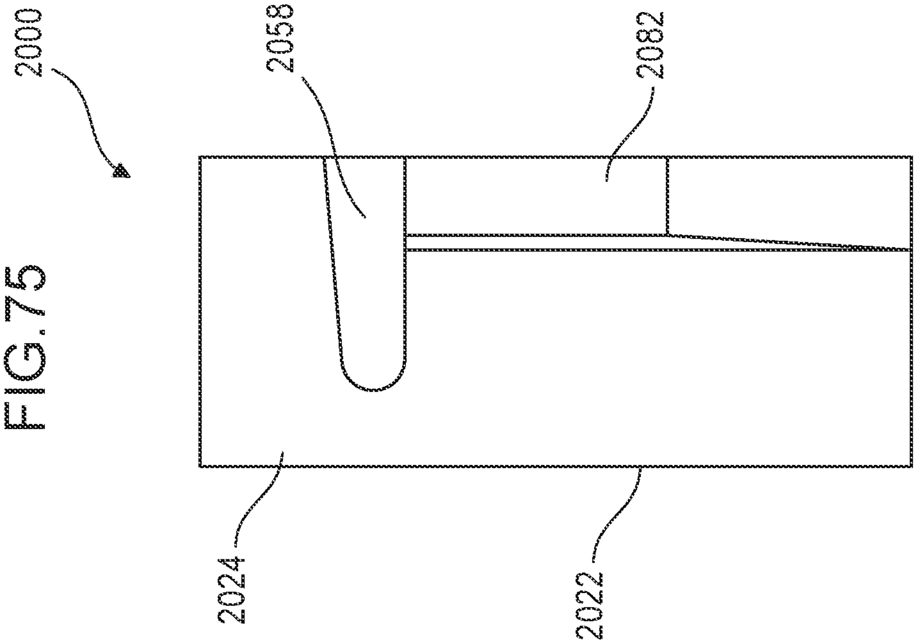
FIG. 75 is a top view of a therapeutic cushion system according to another embodiment.

Although cushion system 1800 and cushion system 1900 are described above as having a side bolster portion on one side of the cushion system 1800, 1900 such that the user can be positioned on the cushion system 1800, 1900 in a right-side position with the user's right arm within the open space 1858, 1958, in alternative embodiments, the cushion systems 1800 and 1900 can be configured such that the user can be positioned in a left-side position on the cushion system 1800, 1900. For example, the cushion system 1800 and the cushion system 1900 can each alternatively include a side bolster portion on the left side of the cushion system and an open space disposed such that a user can be positioned on the cushion system in a left-side position with the user's left arm within the open space. An example of such an embodiment is illustrated in FIG. 75. As shown in FIG. 75, a therapeutic cushion system 2000 (also referred to herein as a "cushion system") can include a support element 2020 and a riser element 2020 that collectively define a receiving portion 2058 and a side bolster portion 2082. The cushion system 2000 can include features the same as or similar to, and function the same as or similar to, the cushion systems 1800 and 1900.

FIGS. 76, 77 and 78(A)-78(E) each illustrate a different embodiment of a support element that includes a non-slip feature and that can be included in a cushion system as described herein. The non-slip surface feature(s) can be disposed on a top surface of support element and/or on a bottom surface of a side support member (e.g., 864, 964) or a bolster member (e.g., 1582, 1583). For example, a non-slip surface feature can be disposed on a bottom surface of a side support member (or separate bolster member) and/or on a top surface of the support element on which the side support element is to be disposed. Thus, a non-slip surface feature(s) can also be used, for example, to maintain a side support member (e.g., 864, 964) or a separate bolster member (e.g., 1582, 1583) in a desired position on a support element. A non-slip surface feature(s) can also be used, for example, to maintain a body element in a desired position on a support element and/or to help maintain a user in a desired position on the support element.

A non-slip feature can include, for example, a patterned tactile treatment used to create a non-slip surface. The patterned treatment can include, for example, ink, rubber, silicone, or other suitable material(s), which can be, for example, digitally printed, screen-printed, sprayed, brushed, ironed on, sewn on, or otherwise applied to at least a portion of the material on the top surface of a support element. The non-slip surface treatment can include, for example, straight lines, curved lines, diagonal lines, various shapes, such as, for example, squares, circles, rectangles, blocks, polygons, ellipses, etc. and/or other ambiguous shapes. In some embodiments, the non-slip surface treatment can include a grooved or grid-like pattern. In some embodiments, the non-slip surface treatment can be applied as a flat or smooth surface, or can be applied such that the non-slip surface is raised with respect to the surface to which it is applied. FIGS. 76, 77 and 78(A)-78(E) illustrate some example patterns and configurations for a non-slip surface, and it should be understood that other patterns and configurations can alternatively be included.

Each embodiment of a support element described with reference to FIGS. 76, 77 and 78(A)-78(E) can include the same or similar features, and can function the same or similar to, other embodiments of a support element described herein, and therefore certain details are not described with reference to FIGS. 76, 77 and 78(A)-78(E). Further, although not shown with respect to other embodiments of a support element described herein, it should be understood that other embodiments of a support element can include non-slip features as described with respect to FIGS. 76, 77 and 78(A)-78(E).

Figure 77:
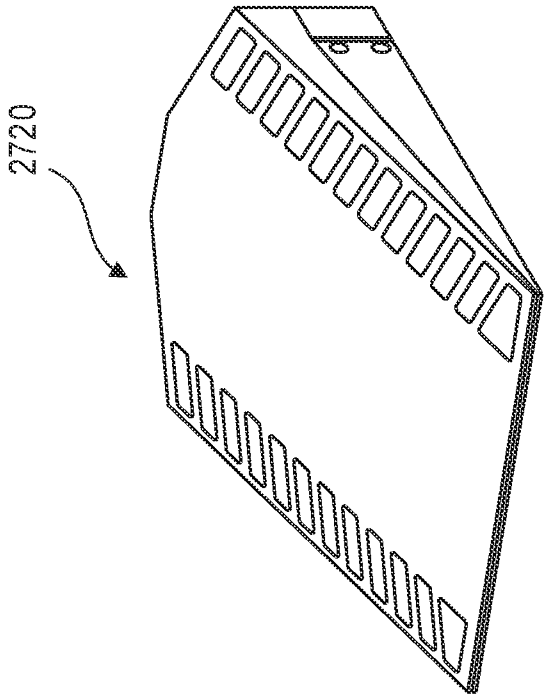
FIG. 77 is a side perspective view of a support element including non-slip features according to another embodiment.
Figure 76:
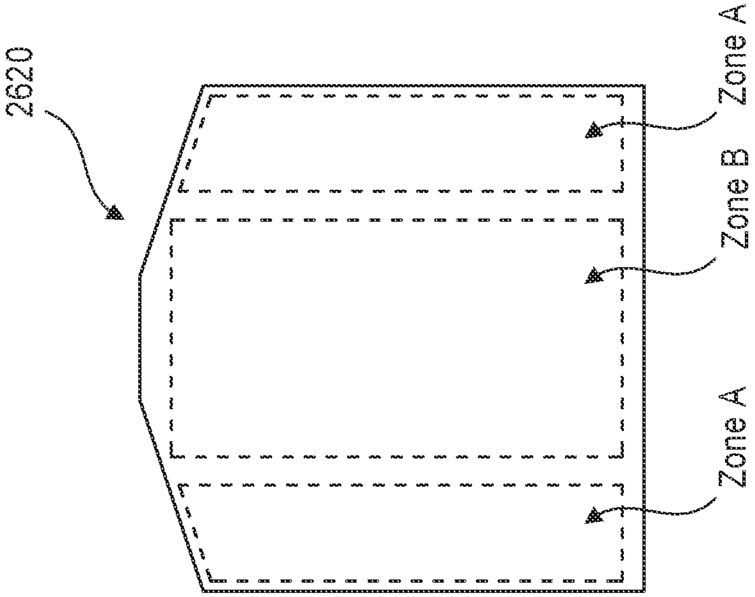
FIG. 76 is a top view of a support element including non-slip features, according to an embodiment.
Figure 78A:
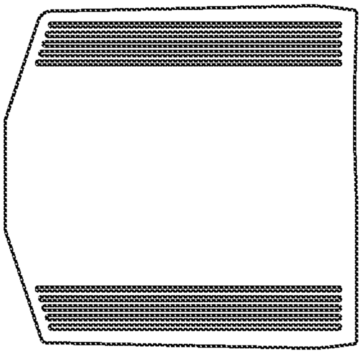
FIGS. 78(A)-78(F) are each a top view of a different embodiment of a support element including non-slip features.
Figure 78B:
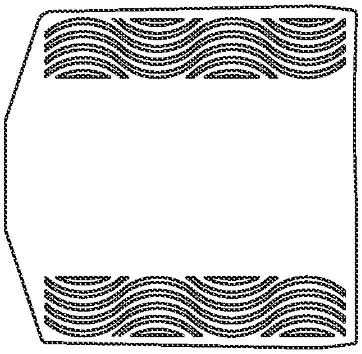
Figure 78C:
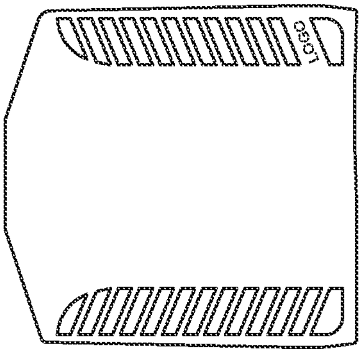
Figure 78D:
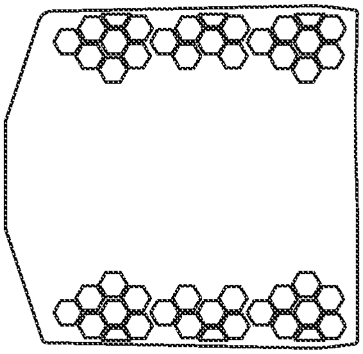
Figure 78E:
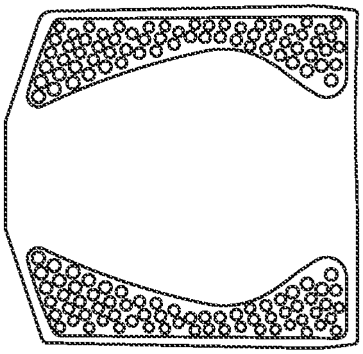
Figure 78F:
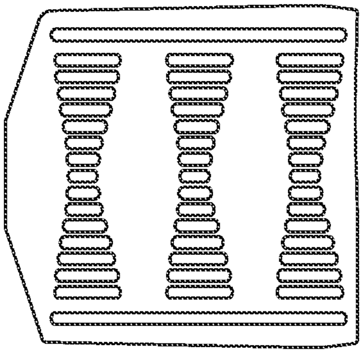

FIG. 76 illustrates a support element 2620 that includes two non-slip surface features A disposed on lateral sides of the top surface of the support element 2620, and a non-slip surface feature B disposed on a center portion of the top surface. In this embodiment, the non-slip surface feature A can be used, for example, to help maintain a body element (not shown) in a desired position on the support element 2624. The non-slip surface treatment B can be used, for example, to retain a user of the support element 2524 in a desired position substantially centered on the support element 2624 and also can help prevent or reduce the tendency of the user to slide down an angled top surface of the support element. FIG. 77 illustrates a support element 2720 that includes only two non-slip surface features A disposed on lateral sides of the top surface of the support element 2720. In this embodiment the non-slip surface features A can function in the same manner as described above for the non-slip surface features A of support element 2620. This embodiment also illustrates an example of an applied non-slip pattern. FIGS. 78(A)-78(F) each illustrate a top view of a different embodiment of a support element having various different non-slip surface features.

Figure 79:
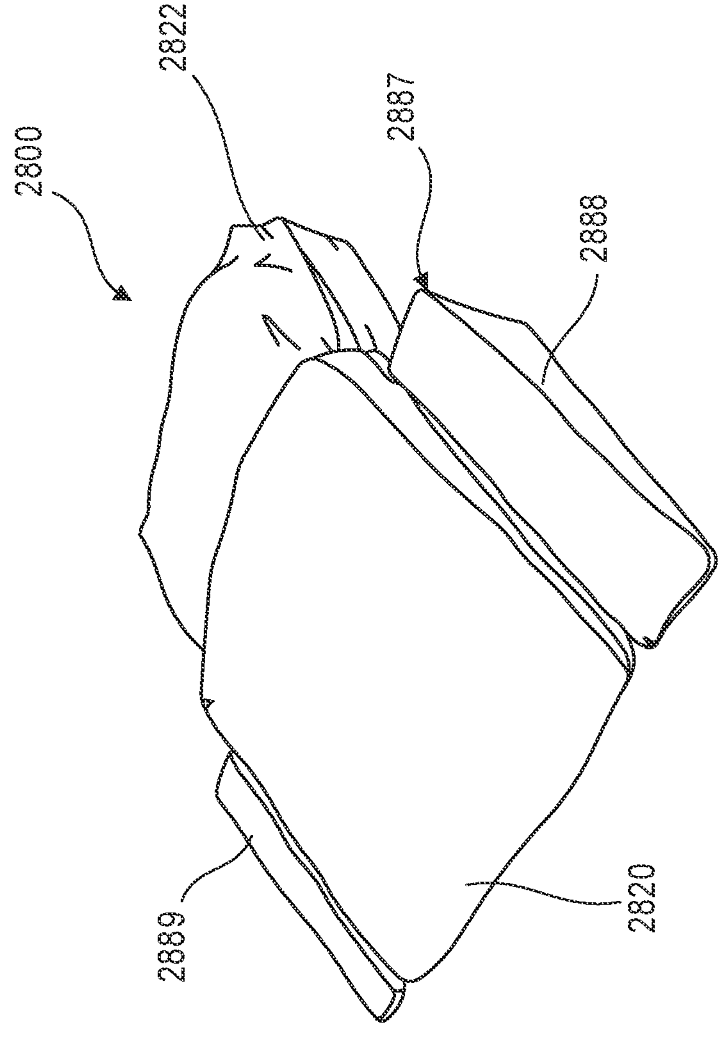
FIG. 79 is a side perspective view of a therapeutic cushion system, according to another embodiment.
Figure 80:
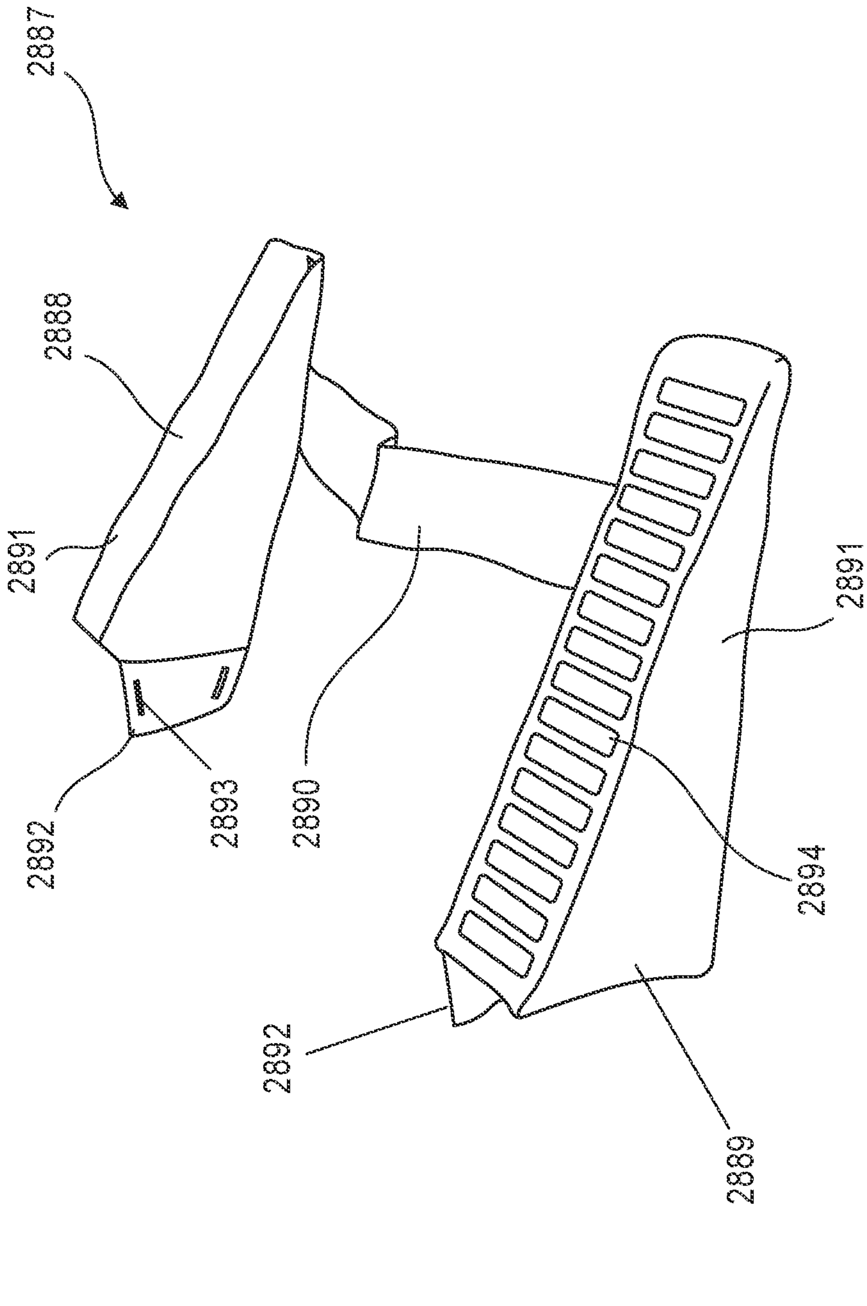
FIG. 80 is a side perspective view of a side extension element of the therapeutic cushion system of FIG. 79.

FIGS. 79 and 80 illustrate a therapeutic cushion system that includes a side extension element. A side extension element can be coupled to a support element to provide a larger width to support the user's body and/or to support a body element if the user's body is occupying a large portion of the support element. As shown in FIG. 79, a therapeutic cushion system 2800 includes a support element 2820, a riser element 2822 and a side extension element 2887. The support element 2820 and the riser element 2822 can be formed the same as or similar to, and function the same as or similar to, previous embodiments (e.g., support element 220 and riser element 222) described herein and are, therefore, not described in detail with reference to FIGS. 79 and 80.

The side extension element 2887 includes a first extension member 2888, a second extension member 2889, and a connecting strap 2890 extending between the first extension member 2888 and the second extension member 2889, as shown in FIG. 80. The side extension element 2887 can be fixedly or removably coupled to the support element 2820, as shown in FIG. 79, such that the first extension member 2888 is disposed on a first lateral side of the support element 2820 and the second extension member 2889 is disposed on an opposite second lateral side of the support element 2820.

The first extension member 2888 and the second extension member 2889 can each be constructed the same as or similar to a support element (e.g., support element 120) as described herein. For example, the first extension member 2888 and the second extension member 2889 can each have an angled top surface (e.g., wedge shape), for example, that substantially matches the angle of the support element 2820. For example, in some embodiments, the first extension member 2888 and the second extension member 2889 can each have a top surface that has an angle between 6 degrees and 30 degrees relative to a bottom surface.

The first extension member 2888 and the second extension member 2889 can each be a variety of different lengths, widths and/or thicknesses. For example, the first extension member 2888 and the second extension member 2889 can each have a torso length or can each have a bed length as described above for support element 120. The first extension member 2888 and the second extension member 2889 can also each include a cushion member (not shown) disposed within an outer casing 2891.

The outer casing 2891 can be formed with the same or similar materials as the outer casing 121 described above, and can include a top portion on which the user contacts during use that is formed with a first material, and a bottom portion that contacts the support surface (e.g., top surface of a bed) that is formed with a second material. The top portion (e.g., the top surface) of the outer casing 2891 can be formed with, for example, a four-way stretch material that is highly conformable, such as, for example, cotton/spandex, nylon/spandex, polyester/spandex or blends of any blend of cotton, nylon or polyester combined with spandex, and the bottom portion can be formed with a more robust material, such as, for example, poplin, canvas, gabardine or twill made using any combination of cotton, polyester or nylon, to provide durability.

The outer casing 2891 can also include an opening (not shown) through which the cushion member can be inserted and can include a fastener such as, for example, a zipper, buttons, snaps, flaps, hook and loop fasteners or other suitable coupling method to close or partially close the opening. The cushion member of the side extension element 2887 can be formed with the same or similar materials as described above for cushion member 123. For example, the cushion member of the side extension element 2887 can be formed with one or more foam materials, such as, for example, polyurethane or rubber latex, and in some embodiments, can include multiple different foam materials each having a different density.

The side extension element 2887 also includes straps 2892 on each of the first and second extension members 2888 and 2889. The straps 2892 can be formed with, for example, the same or similar material as the straps 226 of riser element 222 described above. Each strap 2892 can include button holes 2893 (only shown on extension member 2888 in FIG. 80) that can be used to removably couple the side extension element 2887 to buttons (not shown in FIGS. 79 and 80) on the support element 2820 (e.g., similar to the buttons 228 on support element 220 described above). For example, in some embodiments, the side extension element 2887 can be coupled to the support element 2820 using the same buttons as used to couple the riser element 2822 to the support element 2820. In some embodiments, a different set of buttons can be used. In alternative embodiments, other coupling methods can be used to couple the straps 2892 to the support element 2820, such as, for example, hook and loop fasteners, snaps, strings or ties, zippers, or any other suitable coupling method.

The connecting strap 2890 can be formed with, for example, an elastic material, such that the connecting straps 2890 can hold each of the first and second extension members 2888 and 2889 substantially tight against the support element 2820. Each of the first and second extension members 2888 and 2889 can also include a non-slip surface treatment 2894 (only shown on extension member 2889 in FIG. 80) as described above for previous embodiments of a support element.

In some embodiments, the therapeutic cushion systems described herein can be provided as a kit that can include any combination or sub-combination of the various components of a cushion system described herein. For example, in some embodiments, a kit can include one or more support elements, one or more riser elements and/or one or more body elements. In some embodiments, a kit can include multiple cushion members that can be selectively assembled into a support element and/or multiple riser cushion members that can be selectively assembled into a riser element as described above for example, with respect to cushion systems 1300 and 1400. In some embodiments, a kit can also include separate side support members (e.g., 864, 964) and/or side bolster members (e.g., 1582, 1682, 1782, 1982, 2082).

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

For example, any of the embodiments of a cushion system can include a support element with a top surface that is angled at an angle between, for example, 6-30 degrees relative to a bottom surface of the support element. Any of the body elements described herein can include an arc portion and the arc portion can be curved, for example, between about 30 and about 180 degrees. In another example, any embodiment of cushion system can include one or more side bolsters and or one or more side support members. The body elements can include a first arm and a second arm having a variety of different lengths not necessarily shown.

What is claimed is:

1. An apparatus comprising:

a cushion including a support element portion and a head support portion, the support element portion having a top surface disposed at an angle relative to a bottom surface of the support element portion, the support element portion has a first end and a second end, the second end having a height greater than a height of the first end, the second end including an end surface facing the head support portion, the head support portion extending directly from the support element portion, the support element portion and the head support portion collectively defining a receiving portion between the head support portion and the end surface of the support element portion, the receiving portion configured to receive at least a portion of an arm of a user of the cushion, the receiving portion being entirely bounded about a perimeter of the receiving portion collectively by the head support portion and the support element portion;

the cushion having a width and a length greater than the width, the receiving portion having a length defined in a direction of the width of the cushion and a width defined in a direction of the length of the cushion, the width of the receiving portion varying across the length of the receiving portion in a top view of the apparatus.

2. The apparatus of claim 1, wherein the height of the second end is between about 6 inches and about 14 inches, the height of the first end is about 2 inches.

3. The apparatus of claim 1, wherein the cushion is configured to be placed on a support surface, the support element portion has a length such that when the user is positioned on the cushion, a hip of the user is supported on the support surface so as to maintain the user's body positioned on the cushion.

4. The apparatus of claim 1, wherein the support element portion has a length between about 20 inches and about 40 inches.

5. The apparatus of claim 1, wherein the top surface of the support element portion is disposed at an angle between about 6 degrees and about 30 degrees relative to the bottom surface of the support element portion.

6. The apparatus of claim 1, further comprising:

a body element configured to be disposed at least partially on the support element portion, the body element including a pillow insert disposed within an outer sleeve.

7. The apparatus of claim 6, wherein the body element has a length greater than a length of the support element portion.

8. The apparatus of claim 6, wherein the support element portion and the head support portion collectively have a first length, the body element has a second length greater than the first length.

9. The apparatus of claim 1, wherein the head support portion has a top surface substantially parallel to a bottom surface.

10. An apparatus, comprising:

a cushion including a support element portion and a head support portion, the support element portion having a first end and a second end, the second end having an end surface facing the head support portion, the end surface extending from a center portion of the support element portion toward lateral sides of the support element portion, the support element portion having a top surface angled relative to a bottom surface of the support element portion between the first end and the second end of the support element portion, the head support portion and the support element portion collectively defining a first receiving portion between the head support portion and the support element portion on a first side of the center portion of the support element portion and a second receiving portion is defined on a second side of the center portion of the support element portion opposite the first side, the head support portion and the support element portion collectively defining a perimeter boundary of an interior region defined collectively by the first receiving portion and the second receiving portion, the cushion having a width and a length greater than the width, the interior region having a length defined in a direction of the width of the cushion and a width defined in a direction of the length of the cushion, the width of the interior region varying across the length of the interior region in a top view of the apparatus, and each of the first receiving portion and second receiving portion is configured to receive at least a portion of an arm of a user of the cushion.

11. The apparatus of claim 10, wherein the second end of the support element portion has a height greater than a height of the first end of the support element portion.

12. The apparatus of claim 11, wherein the height of the second end of the support element portion is between about 6 inches and about 14 inches, and the height of the first end of the support element portion is about 2 inches.

13. The apparatus of claim 10, wherein the cushion is configured to be placed on a support surface, and the support element portion has a length such that when the user is positioned on the cushion, a hip of the user is supported on the support surface so as to maintain the user's body positioned on the cushion.

14. The apparatus of claim 10, wherein the support element portion has a length between about 20 inches and about 40 inches.

15. The apparatus of claim 10, wherein the top surface of the support element portion is disposed at an angle between about 6 degrees and about 30 degrees relative to the bottom surface of the support element portion.

16. The apparatus of claim 10, further comprising:

a body element configured to be disposed at least partially on the support element portion, the body element including a pillow insert disposed within an outer sleeve.

17. The apparatus of claim 16, wherein the body element has a length greater than a length of the support element portion.

18. The apparatus of claim 16, wherein the support element portion and the head support portion collectively have a first length, and the body element has a second length greater than the first length.

19. A method, comprising:

placing a cushion on a support surface, the cushion including a body support portion and a head support portion, the body support portion having a top surface disposed at an angle between about 6 degrees and about 30 degrees relative to a bottom surface, the body support portion and the head support portion collectively define a receiving portion configured to receive at least a portion of an arm of a user; and placing a body element onto a top surface of the cushion, the body element including a first arm and a second arm spaced apart from the first arm to provide access to the receiving portion when placed on the top surface of the cushion.

20. The method of claim 19, wherein the placing the body element onto a top surface of the cushion is performed such that the body element extends off the body support portion.

21. An apparatus comprising:

a cushion including a support element portion and a head support portion, the support element portion having a top surface disposed at an angle relative to a bottom surface of the support element portion, the support element portion has a first end and a second end, the second end having a height greater than a height of the first end, the second end including an end surface facing the head support portion, the head support portion extending directly from the support element portion, the support element portion and the head support portion collectively defining a receiving portion between the head support portion and the end surface of the support element portion, the receiving portion configured to receive at least a portion of an arm of a user of the cushion, the receiving portion being entirely bounded about a perimeter of the receiving portion collectively by the head support portion and the support element portion;

the cushion having a width and a length greater than the width, the receiving portion having a length defined in a direction of the width of the cushion and a width defined in a direction of the length of the cushion, the width of the receiving portion varying across the length of the receiving portion, the cushion configured to be placed on a support surface, the support element portion has a length such that when the user is positioned on the cushion, a hip of the user is supported on the support surface so as to maintain the user's body positioned on the cushion.

* * * * *